United States Patent
Agnello et al.

(10) Patent No.: US 11,906,482 B2
(45) Date of Patent: Feb. 20, 2024

(54) EDGE STRENGTH TESTING OF FREE-FORM GLASS PANEL

(71) Applicant: CORNING INCORPORATED, Corning, NY (US)

(72) Inventors: Gabriel Pierce Agnello, Corning, NY (US); Chong Pyung An, Painted Post, NY (US); Zhenxing Hu, Painted Post, NY (US); Bosun Jang, Painted Post, NY (US); Peter Knowles, Elmira, NY (US); Balamurugan Meenakshi Sundaram, Painted Post, NY (US); Douglas Miles Noni, Jr., Horseheads, NY (US); Richard Sean Priestley, Painted Post, NY (US); Jamie Todd Westbrook, Sayre, PA (US)

(73) Assignee: Corning Incorporated, Corning, NY (US)

( * ) Notice: Subject to any disclaimer, the term of this patent is extended or adjusted under 35 U.S.C. 154(b) by 323 days.

(21) Appl. No.: 17/237,437

(22) Filed: Apr. 22, 2021

(65) Prior Publication Data

US 2021/0239584 A1    Aug. 5, 2021

Related U.S. Application Data

(63) Continuation-in-part of application No. 17/285,587, filed as application No. PCT/US2020/031553 on May 6, 2020.

(Continued)

(51) Int. Cl.
*G01N 3/20* (2006.01)
*G01N 3/06* (2006.01)

(52) U.S. Cl.
CPC ............ *G01N 3/20* (2013.01); *G01N 3/068* (2013.01); *G01N 2203/0023* (2013.01); *G01N 2203/0282* (2013.01); *G01N 2203/0647* (2013.01)

(58) Field of Classification Search
CPC ............ G01N 3/068; G01N 3/08; G01N 3/20; G01N 3/16; G01N 3/32; G01N 3/04;
(Continued)

(56) References Cited

U.S. PATENT DOCUMENTS

| 3,338,696 A | 8/1967 | Dockerty |
| 3,682,609 A | 8/1972 | Dockerty |

(Continued)

FOREIGN PATENT DOCUMENTS

| KR | 10-2014-0122932 A | 10/2014 |
| KR | 10-2015-0024081 A | 3/2015 |
| WO | 2016/149016 A1 | 9/2016 |

OTHER PUBLICATIONS

Agnello, et al., Improved Methodology for Testing Edge Strength for Ultra-Thin Panels, (SID 2018 Digest), vol. 49, Issue 1, pp. 1496-1498.

(Continued)

*Primary Examiner* — Brandi N Hopkins
(74) *Attorney, Agent, or Firm* — Ryan T. Hardee; Grant A. Gildehaus

(57) ABSTRACT

An apparatus for testing the edge strength of a discrete sheet of material such as glass where the sheet has an irregular free-form shaped outline is disclosed. The apparatus can include a plurality of assemblies configured for selectively applying a 3-point bending load on an edge of the sheet of material in a test region of the apparatus, a detection mechanism that optically measures strain in the sheet of material in the region, and a processor that determines the (Continued)

stress in the sheet based on the measured strain by calculating the stress that would be required to produce the measured strain in the sheet of material.

17 Claims, 57 Drawing Sheets

Related U.S. Application Data

(60) Provisional application No. 62/959,559, filed on Jan. 10, 2020, provisional application No. 62/852,677, filed on May 24, 2019, provisional application No. 62/848,091, filed on May 15, 2019.

(58) Field of Classification Search
CPC ............... G01N 21/896; G01N 33/386; G01N 2203/028; G01N 2203/0023; G01N 2203/0282; G01N 2203/0647; G01B 21/20; G01M 5/00; G01M 11/088
See application file for complete search history.

(56) References Cited

U.S. PATENT DOCUMENTS

| | | | |
|---|---|---|---|
| 4,346,601 A | 8/1982 | France | |
| 2008/0083288 A1 | 4/2008 | Glaesemann | |
| 2013/0215419 A1 | 8/2013 | Kuo et al. | |
| 2013/0315778 A1* | 11/2013 | Oishi | C22C 23/02 420/407 |
| 2013/0323523 A1* | 12/2013 | Oishi | B21B 1/26 72/200 |
| 2017/0073264 A1 | 3/2017 | Lotze et al. | |
| 2018/0073967 A1* | 3/2018 | Agnello | G01N 3/20 |
| 2021/0394246 A1* | 12/2021 | Terasawa | B30B 3/00 |

OTHER PUBLICATIONS

Asundietal., "Improved Speckle Projection Profilometry for out-of-plane Shape Measurement", Applied Optics, vol. 47, Is. 29, Oct. 10, 2008 pp. 5527-5533.

Gulati et al., "Overview of Strength Tests for LCD Substrates and Panels" Corning technology Center, 2011, 5 pages.

Jang, et al., "Edge Strength Measurement of Ultra-Thin LCD Panels", SID 2019 Digest, vol. 50, No. 1, pp. 664-667.

Sutton et al., "Image Correlation for Shape, Motion and Deformation Measurements", Basic Concepts, Theory and Applications, Springer US, 2009, 30 pages.

International Search Report and Written Opinion of the International Searching Authority; PCT/US20/31553; dated Aug. 28, 2020; 10 Pages; Korean Intellectual Property Office.

\* cited by examiner

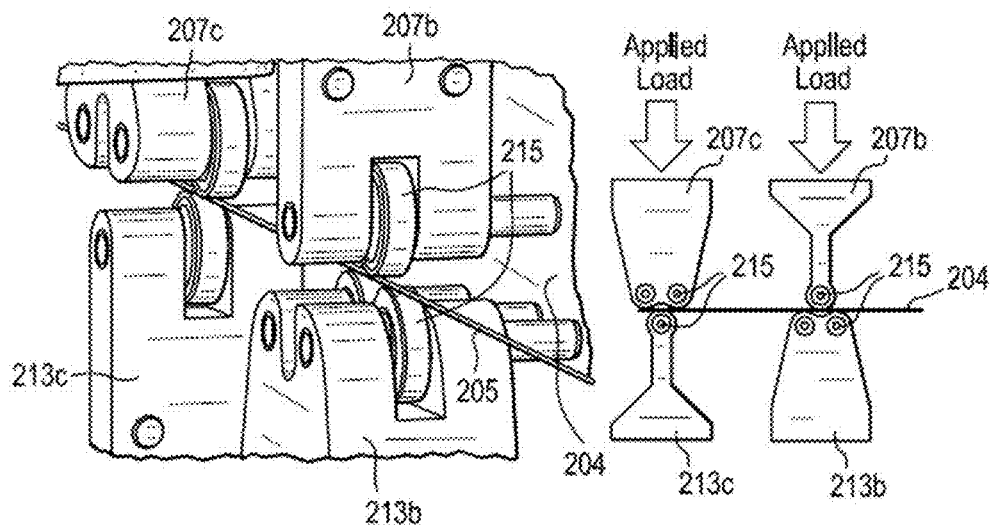
FIG. 1A
(Prior Art)
FIG. 1B
(Prior Art)
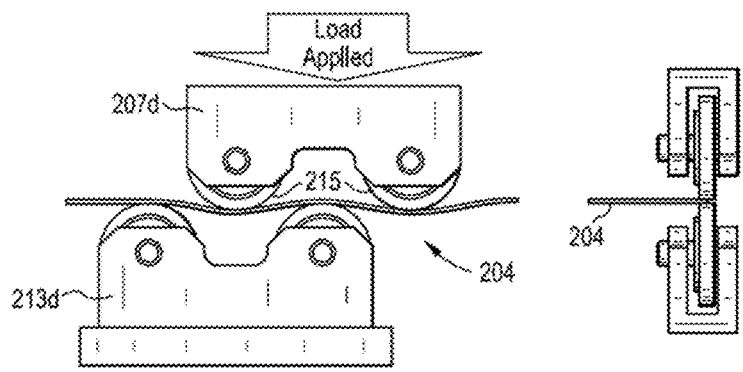
FIG. 1C
(Prior Art)
FIG. 1D
(Prior Art)

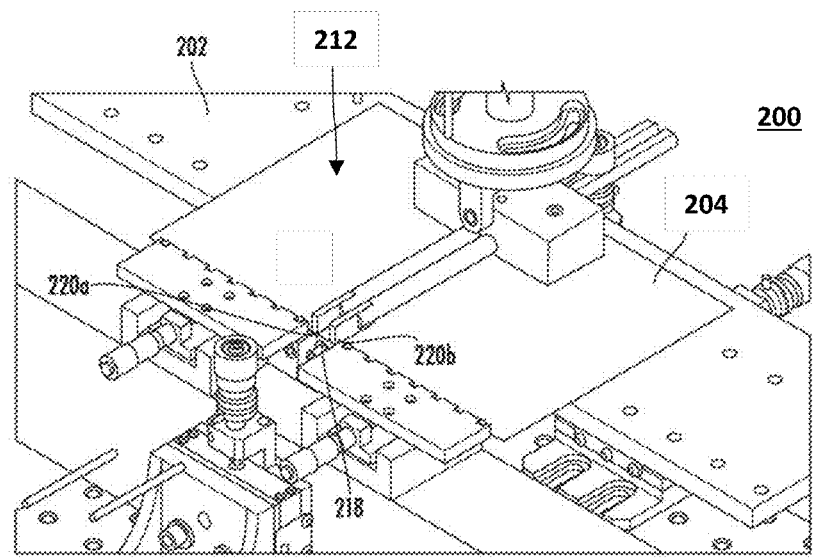
FIG. 4
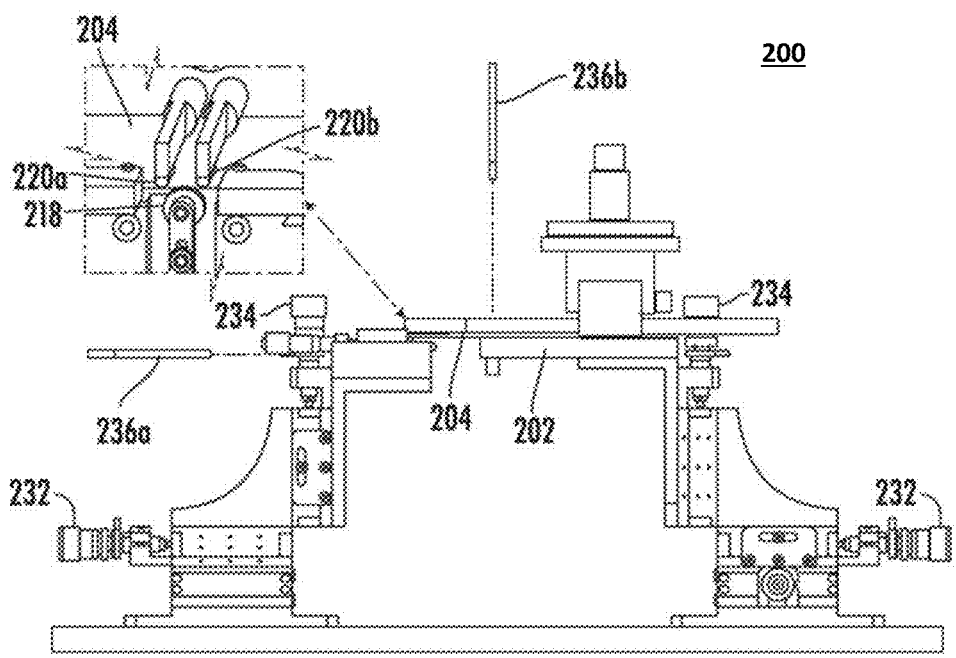
FIG. 5B
FIG. 5A

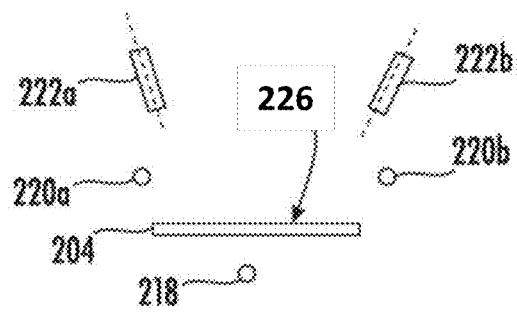
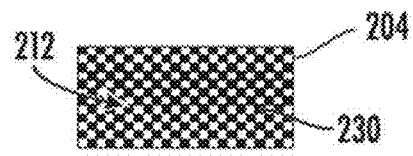
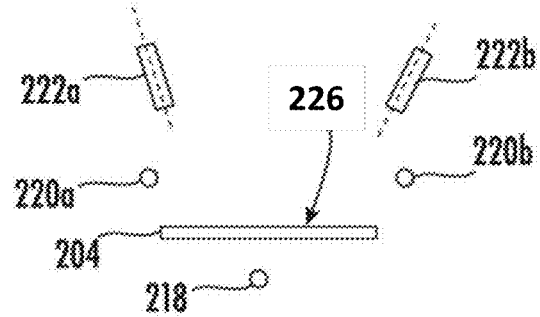
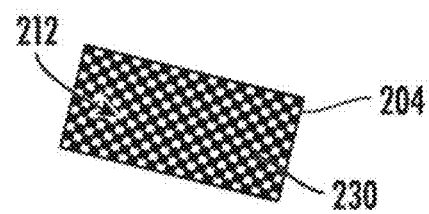
FIG. 11A
FIG. 11B
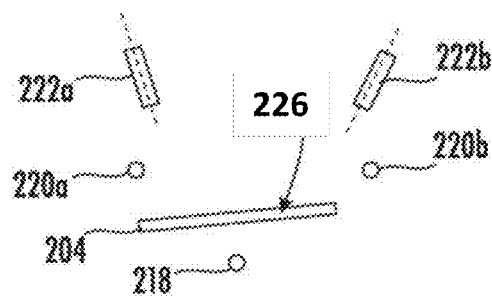
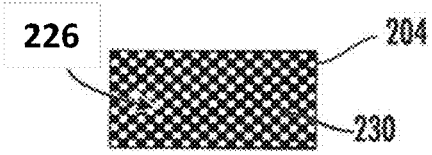
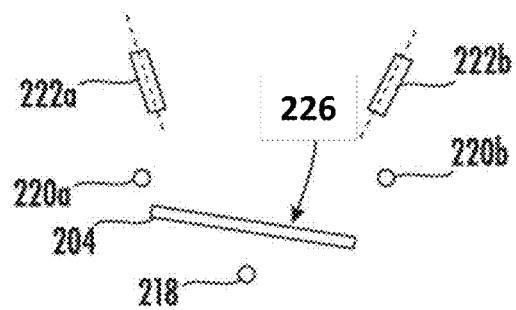
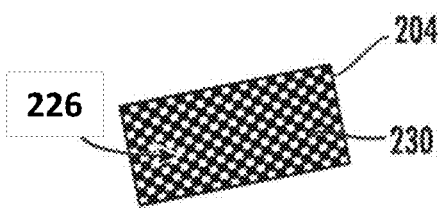
FIG. 11C
FIG. 11D (Section B-B)

EDGE STRENGTH TESTING OF FREE-FORM GLASS PANEL

CROSS-REFERENCE TO RELATED APPLICATIONS

This application is a continuation-in-part of U.S. application Ser. No. 17/285,587 filed on Apr. 15, 2021, which in turn, claims the benefit of priority under 35 U.S.C. § 119 of U.S. Provisional Application Ser. No. 62/848,091 filed on May 15, 2019, U.S. Provisional Application Ser. No. 62/852,677 filed on May 24, 2019 and U.S. Provisional Application Ser. No. 62/959,559 filed on Jan. 10, 2020, the contents of each of which are relied upon and incorporated herein by reference in their entireties.

FIELD OF THE DISCLOSURE

The present disclosure relates generally to an apparatus and methods for testing edge strength of glass sheet or panel specimen.

BACKGROUND

High-performance display devices, such as liquid crystal displays (LCDs), organic light emitting device (OLED) displays, and plasma displays, are some examples of applications that utilize thin glasses (<1 mm thick). The glass sheets fabricated for these display applications are typically cut to size by score and break methods. The resulting sharp edges of the glass sheets are further conditioned by grinding and/or polishing. The edge conditioned glass sheets can have residual undesired flaws, such as chips or cracks, at surfaces and edges of the glass sheet. These flaws can serve as fracture sources that can reduce the strength of the glass sheets. These residual flaws that might be present in the glass sheets may result in cracks in the glass sheet either during the assembly of display devices or even during use of the final display product.

Existing edge strength measurement systems, although can conduct continuous edge strength testing of glass/panel sheets, they cannot test glass sheets/panels having free-form shapes that do not have straight or flat edges. Thus, there is a need in the industry to accurately test the edge strength of free-form shaped glass sheets, as well as panels or laminate structures using such glass sheets, in order to screen glass sheets that have lower than desired edge strength.

SUMMARY

Exemplary embodiments will be described directed to an apparatus and methods for the continuous measurement of the edge strength of a glass edge where the glass edge has a free-form shape and is not straight. The free-form shape of the glass edge can also include edges that are not flat, i.e. having 3-D curvature.

Provided is an apparatus for testing edge strength of a sheet of material having a maximum width is disclosed. The apparatus comprises: a plurality of assemblies comprising two opposing assemblies, wherein the first of the two opposing assemblies comprising a single cylindrical roller member for engaging a first side of the sheet, and a second of the two opposing assemblies comprising two spaced-apart cylindrical roller members for engaging a second side of the sheet opposite the first side and selectively applying a 3-point bending load on the sheet of material in a test region of the apparatus, whereby the plurality of assemblies can establish a loaded condition on the sheet of material in the test region by applying the 3-point bending load and establish a no-load condition on the sheet of material in the test region by not applying the 3-point bending load; wherein each of the three rollers are longer than the maximum width of the sheet of material so that the full width of the sheet of material can be engaged by the three rollers; where the three rollers are arranged so that their rolling axes are parallel to each other and equidistant from each other; where the two spaced-apart roller members define the test region between the two spaced-apart roller members; a detection mechanism configured for optically measuring strain in the sheet of material in the test region when the sheet of material is in the no-load condition and when the sheet of material is in the loaded condition, where the strain in the loaded condition is produced by the 3-point bending load; and a processor that is configured for determining stress in the sheet of material based on the measured strain.

In another embodiment, provided is an apparatus for testing edge strength of a sheet of material comprising: a plurality of assemblies configured for selectively applying a 3-point bending load along an edge of the sheet of material in a test region of the apparatus, whereby the plurality of assemblies can establish a loaded condition on the sheet of material in the test region by applying the 3-point bending load and establish a no-load condition on the sheet of material in the test region by not applying the 3-point bending load; where the plurality of assemblies comprises two opposing assemblies for applying the 3-point bending load, where a first of the two opposing assemblies comprising a single arcuate member for engaging a first side of the sheet and a second of the two opposing assemblies comprising two spaced-apart arcuate members for engaging a second side of the sheet opposite the first side, where the two spaced-apart arcuate members define the test region between the two spaced-apart arcuate members; a linear cam representing a linear map of the 3-point bending load along the edge of the sheet of material, wherein the linear cam is configured to move linearly in synchronization with the sheet of material; and a follower that rides on the linear cam, wherein the follower is connected to the single arcuate member to vary the 3-point bending load on the sheet of material as the sheet of material moves through the test region.

Also provided is an apparatus for testing edge strength of a sheet of material comprising: a plurality of assemblies configured for selectively applying a 3-point bending load along an edge of the sheet of material in a test region of the apparatus, whereby the plurality of assemblies can establish a loaded condition on the sheet of material in the test region by applying the 3-point bending load and establish a no-load condition on the sheet of material in the test region by not applying the 3-point bending load; where the plurality of assemblies comprises two opposing assemblies for applying the 3-point bending load, where a first of the two opposing assemblies comprising a single arcuate member for engaging a first side of the sheet and a second of the two opposing assemblies comprising two spaced-apart arcuate members for engaging a second side of the sheet opposite the first side, where the two spaced-apart arcuate members are separated by a predefined spacing, wherein the two spaced-apart arcuate members define the test region between the two spaced-apart arcuate members; where the single arcuate member is vertically aligned between the two spaced-apart arcuate members; where the two spaced-apart arcuate members are configured to dynamically adjust the predefined spacing between the two spaced-apart arcuate members to adjust the stress induced in the sheet in the test region while maintaining the vertical alignment of the single arcuate member with respect to the two spaced-apart arcuate member.

Also provided is an apparatus for testing edge strength of a discrete sheet of material having an irregular shaped outline that defines a continuous edge along the irregular shaped outline, the apparatus comprising: a plurality of assemblies configured for selectively applying a 3-point bending load on a portion of the edge of the sheet of material in a test region of the apparatus, whereby the plurality of assemblies can establish a loaded condition on the sheet of material in the test region by applying the 3-point bending load and establish a no-load condition on the sheet of material in the test region by not applying the 3-point bending load, where the plurality of assemblies comprises two opposing assemblies for applying the 3-point bending load, wherein a first of the two opposing assemblies comprising a single arcuate member for engaging a first side of the sheet and a second of the two opposing assemblies comprising two spaced-apart arcuate members for engaging a second side of the sheet opposite the first side, wherein the two spaced-apart arcuate members define the test region between the two spaced-apart arcuate members; a holder configured for holding the sheet of material while the 3-point bending load is being applied on the sheet of material; where the holder is configured to move the sheet of material so that a defined testing channel region along the edge of the sheet can be moved through the test region of the apparatus so that the 3-point bending load can be applied at different locations along the edge of the sheet; and where the holder is configured to guide the movement of the sheet material to maintain the defined region along the edge of the sheet within the test region as the defined region of the sheet is being moved through the test region.

Also provided is an apparatus for testing edge strength of a discrete sheet of material having an irregular shaped periphery that defines a continuous edge along the irregular shaped periphery, the apparatus comprising: a holder configured for holding the sheet of material, wherein when the holder is holding the sheet of material a testing channel region is defined along the continuous edge of the sheet; and a plurality of assemblies configured for selectively applying a 3-point bending load on a portion of the testing channel region of the continuous edge of the sheet of material in a test region of the apparatus, whereby the plurality of assemblies can establish a loaded condition on the sheet of material in the test region by applying the 3-point bending load and establish a no-load condition on the sheet of material in the test region by not applying the 3-point bending load, where the plurality of assemblies comprises two opposing assemblies for applying the 3-point bending load on the portion of the continuous edge of the sheet of material in the test region while the portion of the continuous edge of the sheet of material is positioned between the two opposing assemblies, where a first of the two opposing assemblies comprising a single arcuate member for engaging a first side of the sheet and a second of the two opposing assemblies comprising two spaced-apart arcuate members for engaging a second side of the sheet opposite the first side, where the two spaced-apart arcuate members define the test region between the two spaced-apart arcuate members, and where the plurality of assemblies are configured to be moved around the perimeter of the discrete sheet of material following the irregular shaped periphery, whereby the testing channel region of the continuous edge of the sheet of material is maintained between the two opposing assemblies during the movement.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals where possible and in which:

FIGS. 1A-1D are schematic illustration of some examples of the hardware configuration in the standard edge strength measurement system (ESMS) for performing the 3-point or 4-point bending test on an edge of the glass sheet for edge strength.

FIG. 4 is an isometric view of an embodiment of an ESMS as disclosed herein.

FIG. 5A is a side view of the ESMS of FIG. 4.

FIG. 5B is a close-up view of the arcuate members of the apparatus of FIG. 5A that are engaging the sheet being tested.

FIG. 10A shows a digital image correlation strain map of an 11N load with 60 steps in between.

FIG. 11A, on the top portion of the figure, shows a first schematic of a sample arrangement for use in calibration of ESMS and, on the bottom portion, shows a top view of the test sheet depicted in the schematic.

FIG. 11B, on the top portion of the figure, shows a second schematic of a sample arrangement for use in calibration of ESMS and, on the bottom portion, shows a top view of the skewed sheet depicted in the schematic.

FIG. 11C, on the top portion of the figure, shows a third schematic of a tilted sample arrangement for use in calibration of ESMS and, on the bottom portion, shows a top view of the sheet depicted in the schematic.

FIG. 11D, on the top portion of the figure, shows a schematic of a fourth sample arrangement for tilted sample arrangement for use in calibration of ESMS and, on the bottom portion, shows a top view of the skewed sheet depicted in the schematic.

DETAILED DESCRIPTION

In glass sheet production for display applications, for example, cut-to-size glass sheets are put through finishing processing to remove sharp edges by grinding and/or polishing and to make beveled edges. During these finishing process, handling or other manipulating steps, residual stresses can remain on the edges of the glass sheets. Such residual stresses and improper handling can cause subsequent breakage of the glass sheet. If the breakage occurs before the glass sheets are shipped to the customers, it reduces glass manufacturing yield and disrupts the glass manufacturing process. If the breakage occurs in customer's possession, typically a manufacturer of display devices that utilize the glass sheets, the breakages will cause yield loss and disruptions in the customer's manufacturing process. Regardless of when such subsequent breakage happens, it is not desired.

For this reason, edge strength of the glass sheets are tested in the glass manufacturing plant before they are shipped to the customers. A conventional method of edge strength testing is vertical four point bending (V4PTB) method. The V4PTB tests are conducted on small test coupon samples of the glass that are cut from the glass sheets at the end of production. The coupons are roughly 150 mm×10 mm in dimension and the coupons are individually tested. Because a glass sheet is destroyed to cut out a test coupon, a small number of glass sheets are tested and assume that they are statistically representative of the population of the glass sheets being manufactured.

Testing the sample coupons by V4PTB is a manually intensive process that takes about one day to process the samples from one glass sheet and hence very few glass sheets are tested, e.g., on the order of about three sheets for every 22,000 sheets produced. Further, such methods are unable to evaluate laminate structures or panels. Such shortcomings can result in significant leakage in the form of bad product reaching a customer.

In Corning's U.S. patent application Ser. No. 15/557,991, published as US 2018/0073967 A1, an edge strength measurement system (ESMS) and the related method of non-destructively testing the edge strength of the glass sheets without cutting out test coupons is disclosed. The ESMS system performs 3-point bending test or 4-point bending test directly on the edges of the glass sheets, thus, providing the ability to test the glass sheets in production without the need for cutting so that a larger portion of the glass sheet production population can be tested.

Figure 1E:
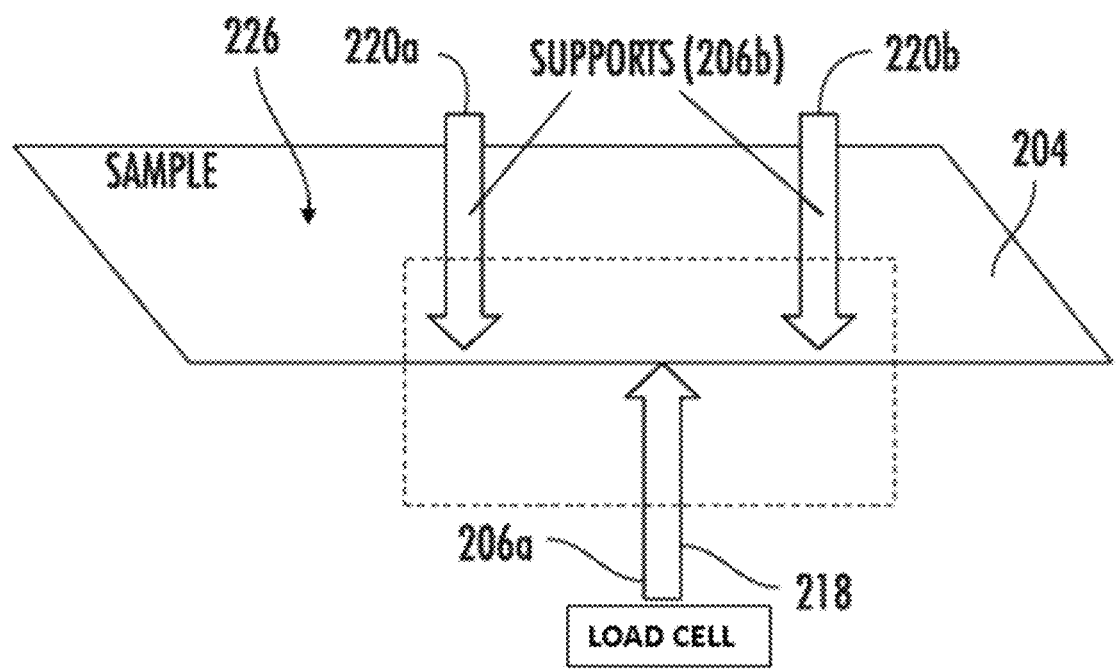
FIG. 1E is a schematic illustration for a 3-point bending test arrangement for testing edge strength of a test sample.

FIGS. 1A-1D are schematic illustration of some examples of the hardware configuration in the existing ESMS system for performing the 3-point or 4-point bending test on an edge of the glass sheet for edge strength. FIGS. 1A and 1B are perspective and plan views, respectively, of exemplary configurations that enabled 3-point bending test on the edge 205 of a glass sheet 204. The roller assemblies 207b and 213b via the three rollers 215 associated with them, one roller on top side 226 (See FIG. 1E) of the glass sheet 204 and two rollers on the bottom side of the glass sheet 204 provide a 3-point bending test configuration. The roller assemblies 207c and 213c via the three rollers 215 associated with them, two rollers on top side of the glass sheet 204 and one roller on the bottom side of the glass sheet 204 provide a 3-point bending test configuration. As noted in FIG. 1B, the vertical load that bends the glass sheet 204 is applied using the rollers on the topside. As shown in the FIG. 1D, the rollers 215 and the glass sheet 204 are positioned so that the rollers 215 catch the edge 205 of the glass sheet 204 between the top and bottom rollers so that the vertical loading force is exerted on the edge 205.

FIG. 1C is a side view of an exemplary configuration that enabled 4-point bending test on the edge 205 of a glass sheet 204. The roller assemblies 207d and 213d via the four rollers 215 associated with them, two rollers on top side of the glass sheet 204 and two rollers on the bottom side of the glass sheet 204 provide a 4-point bending test configuration. The vertical load that bends the glass sheet 204 is applied using the roller assembly 207d on the top side.

The ESMS system can be useful for testing glass sheets used in the manufacture of flat panel displays as such glass sheets must meet stringent surface quality requirements in the display area that are usually in the central portions of the glass sheet away from the edges. Contacting the serviceable or "quality" areas of the glass sheet may impart surface defects that make the glass sheet unusable. The arrangement of the rollers 215 in the exemplary configurations shown in FIGS. 1A-1D preserves the surface quality on both sides of the glass sheet 204.

The ESMS system can be utilized to test sheet materials other than the glass sheet 204 shown in the illustrated examples. For example, the ESMS system can be used to test strength of laminate structures (also referred to as panels), of other rigid or semi-rigid materials. Laminate structures or panels can include a plurality of glass sheets laminated with one or more intermediate polymeric layers or can also, in alternative embodiments, include a structure having a thin film transistor glass substrate and color filter glass substrate having one or more films therebetween or adjacent to either or both substrates. For purposes of the present disclosure for the ESMS system and methods of using the ESMS system, the terms "sheet(s)" and "panel(s)" will be used interchangeably. Unless specifically distinguished, whether sheet(s) or panel(s) are being tested by the ESMS system will not fundamentally change the edge strength testing methodology using the ESMS system.

Figure 38:
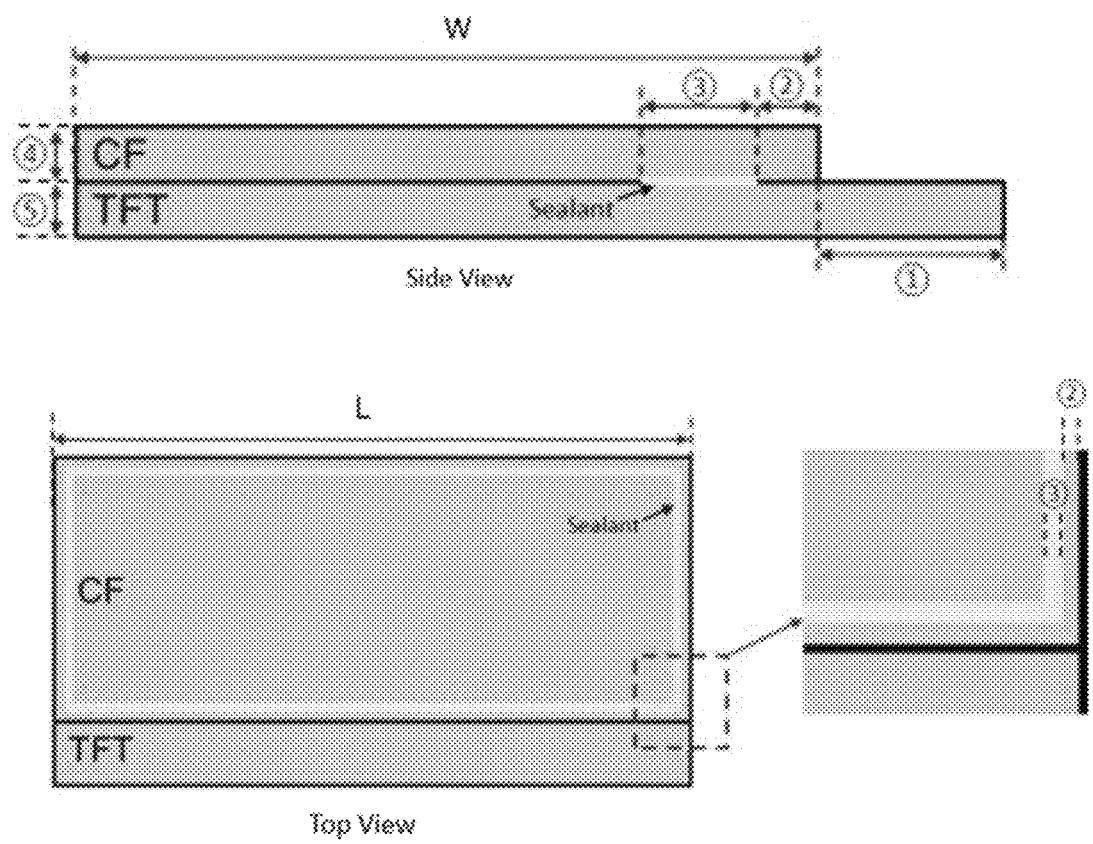
FIG. 38 is a schematic of a panel with its design parameters.

The structure of an example of panels that can be tested on ESMS will be described. Panels with different designs can be tested. FIG. 38 shows a schematic of a panel identifying some design parameters. W and L are the panel's width and length, respectively. (1) is the protruding length of the terminal edge, (2) is the distance between the sealant and panel edge, (3) is the sealant width, (4) and (5) are the CF, TFT glass thicknesses, respectively.

There are some preferences on the dimensions and sealant properties of the panels in order to be tested on ESMS. They are as follows: Small size rectangular panels that have a length (L) and/or width (W) of 600 mm or less can be tested. Larger size panels are also measurable. Preferably, the protruding length of the terminal edge (1) is longer than the roller engagement, which can range from 0.5 to 2 mm. Preferably, the distance between the sealant and panel edge (2) is less than 1 mm. Preferably, the sealant width (3) is equal to or wider than 500 um. Preferably, the thickness of the sealant is 10 um and have a Young's modulus of 1 Gpa or greater. Preferably, the interfacial bond strength between the brittle material and the seal should be sufficient so that no delamination occurs during the edge strength testing. Preferably, the total thickness of the CF glass thickness (4)+the TFT glass thickness (5) is ≥0.2 mm but ≤0.5 mm. The CF glass thickness (4) and the TFT glass thickness (5) can be equal or different. Preferably, the mechanical stiffness of display layers that are deposited on the TFT surface are negligible.

Figure 39:
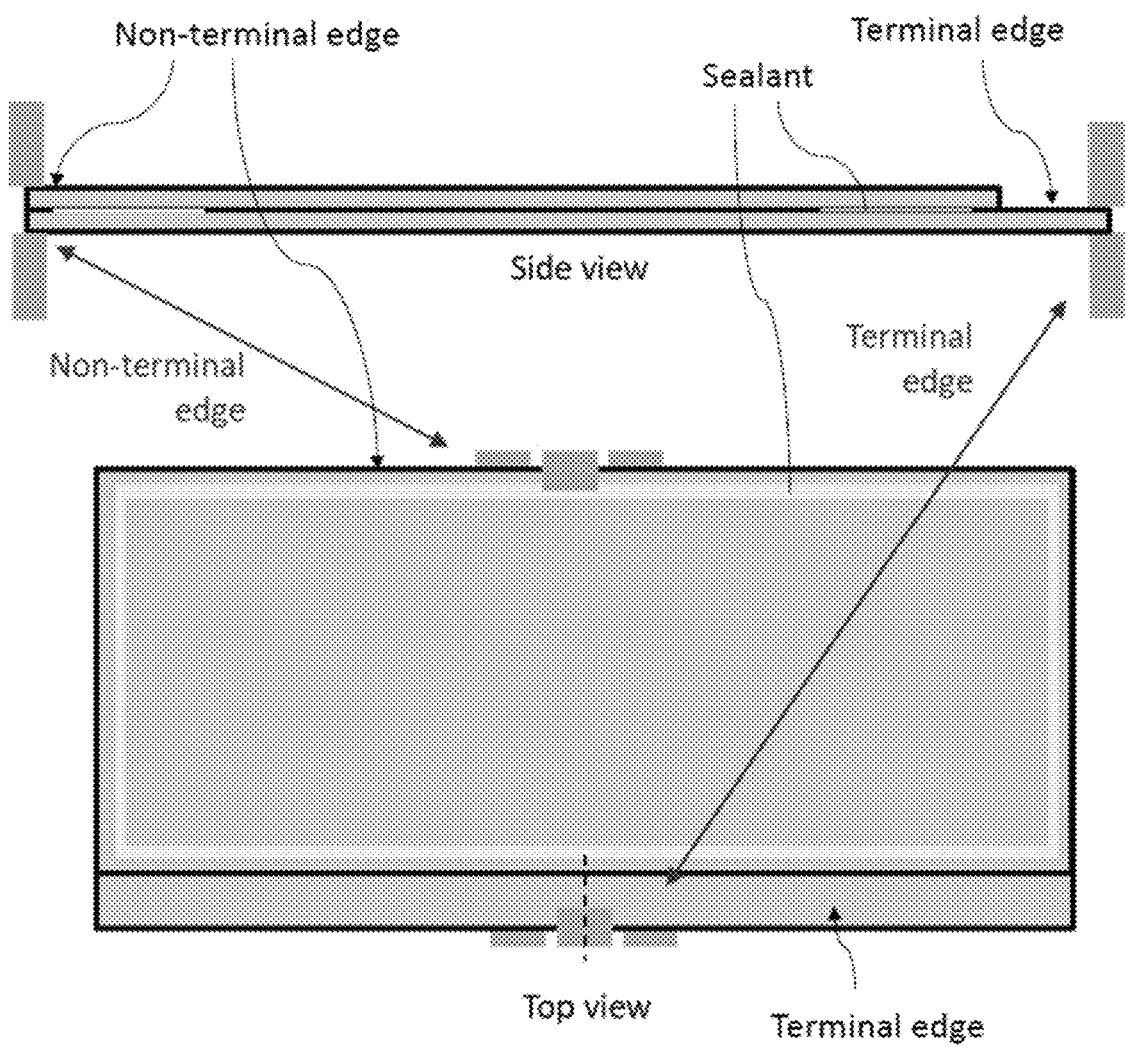
FIG. 39 is a schematic illustration of terminal, non-terminal edges of a panel engaged with the rollers in the ESMS of the present disclosure.

Both non-terminal and terminal edges of a panel can be tested. FIG. 39 shows the side view and top view of panels being engaged with the rollers on both non-terminal and terminal side edges. The terminal edge of a panel is where the TFT glass protrudes relative to the CF glass edge.

One of the drawbacks of the ESMS system described in US 2018/0073967 A1 referenced above is that the stress measurement during the edge strength testing is made using load cells attached to the topside roller assemblies 207b, 207c that are used to apply the test load to the glass sheet. This is an indirect way of detecting the stress in the edges. A more direct way of measuring the stress experienced by the test subject glass sheet is desired.

Figure 2:
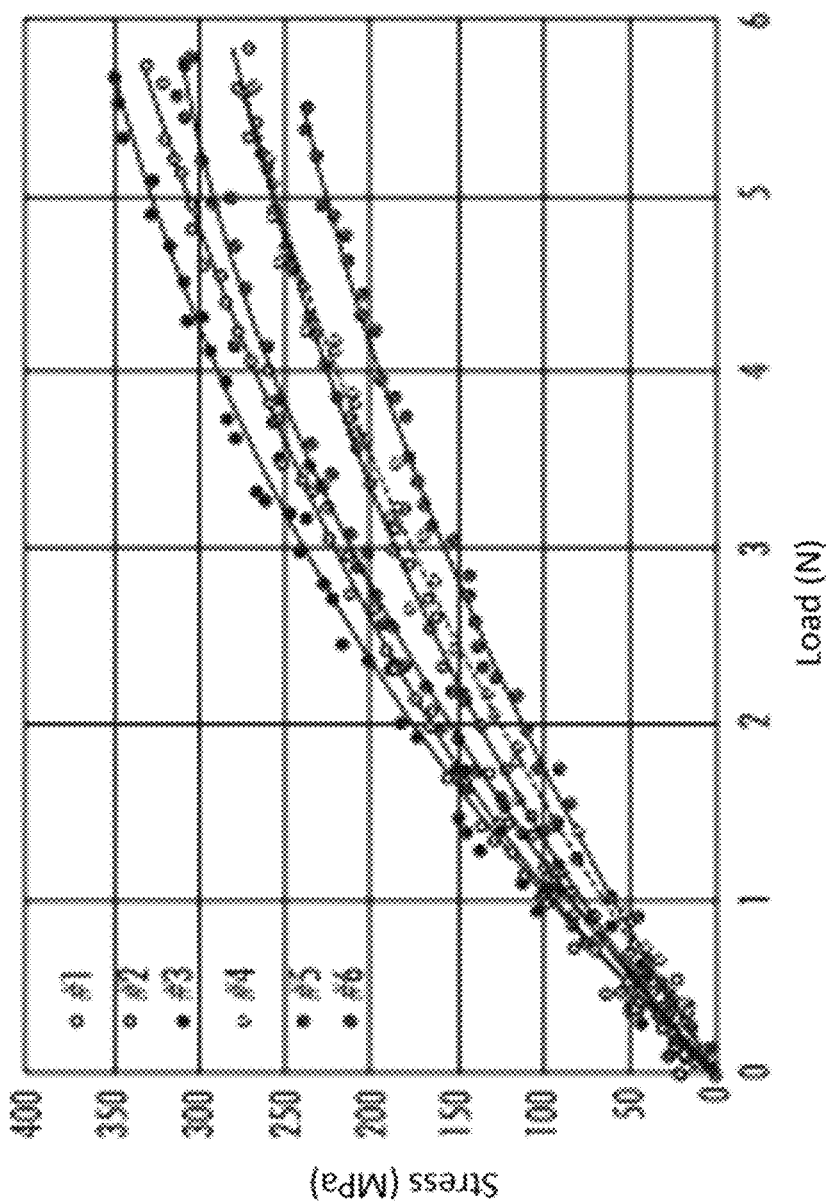
FIG. 2 is a plot of variation in load-stress at the tension side of a test panel with change in adhesive location between the panel
Figure 3:
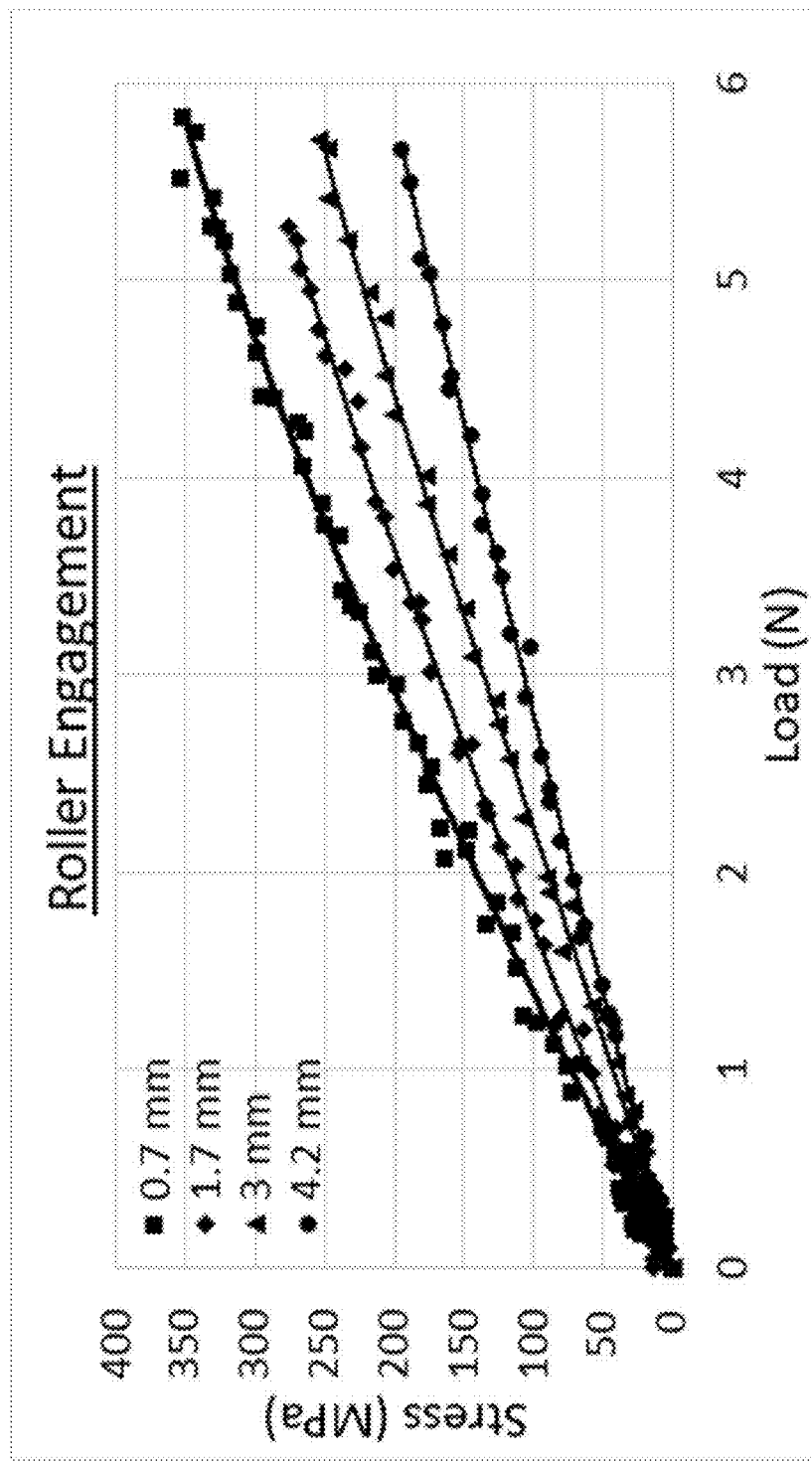
FIG. 3 is a plot of variation of load-stress at the tension side of the test panel with change in roller engagement location

Previous techniques for measuring edge stress and strength of ultra-thin glass sheets using three-point bending configurations produced highly variable results. These results were subject to substantial levels of variability based on a variety of factors, including, but not limited to, (a) failure prior to testing, (b) residue or dust in the system, (c) product variability (e.g., changes in panel thickness, adhesive properties/location), and (d) alignment, among others. These sources of variability resulted in incorrect strength measurements and resulted in unexpected product failure in the field. FIG. 2 and FIG. 3 show how changes in adhesive location and roller engagement result in variability in stress values. FIG. 2 is a plot of variation in load-stress at the tension side of a test panel with change in adhesive location between the panel. FIG. 3 is a plot of variation of load-stress at the tension side of the test panel with change in roller engagement location. An additional source of variability is the fact that the previous three-point bending configurations obtained results based on models of the glass sheets, not direct measurements of the strain on the surface of the region of the glass sheet at issue.

In contrast, the measurement apparatuses and methods disclosed herein provide real-time information on stress distributions in the sheet 204 being tested using Direct Image Correlation (DIC) full-field imaging techniques. Using DIC, one can measure strain on the surface of the sheet 204 in both in-plane orthogonal directions simultaneously as a function of time. Then, stresses can be determined from the measured strains and generate stress field map of the sheet. The direct measuring techniques disclosed herein are more accurate than the previous techniques and avoid the need to develop new calibration equations and models each time the glass sheet/panel is redesigned or reconfigured.

Examples of the uses of the ESMS described herein include, but are not limited to: (a) calibrating currently existing edge strength testers that do not have DIC capability; (b) investigating the failure modes of new glass sheet/panel designs as the test system has the flexibility to change various testing parameters such as roller engagement, sheet/panel angle, roller diameter, loading rate, etc.; and (c) optically making direct strain measurements during dynamic & continuous edge strength testing suitable for manufacturing plants.

Examples of benefits and advantages of the devices described herein include, but are not limited to:
  Direct full-field (optical) strain measurement on ultra-thin glass panels.
  Optical imaging for detection along with the full field stress mapping provides insight into the failure modes.
  Real-time stress visualization during dynamic, continuous edge testing suitable for deployment in manufacturing plants
  Improved analytical equations to obtain stress from measured strains.
  Novel material handling assemblies that provide enhanced optical visibility enabling the above-mentioned stress measurement.
  Ability to act as a calibration bench for existing edge strength testing devices.
  Ability to vary the testing parameters like roller diameter, engagement area, roller thickness etc. in order to develop new panel designs.
  Accurate stress measurements with accuracy of ±10% on measured stress Referring to FIGS. 4-7, 9B and 9C, an apparatus 200 for testing the edge strength of a sheet 204 of material is disclosed. The structures of the apparatus 200 described herein is an exemplary embodiment that is configured to optically measure strain in the sheet 204 when the sheet is in a no-load condition and when the sheet 204 is in a loaded condition. The loaded condition being produced by a 3-point bending load.

The apparatus 200 can include a plurality of assemblies 206a, 206b configured for selectively applying a 3-point bending load along an edge of the sheet 204 of material in a test region 208. Selectively applying the 3-point bending load means that the plurality of assemblies 206a, 206b are configured to apply or not apply the 3-point bending load as desired and also control the amount of load applied. The apparatus 200 also includes a detection mechanism configured for optically measuring strain in the sheet 204 in the test region 208 when the sheet 204 of material is in a no-load condition and when the sheet 204 of material is in a loaded condition. The strain in the loaded condition is produced by the applied 3-point bending load. The apparatus 200 also includes a processor 214 (see FIG. 9C) for determining stress in the sheet 204 based on the measured strain. The applied 3-point bending load on the sheet 204 produces a strain on the surface of the sheet 204 because the applied 3-point bending load bends the sheet 204.

The plurality of assemblies 206a, 206b (see FIG. 7) comprise two opposing assemblies 206a and 206b, where the first 206a of the two opposing assemblies comprise a single arcuate member 218 for engaging a first side of the sheet 204. The second 206b of the two opposing assemblies comprise two spaced-apart arcuate members 220a, 220b for engaging a second side 230 of the sheet 204 opposite the first side. The two spaced-apart arcuate members 220a, 220b define the test region 208 between the two spaced-apart arcuate members.

Figure 9A:
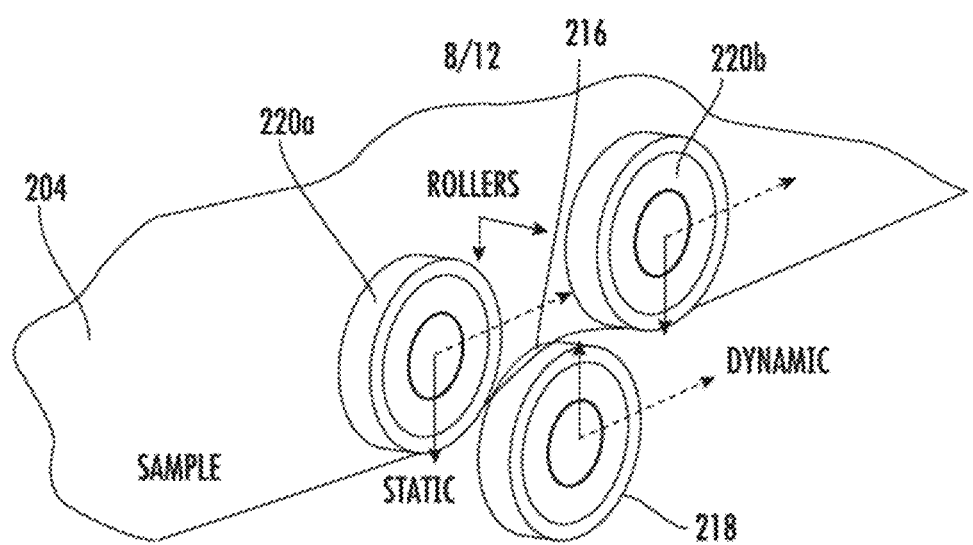
FIG. 9A is a schematic showing the dynamic mode of an apparatus as disclosed herein.

The arcuate members 218, 220a, and 220b can be rotatably mounted rollers, as shown in FIG. 9A, belt rollers, bearing rollers, or fixed bushings. Fixed bushing (e.g. non-rotating) structures are shown in FIGS. 4 and 5B. The fixed bushings are configured with an arcuate surface formed from a material having a low coefficient of friction (e.g., a fluropolymer resin). In a preferred embodiment of the test apparatus 200 of the present disclosure that incorporates the DIC feature, the two spaced-apart arcuate members 220a and 220b are fixed bushing structures for engaging the second side 230 of the sheet 204 as shown in FIGS. 4 and 5B. The non-rotating bushing structures are configured to have narrower width than the rotating roller embodiments so that the bushing structures provide wider space between the two arcuate members while the two contact points on the surface of the test sheet 204 are the same distance apart.

In some embodiments, the detection mechanism comprises a first optic system 222 for determining the strain on the surface of the test sheet 204 in the test region 208. The first optic system 222 utilizes the DIC technique to determine the strain. DIC technique is described in more detail below but essentially, DIC determines the strain by acquiring two images of an interested region of the test sheet 204: first image taken in a no-load condition, and a second image taken with the interested region of the test sheet in a loaded condition, i.e., under a 3-point bending load in the context of the present disclosure. The surface of the interested region is provided with some visual markers so that when the two images are compared, any displacement of the visual markers in the loaded condition image caused by strain (deformation) can be detected.

As mentioned, the sheet 204 can be a brittle material such as glass or glass ceramic. The 3-point bending load is enough to deform the sheet 204 of material. As shown in FIGS. 4-5B, and 7, in some embodiments, the plurality of assemblies 206a, 206b comprises a first assembly 206a positioned below the sheet 204 comprising a single arcuate member 218 for engaging a first side (the lower side) of the sheet 204 and a second assembly 206b positioned above the sheet 204 comprising two arcuate members 220a, 220b for engaging a second side (the top/upper side) 226 (see FIGS. 11A, 11B) of the sheet 204 opposite the first side. The two arcuate members 220a, 220b are separated by a minimum spacing S in order to provide a clear view of the test region 208 for the optic system. The actual dimension of the minimum spacing S will depend on the particular type of cameras and the size of the test region 208 that is determined by the particular arrangement of the arcuate members 220a, 220b, and 218 chosen.

Figure 13:
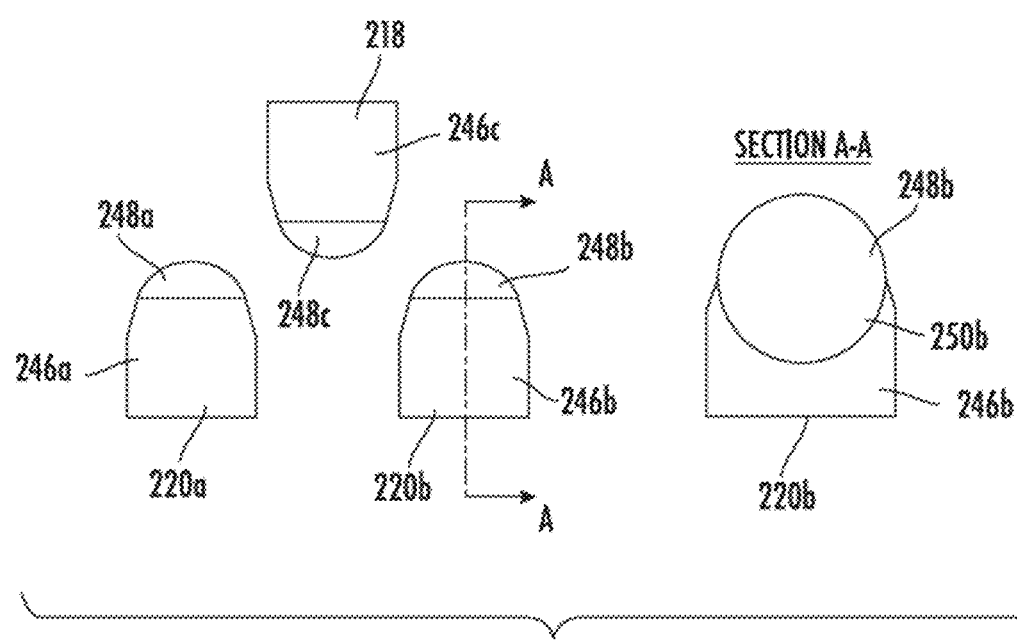
FIG. 13 shows a schematic of ball rollers that can be used in embodiments disclosed herein.

The arcuate members 218, 220a, and 220b are preferably structures that contacts the sheet 204 while the arcuate members and the sheet are moving relative to each other while imparting low friction at the contact surface. Some examples of such arcuate members are cylindrical rollers, as shown in FIGS. 7, 9A-9C, and 11A-11D, and bearing rollers as shown in FIG. 13.

Figure 12:
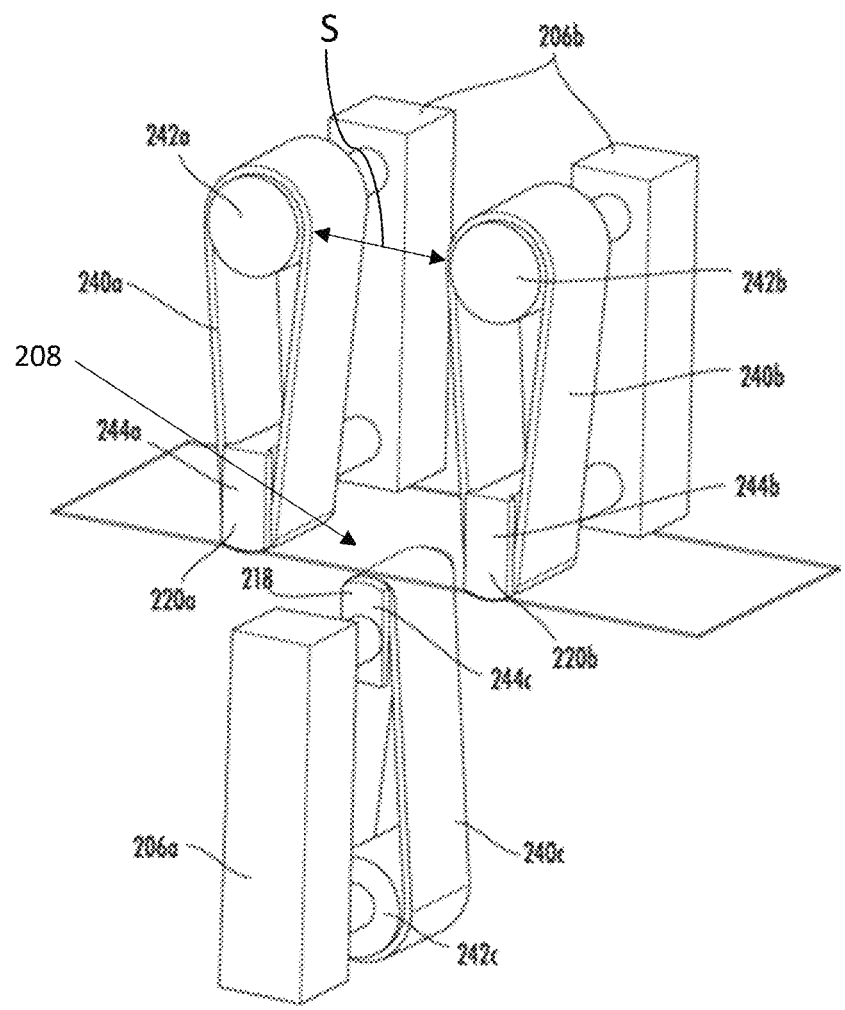
FIG. 12 shows a schematic of belt rollers that can be used in embodiments disclosed herein.

In belt roller embodiments, such as shown in FIG. 12, the arcuate members 218, 220a, 220b can be belt rollers 240c, 240a, 240b. In the belt roller embodiment, a belt 240a, 240b, 240c extends around a drive shaft 242a, 242b, 242c and an arcuate tensioner 244a, 244b, 244c. In some embodiments, the arcuate tensioner can be a cylindrical roller or a static, arcuate tensioner (such as a polished metal finger with an arcuate portion contacting the belt). In bearing roller embodiments, such as shown in FIG. 13, the arcuate members 218, 220a, 220b are bearing rollers 246a, 246b, 246c. In such embodiments, the bearing rollers 246a, 246b, 246c are formed from a roller ball 248a, 248b, 248c disposed and retained within a socket 250a, 250b, 250c.

In some embodiments, as shown in FIG. 9A, the single arcuate member 218 is vertically aligned between the two spaced-apart, arcuate members 220a, 220b. As used herein, "longitudinally" refers to the direction of motion of a sheet 204 passing through the test apparatus 200 (e.g., the machine direction).

Figure 9B:
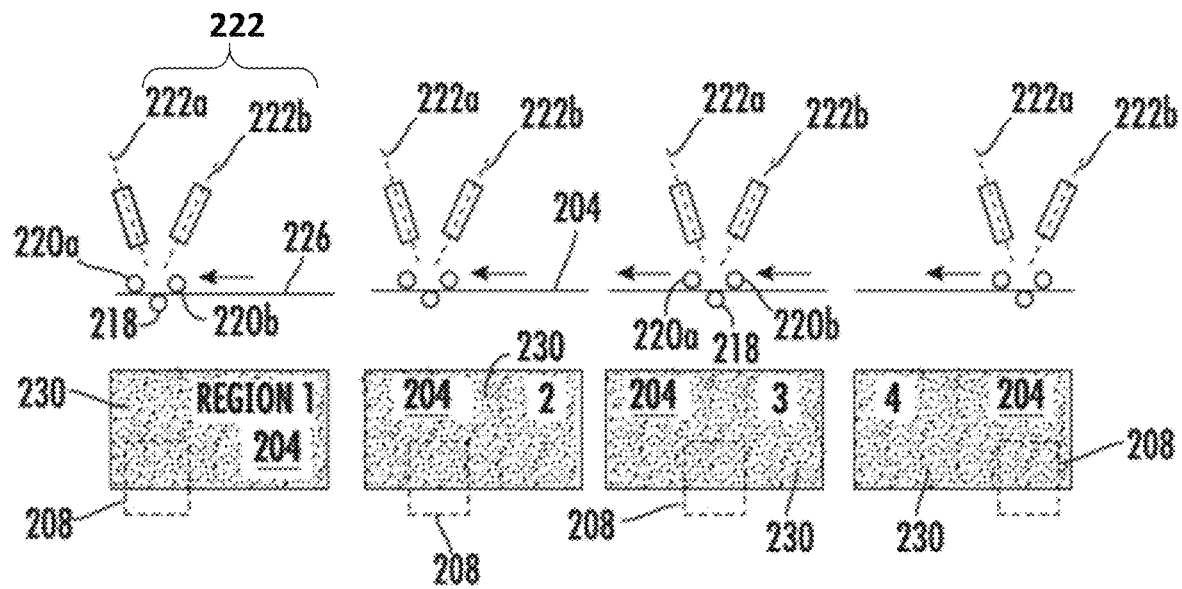
FIG. 9B is a schematic showing a sequence of regions being imaged as a sheet of material advances through the plurality of assemblies without a load.

Referring to FIG. 9B, in some embodiments, the optic system 222 comprises a first set of stereo (i.e. a pair) CCD cameras 222a, 222b positioned above the second side 226 of the sheet 204 to inspect the surface of the sheet 204 in the test region 208 between the two spaced-apart arcuate members 220a, 220b. The test region 208 is the region between the arcuate members 220a, 220b, under the two cameras 222a, 222b where the two cameras 222a, 222b are aimed to take digital images to make optical measurements. In other words, the test region 208 represents the field of view of the two cameras 222a, 222b. Also, the test region 208 is the region where the three arcuate members 221, 220, and 218 can apply a 3-point bending test load. Thus, the test region 208 represents the target area of the test apparatus for applying a 3-point bend test on a test sample. A test sheet 204 to be tested needs to be brought into the test region 208 for edge strength testing. The pair of cameras 222a, 222b In some embodiments, the test apparatus 200 can be operated in a dynamic mode. In a dynamic mode, the edge strength testing of the sheet 204 is conducted by passing the sheet 204 through a test region 208 of the testing apparatus 200. Alternatively, the testing apparatus 200 can be configured so that the edge strength testing of the sheet 204 is conducted by keeping the sheet 204 stationary and having the testing apparatus traverse over the sheet 204.

can include a plurality of assemblies 206a, 206b configured for continuously advancing the sheet of material through the test region 208 along an edge of the sheet 204. The plurality of assemblies 206a, 206b are further configured for applying a 3-point bending load on the edge of the sheet of material passing through the test region 208. The apparatus 200 also includes a detection mechanism configured for optically measuring strain on a surface of the sheet passing through the test region 208, where the strain is produced by the applied 3-point bending load. The apparatus 200 also includes a processor 214 for determining the stress in the sheet 204 passing through the test region 208 resulting from the applied. The stress is determined based on the measured strain. The applied load on the test region 208 produces a strain on the surface of the test region 208 because the applied 3-point bending load bends the sheet 204 in the test region 208.

[Digital Image Correlation (DIC)]

The DIC feature of the testing apparatus 200 will now be described in more detail with reference to FIGS. 9B and 9C. DIC involves point tracking. It is a full-field optical technique for obtaining displacements and thereby strains. In some embodiments, the surface of the second side 226 is applied with a surface pattern 230 as visual markers to facilitates the strain measurements in both no-load state and the loaded state. In the loaded state measurement mode, the load imposed on the sheet 204 in the test region 208 causes the surface of the second side 226 of the sheet 204 to deform which, in turn, distorts and displaces the surface pattern 230 on the second side 226 of the sheet 204. The surface pattern 230 can be an array of dots or points applied on the surface being monitored that will serve as visual markers for the purposes of measuring the strain in the sheet 204. The array of dots or points can be in any pattern, regular or random. The image of the surface pattern 230 on the sheet 204 taken in the no-load condition serves as the reference point for determining the displacement of those reference points caused by the distortion of the surface pattern 230 resulting from the subsequent application of the 3-point bending load. The first set of stereo cameras 222a, 222b in the optic system 222 observes the distortion of the surface pattern 230 and the image data can be used to determine the amount of strain in the sheet 204.

In order to make the determination of the amount of strain in the sheet 204 from the distortion of the surface pattern 230, the amount of the distortion needs to be quantified. This is achieved by comparing the image bearing the distorted surface pattern 230 on the top surface 226 of the test sheet 204 to a reference/registration image of the second side 226 in a no-load state where the surface pattern 230 is not distorted.

Whether the apparatus 200 is operating in a static mode or a dynamic mode, an image of the surface pattern 230 in a no-load state is recorded as a reference or a baseline state using the optic system 222. The reference image is used to register the original location of the various points in the surface pattern 230. Then, the new location of the registered points is tracked in the loaded state image. If the top surface 226 is distorted from the applied load stress, many of the registered points on the top surface 226 will have displaced from their original location. By correlating the registered points in the two-image data, the processor 214 can determine and quantify the deformation, i.e. the strain. The algorithms for performing such digital image correlation is well known in the art and more detailed discussion is not necessary here.

The surface pattern 230 can be printed on the top surface 226 or projected as an image on the top surface 226 or sprayed on as random pattern on the top surface 226 or etched on using chemical treatment on the top surface 226 or pasted on with manufactured thin film having a pattern on the top surface 226. Nanoparticles can be sprayed on the top surface 226 using airbrush. The pattern 230 can be a speckle pattern or a grid pattern.

In some embodiments, the surface pattern 230 can comprise a coating of a mixture, or a blend of black and white dots to form a speckle pattern. The stereo cameras 222a, 222b and/or 224a, 224b with proper lensing are used to record the image of the surface pattern 230 during the test. The coating of the speckle pattern 230 can be made using oil based black and white spray that produce fine mist resulting in speckles with each speckle covering 5-7 µm. The paint layer was ensured to be less than a few microns so that it doesn't affect the results. A white light LED lamp was used to illuminate the region of interest for optical inspection by the stereo cameras.

There are two ways of using DIC for edge strength measurement: one is measuring the strain on the sample's top surface and the second is measuring the strain on the edge surface. The illustration in FIG. 9D identifies the top surface 226 and the edge surface 204e on a test sheet 204. The edge strength measured from both approaches should be the same since the stress is continuous at the edge boundary. This is illustrated in FIG. 9E which shows a 3D stress plot on the edge and top surfaces of a test sheet. The gradients in the image represented by the difference in the darkness of the shading show that the stresses on the top and edge surfaces are continuous. The darkness of the shading in the gradients represent different stress levels but the actual stress values are not important for the purposes of this disclosure.

[Alternative Way of Speckle Coating and Method to Perform Dynamic DIC Thereof]

If the test sheet 204 is coated with visible speckle dot surface pattern 230, that glass sheet is not usable for consumer application even if it survives the edge strength test screening. To circumvent this, one could use non-visible speckles that are visible to specialized optical systems employed by the apparatus (e.g., ultraviolet light, fluorescent imaging, infrared light, or another non-visible portion of the electromagnetic spectrum). Alternatively, one can project speckle dots on the test sheet 204 using lasers and these speckle dots can be tracked by the cameras during the test. The dot pattern can be random.

Exemplary embodiments have been described directed to a method for the continuous measurement of the breaking strength of a glass edge by putting the edge under stress, such that stresses away from the edge are significantly less than the breaking strength at their respective locations. Additionally, using exemplary embodiments both sides of an edge can be subject to substantially the same tensile stress during the measurement. One method to provide this continuous stress has been described in detail (e.g., opposed and offset rollers), but the claims appended herewith should not be so limited as it is envisioned that acoustic energy and/or infrared energy (both coherent and incoherent) can also be used for the same purpose to induce stress at the edge of a glass sheet. For example, focused ultrasound can be used to induce stress at a glass edge and measurements taken therefrom using the apparatuses and methods disclosed herein. Further, IR irradiation using a laser or other means (at a spectrum in which a respective glass material may have significant absorption) may also be used to induce stress at a glass edge and exemplary measurements taken therefrom using the apparatuses and methods disclosed herein. Additionally, exemplary embodiments provide a continuous high speed nature which results in at least a 30× increase in processing speed, at least a 3× increase in the amount of edge tested, and orders of magnitude of sheets processed and tested over conventional methods. This increase in statistical sampling can thus guarantee less leakage to the customer and is amenable to online configurations.

[Top Surface DIC]

Figure 3A:
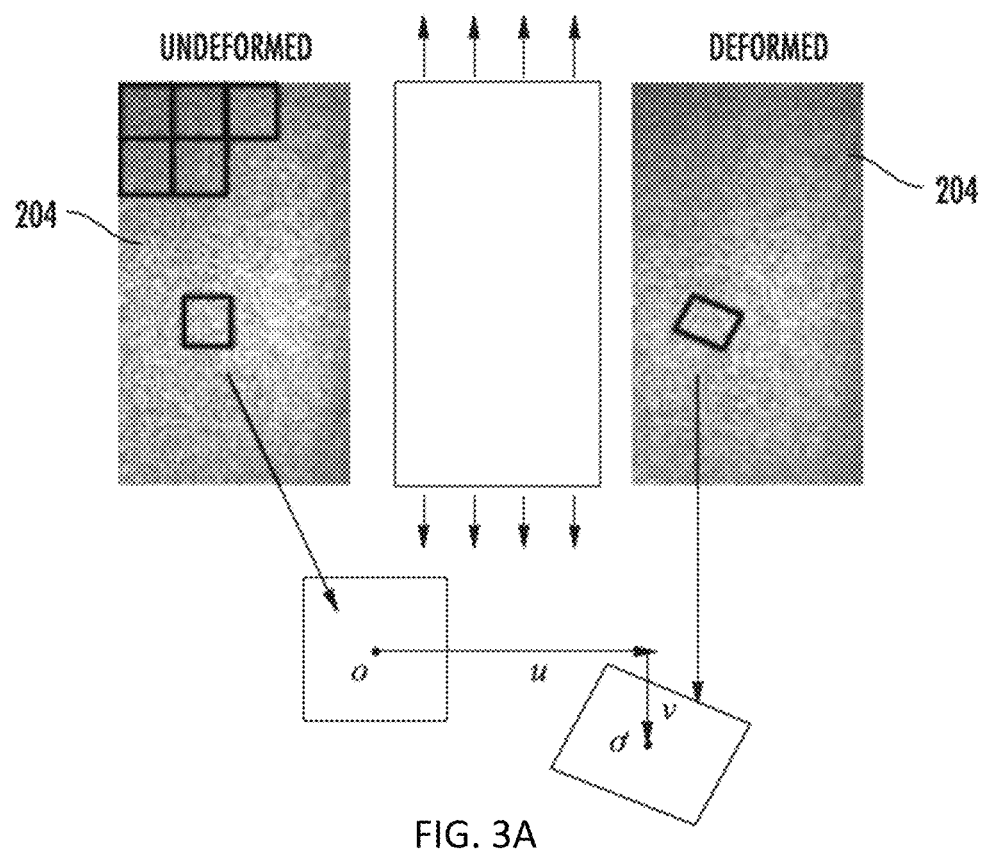
FIG. 3A is a schematic illustration of the basic principle of digital image correlation (DIC) process that is used in the edge strength testing method described herein.

The basics of the optical methodology DIC is shown in FIG. 3A. By comparing the images at each time intervals (over increasing load or before and while load is applied), the displacement of the speckle dots can be tracked. This provides a displacement map which can be differentiated to obtain strains. This 3D DIC technique can be used to obtain 3D strain fields. Using the two (x and y directions) in-plane strain fields the bending stresses can be determined using Equation (1):

$$\sigma_{xx} = \frac{E(\epsilon xx + u\epsilon yy)}{1 - v^2} \quad (1)$$

where, E is the Elastic modulus, ∈xx is the strain along the bending direction (x), ∈yy is the strain along the other in-plane principal axis (y), and u is the Poisson's ratio. The previous practice of stress conversion neglects the biaxiality of the stress state and uses the Hooke's law for uniaxial stress condition. This provides less information than the DIC technique described herein and oversimplifies the results.

[Vertical Edge Surface DIC]

Figure 14:
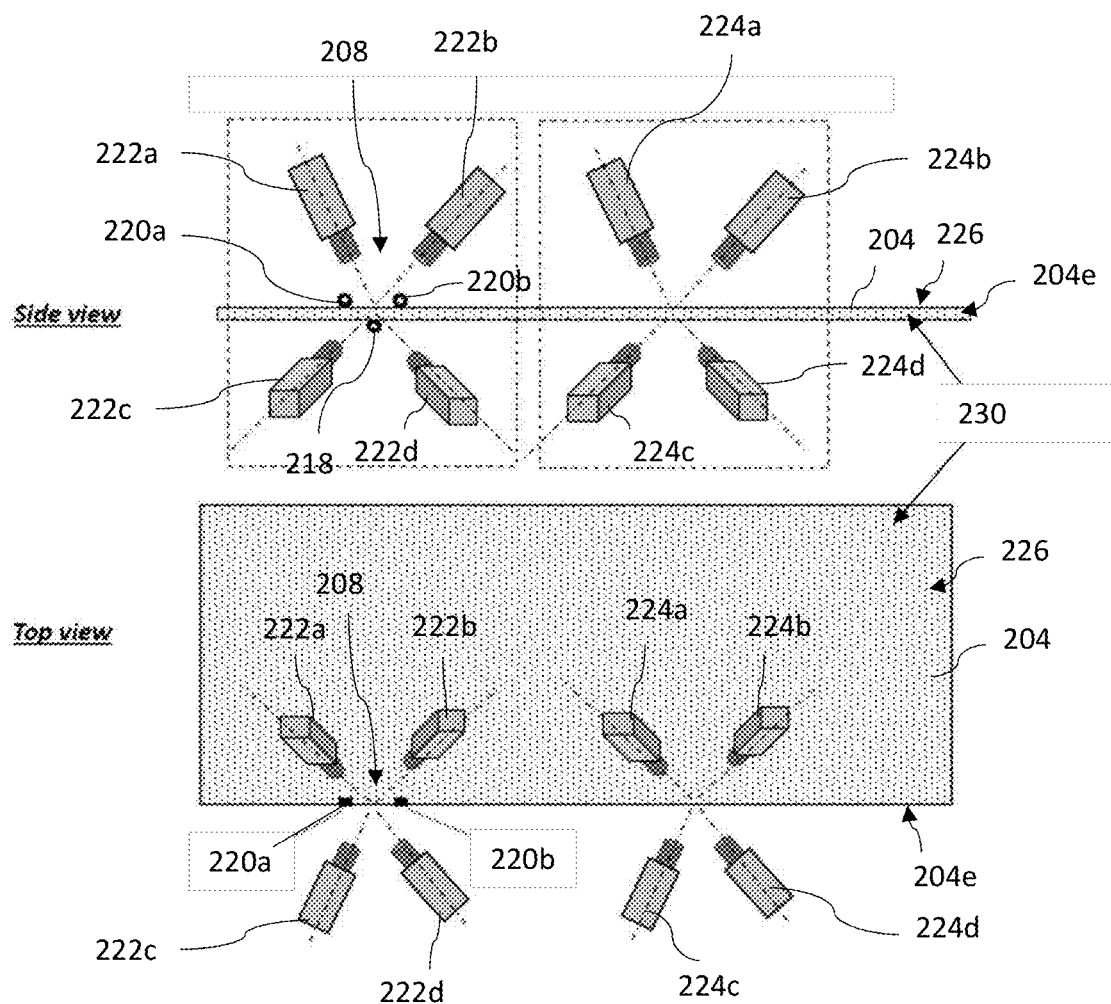
FIG. 14 shows schematic side view and top view illustrations of a configuration for cameras for monitoring both the horizontal top surface of the test sheet along the edge and the vertical edge surface of the test sheet according to another embodiment of the DIC system of the present disclosure.

Referring to FIG. 14, a series of 3-point bending tests were carried out on test sheets 204 while monitoring the vertical edge surface 204e of each test sheet 204 using DIC. In these tests, the test sheets 204 had laminated structures such as display panels. The thickness of the test sheets was about 200 μm. Speckle patterns 230 were made on the vertical edge surface 204e of the test sheet 204. When testing certain types of test sheets 204 such as those having laminated structures, it may be more desirable to conduct the optical monitoring on vertical edge surface 204e rather than the top (horizontal) surface of the test sheet 204.

FIG. 14 shows a schematic illustration of an embodiment of the camera configuration for the optic system 222 of the test apparatus 200 enabling DIC that can optically measure the strain along the vertical edge surface 204e during 3-point bending test according to an embodiment. In this embodiment of the test apparatus 200, a second set of at least one camera 222c, 222d is provided aimed at the vertical edge surface 204e of the test sheet 204. The at least one camera 222c, 222d is aimed at the vertical edge surface 204e in the test region 208 between the two spaced-apart arcuate members 220a, 220b. In a static operation mode of the test apparatus 200, the at least one camera 222c, 222d can be used to obtain optical images of the vertical edge surface 204e in both the no-load condition and the loaded condition. Although, a pair of cameras 222c, 222d are illustrated in FIG. 14 observing the vertical edge surface 204e in the test region 208, when observing the vertical edge surface 204e, a single camera can be utilized because the vertical edge surface 204e is flat even when the 3-point bending load is applied. Because the vertical edge surface 204e is flat, a 3D view using two cameras is not necessary.

FIG. 14 also shows a second set of at least one camera 224c, 224d that is aimed at the vertical edge surface 204e but at a location away from the test region 208. Similar to the pair of cameras 224a, 224b, the second set of at least one camera 224c, 224d can be used for obtaining optical image of the vertical edge surface 204e in a no-load condition when the test apparatus 200 is operating in a dynamic mode. Again, although a pair of cameras 224c, 224d are illustrated in FIG. 14, a single camera can be utilized for observing the vertical edge surface 204e. The processor 214 is connected to the cameras 222c, 222d, 224c, and 224d and the processor 214 can control the cameras as well as receive and process the optical images from the cameras.

Several methods of producing fine speckle patterns were developed. In one embodiment, a fine brush with liquid paint was used to make a layer of paint on the edge surface. Then, a lens tissue was used to make a pattern on the edge surface. The lens tissue has a fine random pattern at microscale, and the area with fiber absorb paint, and the area without fiber leaves the paint on the edge surface. This technique provides good speckle pattern for imaging. Another technique for making fine speckle pattern is using nanoparticles for speckle pattern manufacturing. However, the agglomeration affects the quality of the speckle pattern. The quality is not very reliable and stable.

Figure 3B:
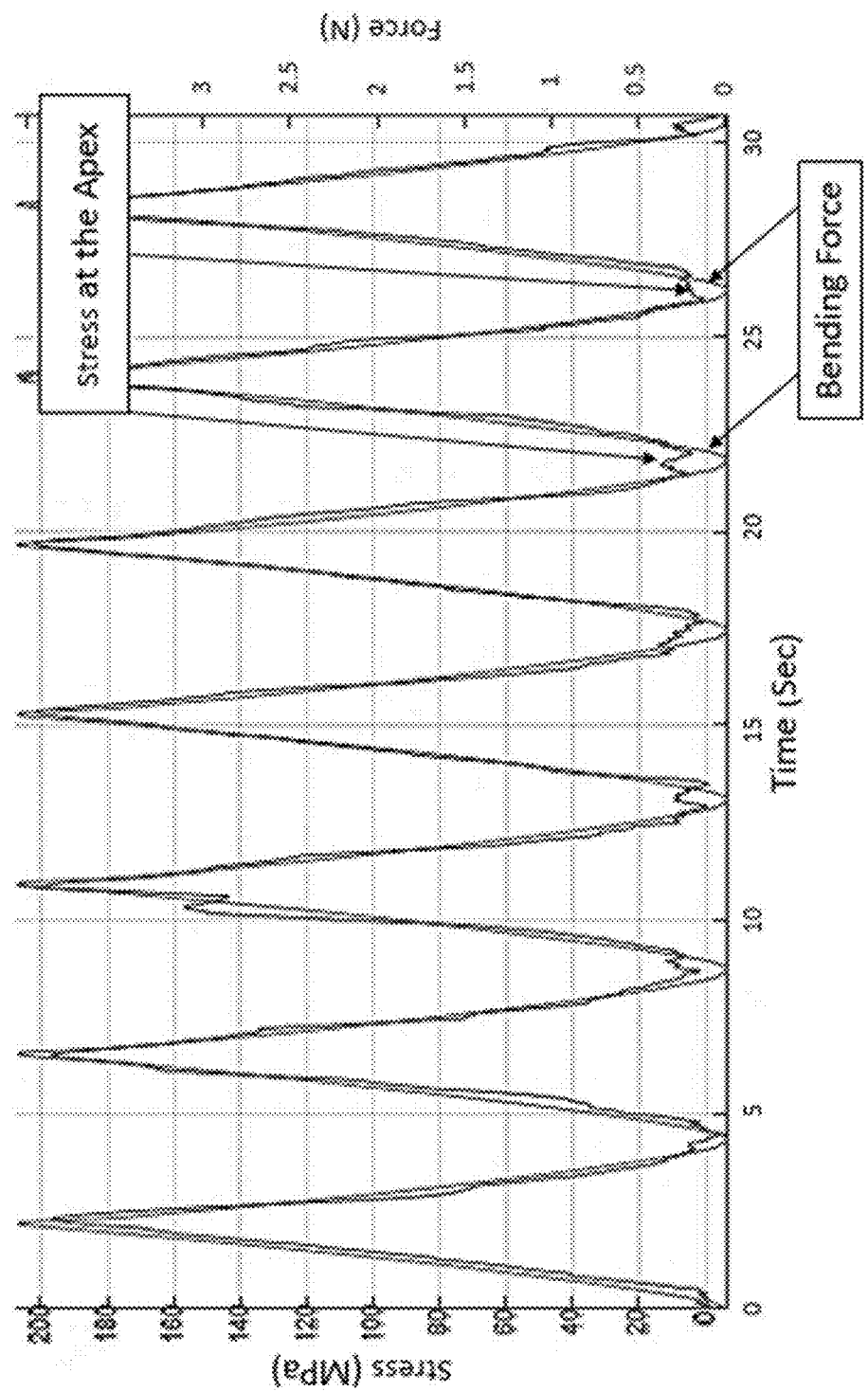
FIG. 3B is a stress vs. time plot showing the repeatability study for the DIC at the same location during load cycling.
Figure 3C:
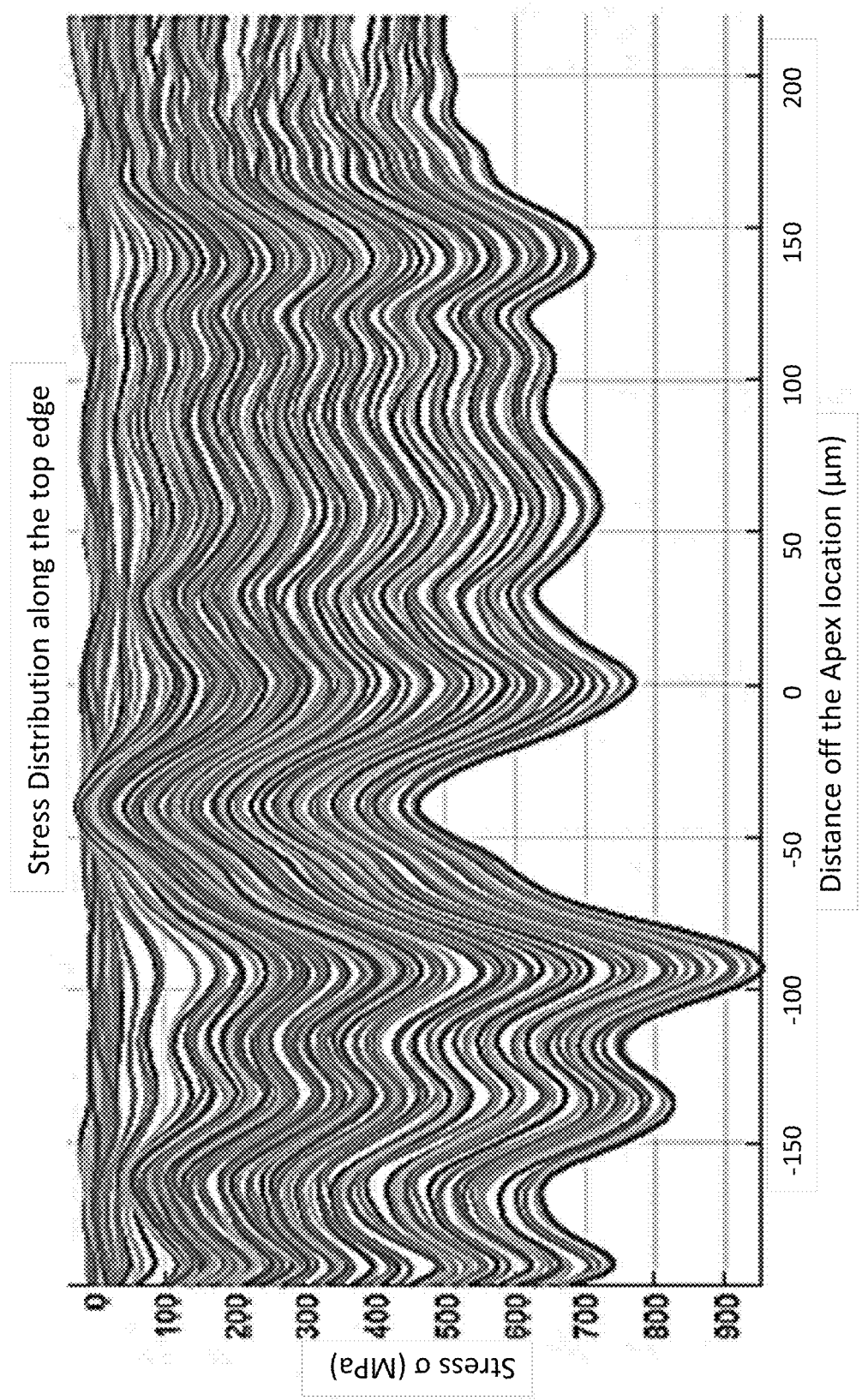
FIG. 3C shows the stress distribution along the top edge during 3-point bending.
Figure 3D:
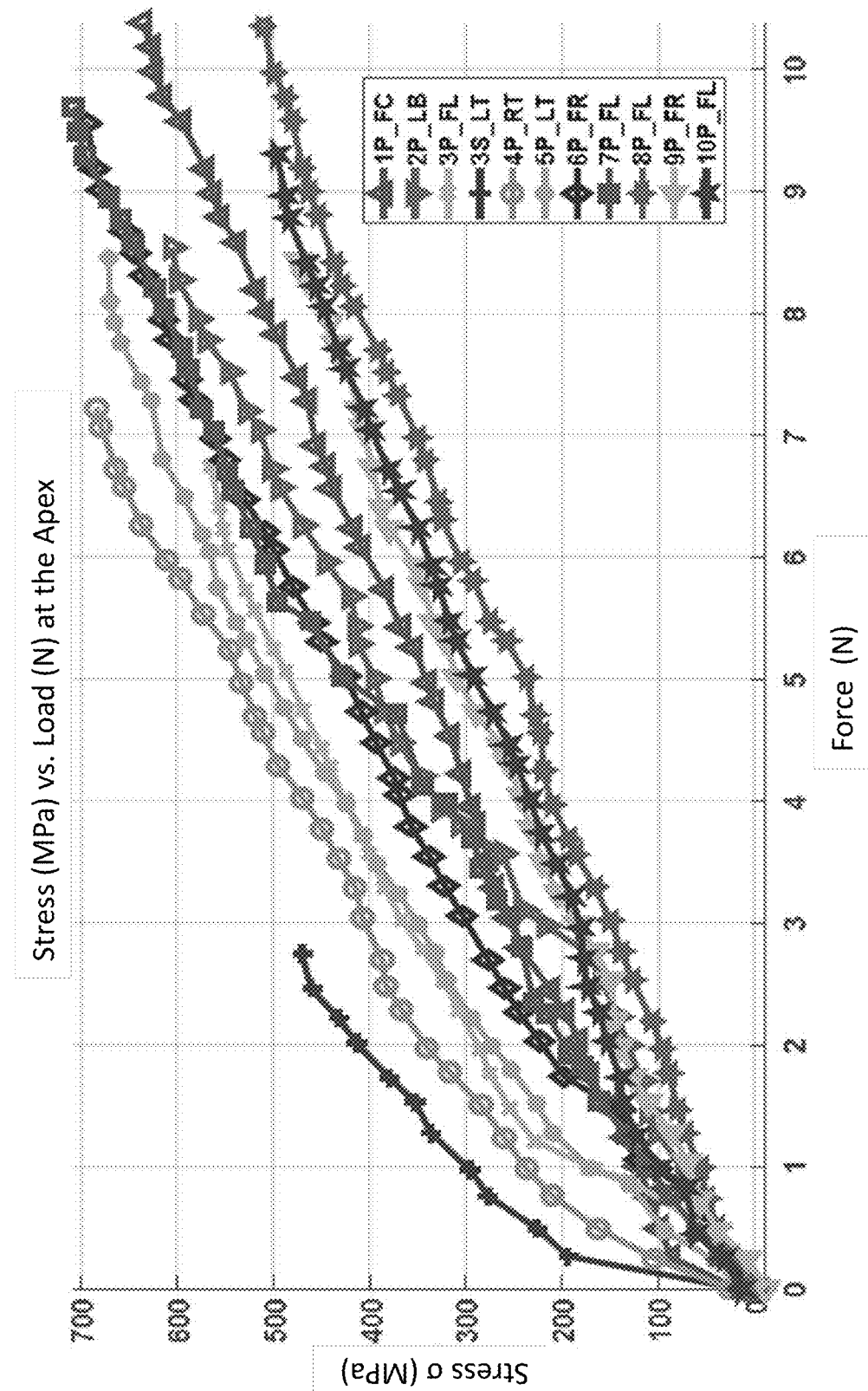
FIG. 3D shows the overall load-stress curves of the test samples in the repeatability study for the DIC.
Figure 6:
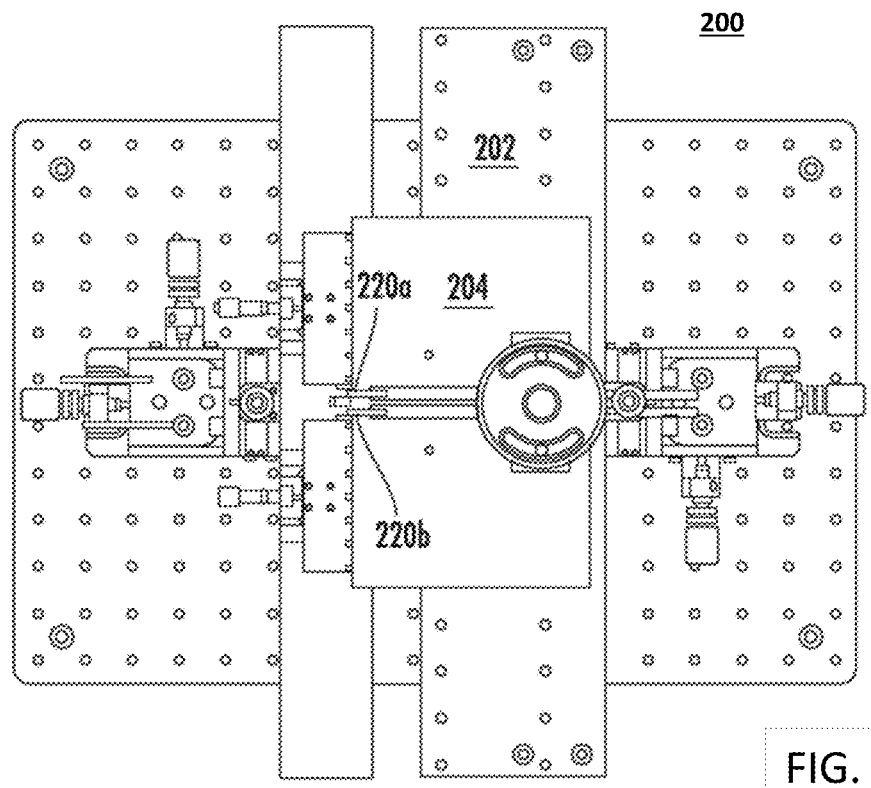
FIG. 6 is a top view of the apparatus shown in FIGS. 4 and 5A.
Figure 7:
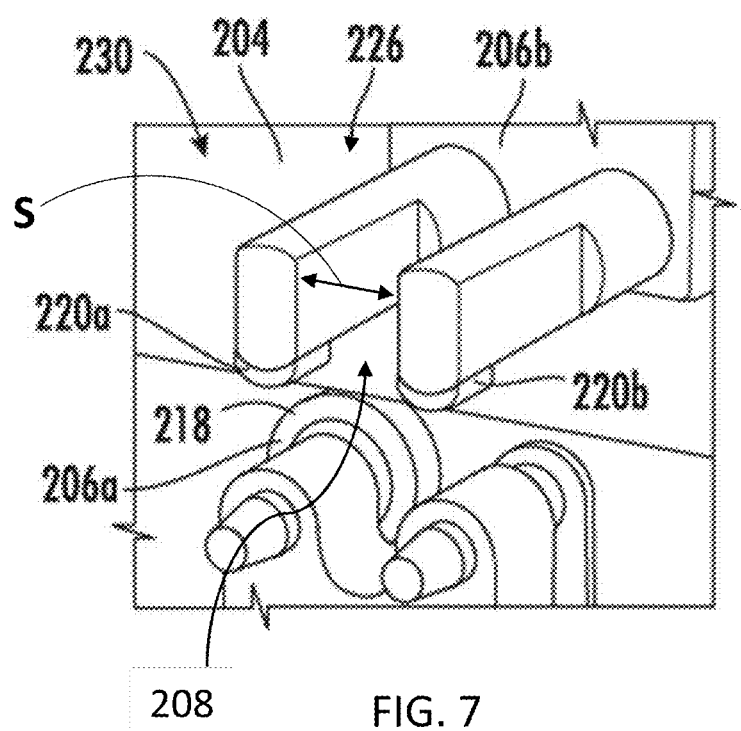
FIG. 7 is a close up view illustration of one arrangement of the assemblies for making the 3-point contact with an edge of the test sheet to bend the test sheet for testing the edge strength according to an embodiment of the present disclosure.

FIG. 3B shows the repeatability study for the DIC at the same location during load cycling. It shows that the repeatability of DIC on the edge is stable. The accuracy of DIC is in ±10 MPa as we can see at load-free state. Using edge surface DIC, it was observed that the failure mode of the panel is mostly due to stress concentration. FIG. 3C shows the stress distribution along the top edge during 3-point bending. The individual curves are the stress distribution along the top edge at different loads. FIG. 3C shows the stress distribution from loading to the point of the test sheet 204 breaking. From those curves, it can be seen that the defects along the edge affect the stress distribution. FIG. 3D shows the overall load-stress curves of the test samples. It should be noted that edge surface DIC is done at high magnification. The resolution of one pixel is about 0.5 μm, the stress is localized at the Apex location. The variation is due to edge defects, accuracy of Apex location, and sample variations such as thickness, intrusion, layer different, sealing stage and others, In some embodiments, a conventional acrylic paint can be used to form very thin (few microns) coating of the speckle surface pattern 230 on the glass sheet 204. As the modulus of the paint is at least an order less than the glass sheet 204 and its thickness is couple of orders lower than the glass sheet 204, the effect of the pattern on the measurements is negligible. The use of such surface patterns in digital image correlation is well known in the art and more detailed discussion is not necessary here.

The top surface and edge surface DIC can be performed statically or dynamically. Static DIC measures the load-to-stress correlation at a fixed location along the edge of the test sheet 204. Dynamic DIC measures the load-to-stress correlation along the entire length of the edge of the test sheet 204. Static DIC is easy to perform, but can only measure a single location at a time. Dynamic DIC is more complex to perform, but can measure the entire length of the edge of the test sheet 204. Static DIC works best for samples such as monolithic glass where the correlation doesn't change with respect to edge location. Dynamic DIC works best for samples such as panels having laminated structure where the correlation may vary.

[ESMS Static Mode—Edge Strength Tester with Real Time Stress Measurement]

In a static mode embodiment, the first set of stereo cameras 222a, 222b are used to obtain both the no-load measurement and the loaded measurement in a stepwise manner. A surface pattern 230 of visual markers is provided on the top surface 226 of the test sheet 204. The test sheet 204 is moved in a stepwise manner through the test region 208 of the test apparatus stopping when the particular region of the sheet 204 to be tested is brought into the test region 208 so that the no-load and loaded measurements can be taken.

In this example, four different regions to be tested (Regions 1, 2, 3, and 4) along an edge of the sheet 204 are brought into the test region 208 by moving the sheet 204 from right-to-left motion as illustrated in FIG. 9B. To test the test Region 1, which is on the left-most portion of the bottom edge of sheet 204, is brought into the test region 208. To test the test Region 2, which is a little to the right of Region 1, the sheet 204 is moved to the left in the direction of the arrows in FIG. 9B. Similar steps are repeated to test Regions 3 and 4. This initial step is carried out without any vertical load being applied by the upper arcuate members 220*a*, 220*b*. For 3-point bending test, the load applied is increased until a predetermined load is reached or until a failure of the sheet 204 is detected. The first optic system 222 includes at least two cameras 222*a*, 222*b* in order to optically inspect and detect deformation of the sheet in the no-load measurement and the loaded measurement.

Figure 9C:
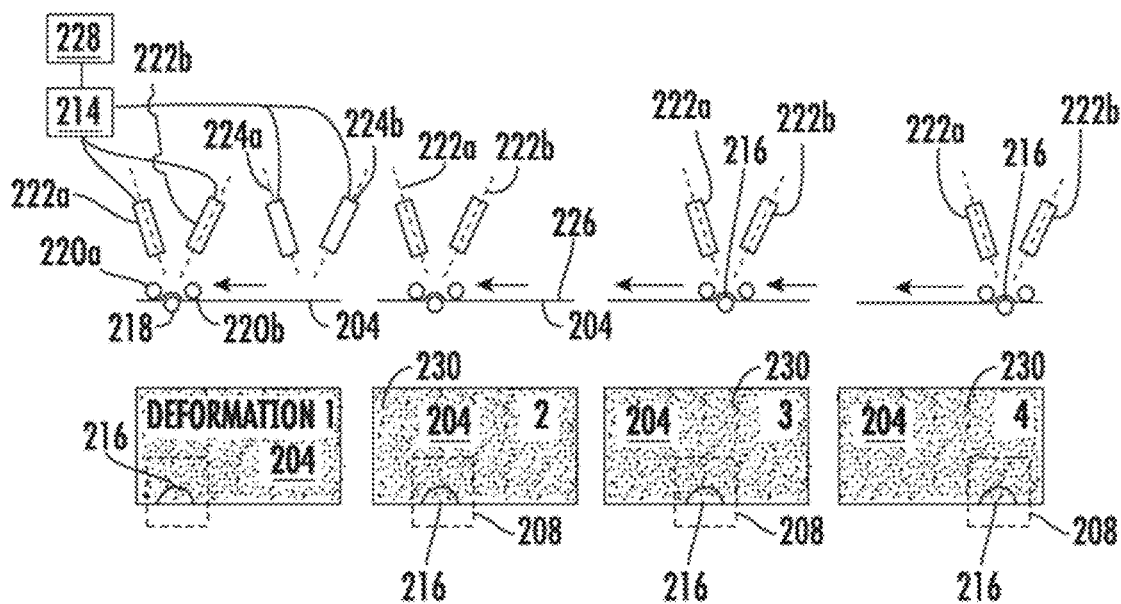
FIG. 9C is a schematic showing a sequence of regions being imaged as a sheet of material advances through the plurality of assemblies with an applied load.
Figure 9D:
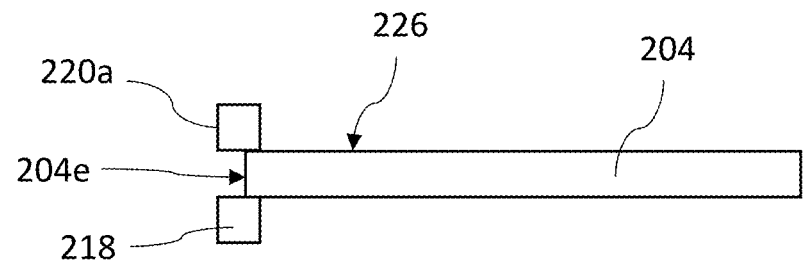
FIG. 9D is a schematic illustration showing two ways of using DIC for test sheet stress measurement: measuring the stress on the test sheet's top surface and measuring the stress on the vertical edge surface.
Figure 9E:
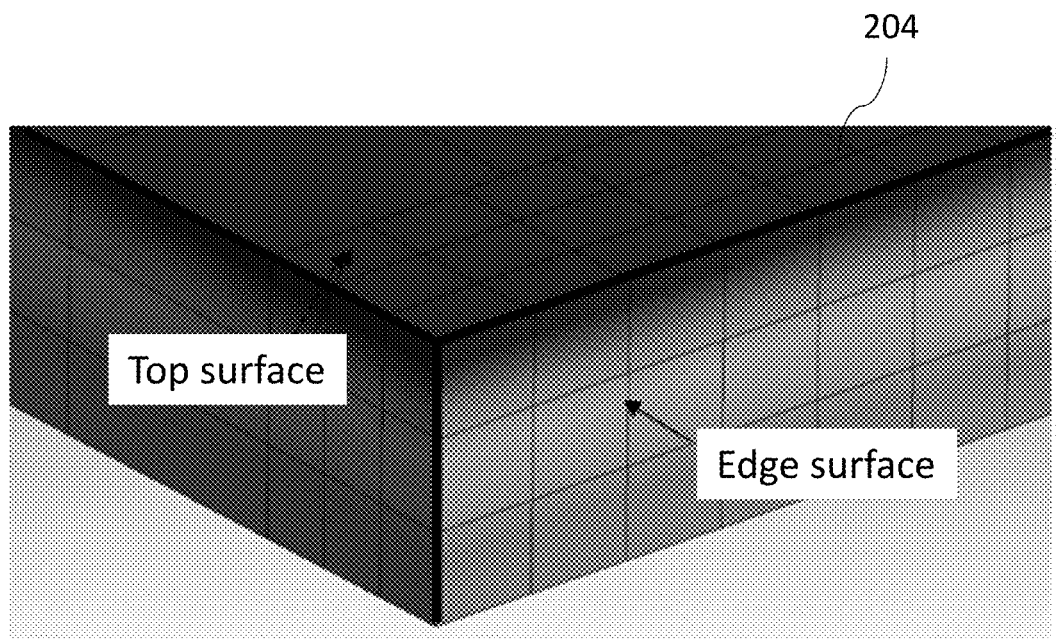
FIG. 9E shows a 3D stress plot on the edge and top surfaces of a glass test sheet.

The loaded state of the test apparatus for each of the test Regions 1-4 illustrated in FIG. 9C. In the loaded state, a vertical load is applied either by the two top arcuate members 220*a*, 220*b* or by the single lower arcuate member 218. Either way, the applied load causes the sheet between the arcuate members to bend. Each of the four loaded states corresponding to the Regions 1-4 are labeled as Deformation 1, 2, 3, and 4, respectively.

In the static mode, the no-load measurement and the loaded measurement can be made back to back at each of the four test regions. Alternatively, the no-load measurements for the four Regions 1-4 can be made first, then the sheet 204 can be moved back to the initial position and then the loaded measurements can be made for each Deformation 1, 2, 3, 4 states by moving the sheet 204 through the test region 208.

Combining the 3-point bending based edge strength testing technique and the optical method of DIC with appropriate design modifications, it is possible to make real time stress measurements while strength testing the edge of an ultra-thin monolithic or laminate glass structure (e.g., a sheet of material).

Any form of optical measurement, including DIC feature, requires a clear direct optical view of region of interest on the test sheet 204 in the test region 208 for the measurement. In earlier systems (e.g., U.S. Patent Application Publication No. 2018-0073967) there was no direct stress measurement and their design did not allow for a clear optical pathway to the region of interest because the rollers blocked the path. According to the present disclosure for DIC implemented embodiment of the testing apparatus 200, the arcuate members 220*a*, 220*b* are modified to allow clear optical pathway to the region of interest for the cameras. See FIGS. 4-7, 9A-9C, and 11A-11D. This modification and the resulting improvements are also present for the testing apparatus 200 whether the apparatus is operated in a static DIC mode or a dynamic DIC mode. The key design considerations were:

- The top rollers (the arcuate members) 220*a*, 220*b* were changed from a wheel to a partial section. Specifically, the partial section width was minimized for maximum optical pathway while maintaining the required contact area on the glass sheet 204 of a full roller. See FIGS. 5A and 5B.
- Fine micrometer level adjuster 232 was incorporated for x, y, z axis control to enable precision alignment of glass to rollers/upper partial sections for studying the effects of engagement. See FIGS. 5A and 5B.
- Fine micrometer level adjustment 234 was incorporated for axis control to enable precision alignment of glass to rollers/upper partial sections for studying the effects of skew. See FIGS. 5A and 5B.
- The two halves of the fixture and the partial sections were all pinned with dowels 236*a*, 236*b* to insure initial test alignment. See FIGS. 5A and 5B.

Figure 8A:
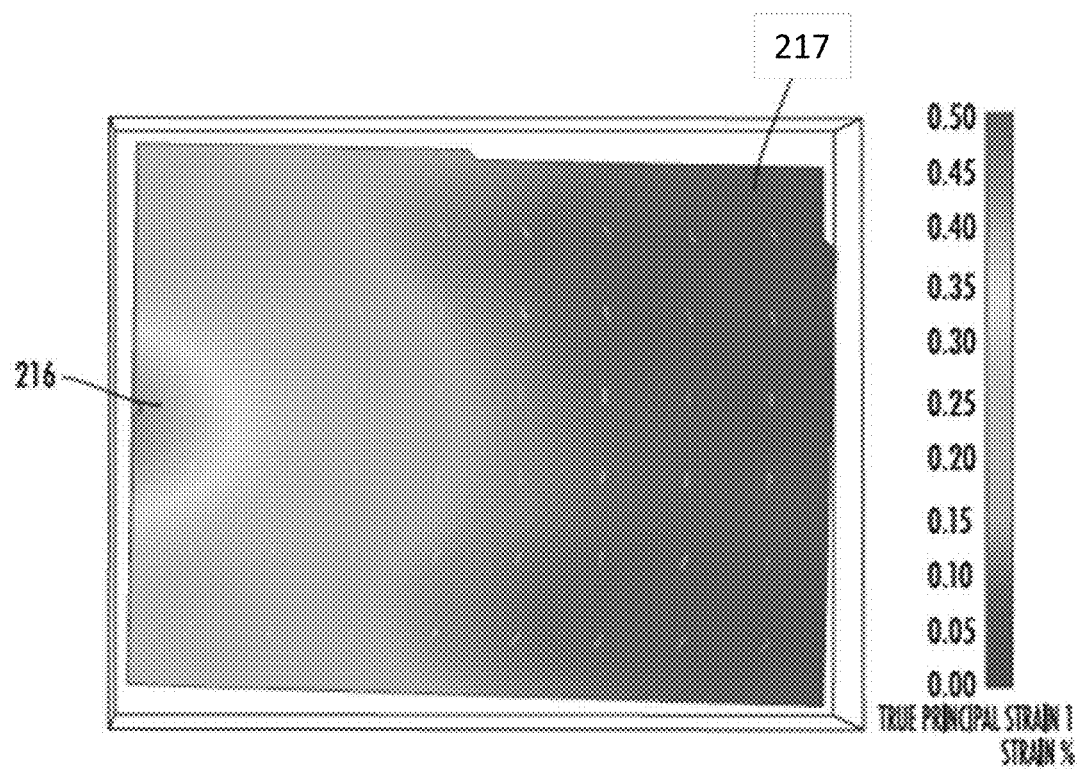
FIG. 8A is a sample strain field obtained at a load of 6N.
Figure 8B:
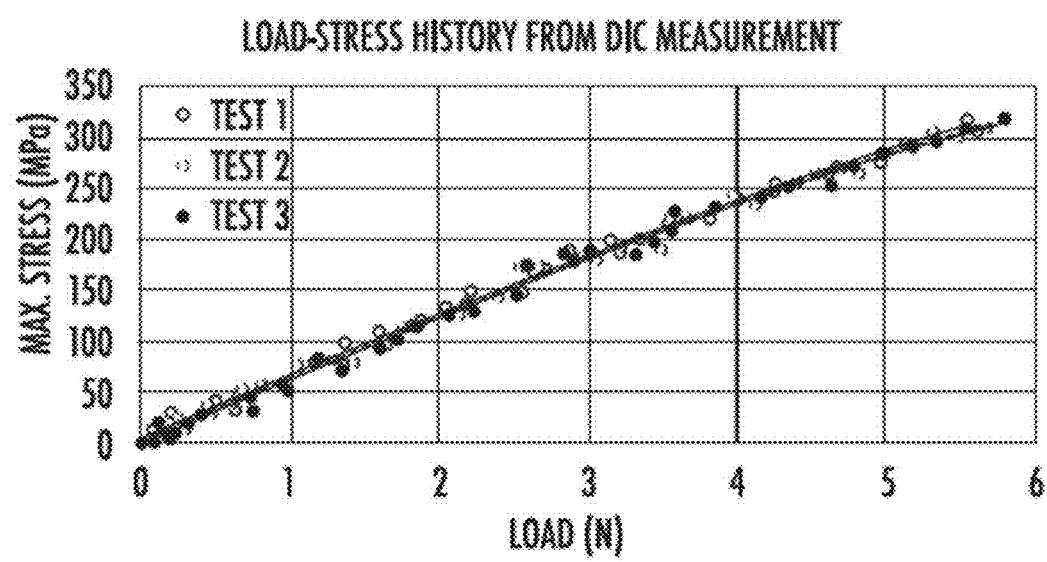
FIG. 8B is a chart showing the maximum stress through a test in static mode.
Figure 8C:
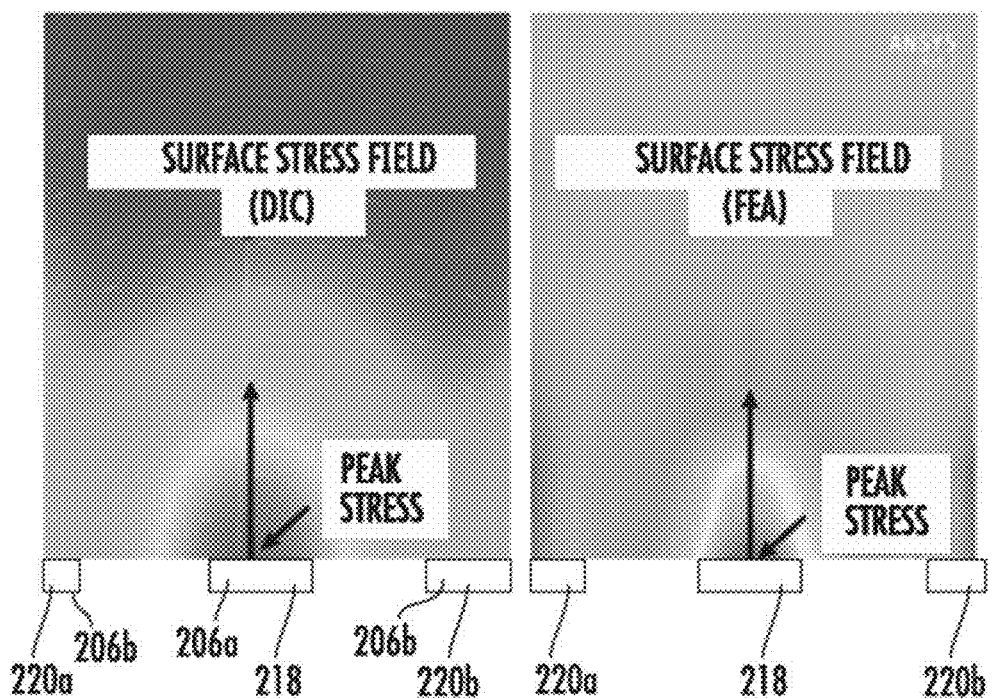
FIG. 8C shows a comparison of stress fields generated using a digital image correlation (DIC) apparatus disclosed herein compared with stress field results generated using finite element analysis (FEA).

With a clear optical pathway to the test region 208 now available, an optical system was designed that employs the techniques of DIC to make real time direct stress measurements. Two 4 megapixel commercial monochrome cameras fitted with specialized lens systems were used to view a 7 mm×7 mm test region 208 near the edge of the glass sheet 204. The samples were coated with a random black and white dot surface pattern 230 so that the dots were about 5-7 pixels in size and the thickness of the coating did not exceed few microns. Using the stereo camera system, a series of images (150-200 pairs of images at 4 frames per second) was recorded during an edge testing experiment. This series of images was correlated to yield the strain fields and thereafter using the Equation (1), stresses were obtained. An example of the stress field obtained at a load step of 6N along with the history of maximum stress throughout a test is shown in FIG. 8C. It is believed that this kind of stress visualization/measurement was never done before. The results were correlated with numerical simulation (e.g., finite element analysis) and a good agreement is seen as shown in FIG. 8C.

Figure 40:
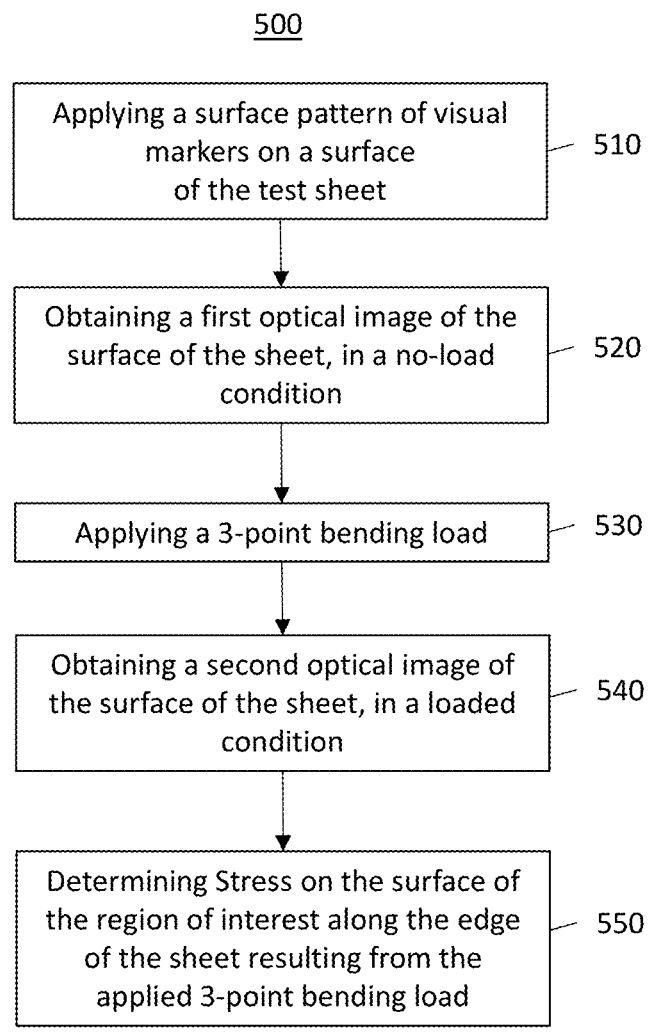
FIG. 40 is a flowchart illustrating a method according to an embodiment of the present disclosure.

Referring to the flowchart 500 in FIG. 40, an example of the method of testing edge strength of a sheet of material along an edge of the sheet 204 of material can be outlined as follows: the method comprises: (a) applying a surface pattern of visual markers 230 on a surface 226 (the second side) of the sheet 204 in a region of interest along the edge of the sheet 204 (see box 510); (b) obtaining a first optical image of the surface of the sheet 204 in the region of interest along the edge of the sheet without any 3-point bending load applied to the region of interest (see box 520); (c) applying a 3-point bending load to the region of interest along the edge of the sheet (see box 530); (d) obtaining a second optical image of the surface of the region of interest along the edge of the sheet while the 3-point bending load is being applied to the region of interest (see box 540); and (e) determining stress on the surface of the region of interest along the edge of the sheet resulting from the application of the 3-point bending load based on the first optical image and the second optical image (see box 550).

In some embodiments of the method of flowchart 500, the step (e) of determining stress on the surface of the region of interest along the edge of the sheet comprises: measuring strain in the sheet 204 of material in the region of interest in a no-load condition based on the first optical image; measuring strain in the sheet of material in the region of interest in a loaded condition, where the 3-point bending load is applied, based on the second optical image; and comparing the measured strain in the no-load condition to the measured strain in the loaded condition to determine the strain in the sheet induced by the applied 3-point bending load.

In some embodiments of the method, the step of measuring strain in the sheet of material in the region of interest in the loaded condition based on the second optical image comprises determining the displacement of the visual markers 230 in the second optical image compared to the visual markers' location in the first optical image. In some embodiments, the step of determining stress on the surface of the region of interest along the edge of the sheet comprises calculating the stress that would be required to produce the measured strain in the sheet of material in the region of interest.

In some embodiments of the method, applying the surface pattern of visual markers comprises printing, coating, spraying, etching, pasting, or projecting an image on the surface of the sheet.

In some embodiments of the method, the first optical image and the second optical image are obtained using an optic system comprising at least one camera 222*a*, 222*b*.

[Dynamic Mode—Edge Strength Tester Along with Algorithm for Real-Time Stress Measurement]

Referring to FIG. 9C, in some embodiments, the apparatus 200 can operate in a dynamic mode where the apparatus 200 can obtain both the no-load measurements and the loaded measurement while the test sheet 204 is continuously moving through the test apparatus 200 without pausing. In preferred embodiments, both the no-load measurements and the loaded measurements are made during a single pass of the test sheet 204 through the test apparatus 200. In order to achieve this, the optic system 222 can further comprise a second set of stereo cameras 224a, 224b positioned ahead of the test region 208 for obtaining the no-load condition measurement by recording an image of the test sheet 204 without any 3-point bending load applied to it.

The second set of stereo cameras 224a, 224b are positioned above the second (top) side 226 of the test sheet 204 and because they are looking at a section of the test sheet 204 ahead of the test region 208 as the test sheet 204 passes by before moving into the test region 208, the second set of cameras 224a, 224b can record the image of the section of the test sheet 204 at no-load condition. This is illustrated by the Deformation 1 case, the left most illustration in FIG. 9C.

In the illustrated 3-point bending test configuration imposed by the arcuate members 220a, 220b, and 218, the second side 226 of the test sheet 204 experiences tension as the sheet passes under the topside arcuate members 220a, 220b and over the bottom arcuate member 218. In some embodiments, as shown in FIGS. 9A, 9B, and 9C, the arcuate members 218, 220a, 220b are rollers.

Figure 41:
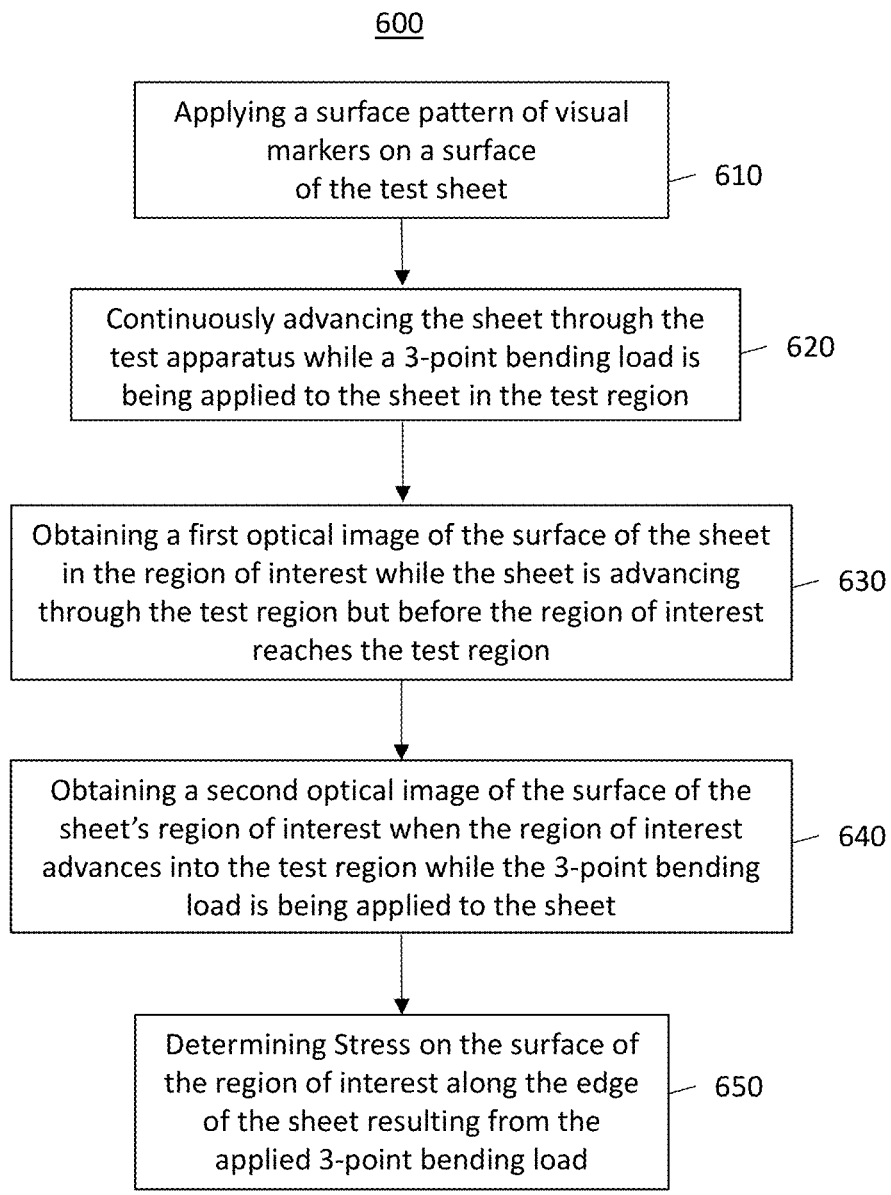
FIG. 41 is a flowchart illustrating a method according to another embodiment of the present disclosure.

The method for testing edge strength of a sheet 204 of material along an edge of the sheet using the test apparatus 200 operating in a dynamic mode can be summarized using the flowchart 600 in FIG. 41. The method comprises: (a) applying a surface pattern of visual markers 230 on a surface of the sheet in a region of interest along the edge of the sheet 204 (see box 610); (b) continuously advancing the sheet of material through the test apparatus 200 wherein the edge of the sheet is advanced through the test region while applying a 3-point bending load to the portion of the sheet passing through the test region 208 (see box 620); (c) obtaining a first optical image of the surface of the sheet in the region of interest while the edge of the sheet is continuously advancing through the test region 208 but before the region of interest reaches the test region (see box 630); (d) obtaining a second optical image of the surface of the sheet's region of interest when the region of interest advances into the test region while the 3-point bending load is being applied (see box 640); and (e) determining stress on the surface of the region of interest along the edge of the sheet resulting from the application of the 3-point bending load based on the first optical image and the second optical image (see box 650).

In some embodiments of the method summarized in flowchart 600, the step of determining the stress on the surface of the region of interest along the edge of the sheet 204 comprises: measuring strain in the sheet of material in the region of interest in a no-load condition based on the first optical image; measuring strain in the sheet of material in the region of interest in a loaded condition, wherein the 3-point bending load is applied, based on the second optical image; and comparing the measured strain in the no-load condition to the measured strain in the loaded condition to determine the strain in the sheet induced by the applied 3-point bending load.

In some embodiments of the method of flowchart 600, the step of measuring strain in the sheet of material in the region of interest in the loaded condition based on the second optical image comprises: determining the displacement of the visual markers 230 in the second optical image compared to the visual markers' location in the first optical image.

In some embodiments of the method, the step of determining stress on the surface of the region of interest along the edge of the sheet comprises calculating the stress that would be required to produce the measured strain in the sheet of material in the region of interest.

In some embodiments of the method of flowchart 600, the first optical image and the second optical image are obtained by an optic system comprising at least two cameras 222a, 222b, 224a, 224b. In some embodiments, applying the surface pattern 230 of visual markers comprises printing, coating, spraying, etching, pasting, or projecting an image on the surface of the sheet.

Figure 8D:
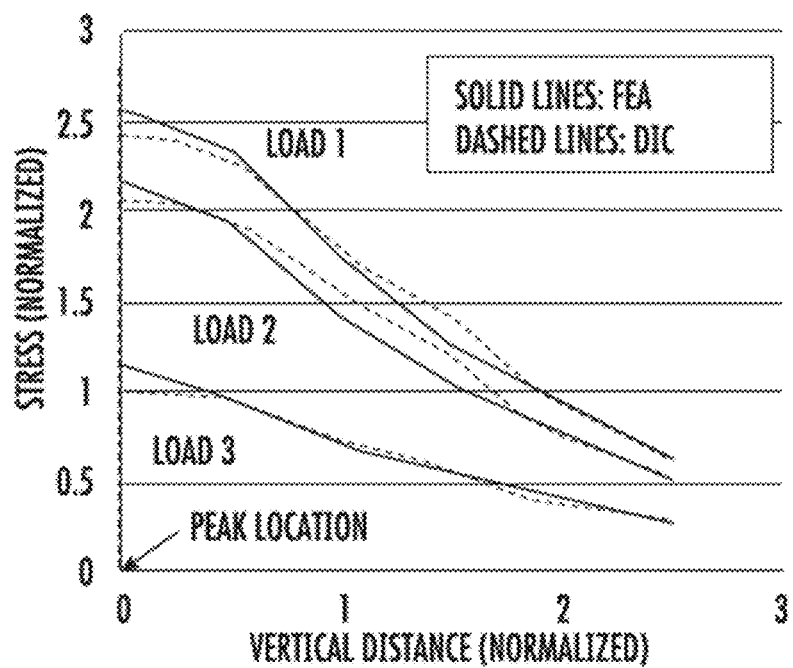
FIG. 8D shows a chart with maximum stress versus displacement calculated using the digital image correlation apparatus disclosed herein and using finite element analysis.

In some embodiments of the methods described above, the stress is determined in at least two dimensions. The two-dimensional stress is displayed as a surface plot. FIG. 8A shows the two-dimensional surface strain on a sheet when loaded by the 3-point contacts. 216 denotes the peak strain location with high stress and 217 denotes a far field location with low stress. FIG. 8B is an exemplary plot showing the applied load vs. maximum stress on the test sheet measured multiple times. FIG. 8C is also a 2-dimensional surface stress field on a sheet when loaded by the 3-point contacts. The left image is measured by DIC and the right image is modeled by FEA. FIG. 8D shows the normalized stress values as a function of vertical distance from the peak stress location to the inward sheet direction (shown as black arrow). The stress increases as a function of applied load.

In an embodiment of this system apart from being a calibration unit in its static condition, can also be used in a manufacturing environment (or otherwise) with continuous edge testing in a dynamic mode. As discussed throughout, the direct optical pathway to the surface of the material being tested facilitates the more accurate direct strain measurements relied upon herein.

The ability to make dynamic mode measurements is a design improvement on the existing edge measurement techniques and also adds the capability of real-time direct stress measurement. In some embodiments, the setup described above can be modified by switching the partial rollers (e.g., arcuate members) with 3 fully functional rollers that can intake the sample continuously feeding into it as shown in FIGS. 9A-9C and 11A-11D. Such a system will have the rollers in a position such that the incoming glass edge will continuously be subjected to a required bending/load. In such a system, the spacing between the rollers and their diameters are controlled to provide a minimum spacing S between the two rollers 220a, 220b so that there is a clear optical path for camera to inspect.

FIGS. 9B-9C describes the methodology to accomplish real-time stress measurement in such a dynamic type of edge strength testing setup. The edge strength tester needs to pre-inspect the edge (without any load/bending, the sample passes through the rollers) before testing so that preexisting breakages can be detected. If such a breakage is not detected, then the system would malfunction or overestimate the edge strength. During such an inspection, the stereo cameras 222a, 222b can take series of pictures along the length of the edge as shown in FIG. 9B. Then, in the second pass when a load is applied on the sample edge, the cameras take another set of images at exact locations on the edge are the first series of images as shown in FIG. 9C by pairing corresponding images from same location and then correlating, one could obtain strain fields and thereby stresses as described previously, i.e. by correlating identically numbered images in FIGS. 9B and 9C.

Alternatively, an embodiment of the testing apparatus 200 with two sets of stereo cameras 222a, 222b and 224a, 224b can be used to make dynamic measurements in a single pass. An example of such embodiment is shown on the left-most schematic of FIG. 9C. The system includes the first set of stereo cameras 222a, 222b and the second set of stereo cameras 224a, 224b. In such systems, both sets of stereo cameras are connected to a processor 214 that controls the cameras 222a, 222b, 224a, 224b and also processes the image data from the cameras. The system can also include a display 228 for displaying any of the analytical information on the measured stress in the sheet 204 as well as displaying the image of what the cameras see.

Figure 10A:
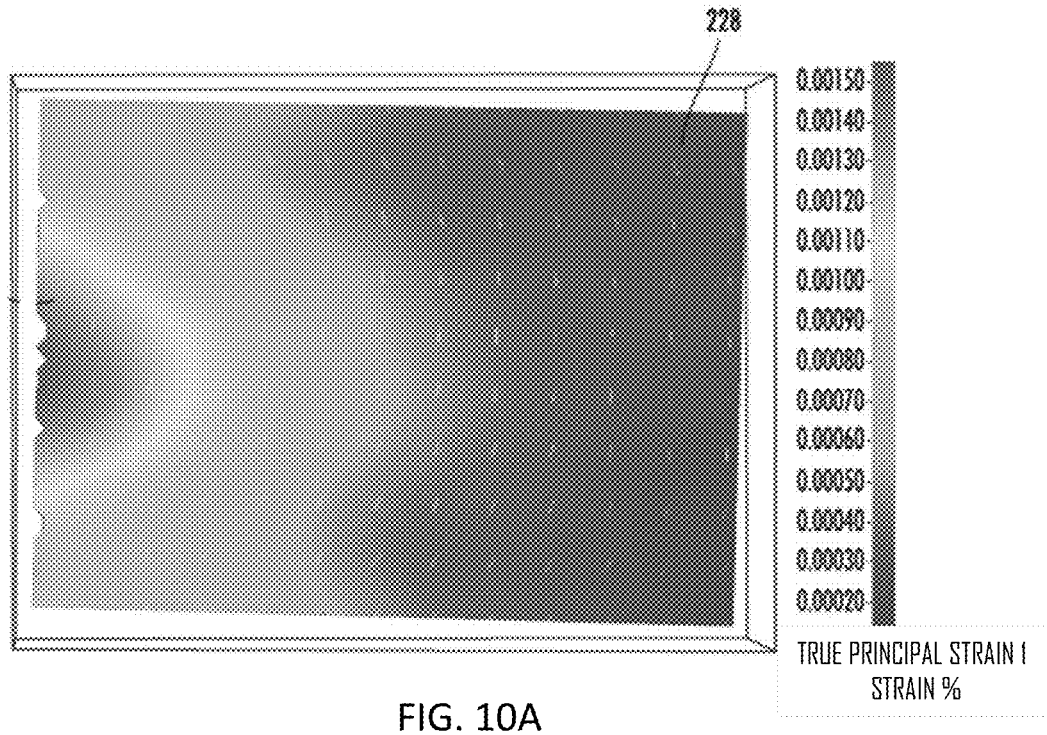
Figure 10B:
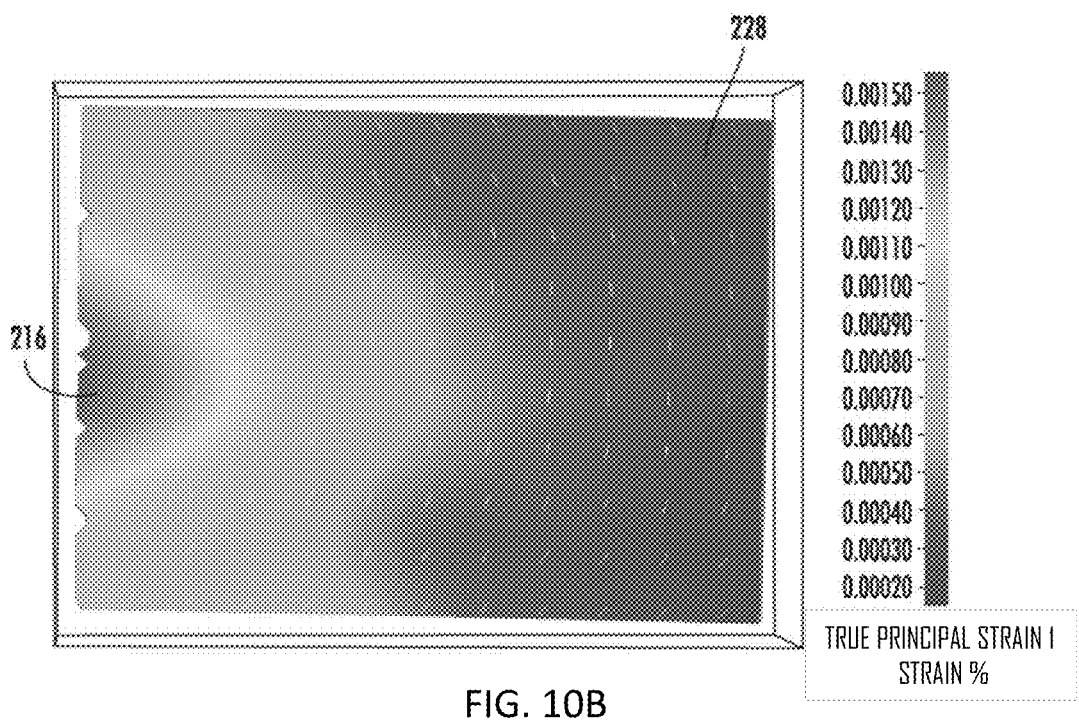
FIG. 10B shows a strain map from the same test with one step, which confirms they are identical.

The ability of the algorithm and image correlation to obtain strain from zero stress to peak stress state without any intermediate images (150-200 images for static tests) has been verified. FIGS. 10A and 10B show the results obtained from proof testing this concept and confirm that it is possible to obtain accurate results without the intermediate images. The series of 150-200 images taken during a static test at 11N load were correlated to obtain the stress distribution map shown in FIG. 10A. FIG. 10B, on the other hand, shows the stress distribution map obtained by correlating the $1^{st}$ image with the $200^{th}$ image without any of the intermediate images. The two stress distribution maps are identical, showing that the absence of the intermediate steps does not affect the result. Thus, this embodiment describes the dynamic system of edge strength measurement for ultra-thin monolithic and laminate glass samples with real time stress visualization.

The test apparatus 200 described herein can be used for performing the method. This is referring to a dynamic DIC method. Dynamic DIC refers to when it obtains strain measurement in real-time while the 3 points "roll" along the edge. Obtaining strain after a no-load measurement is required in such scenarios.

An example of the dynamic method of testing edge strength of a sheet 204 of material along an edge of the sheet using the test apparatus 200 that comprises a test region 208 can be outlined as follows. The method comprises: providing a surface pattern 230 of visual markers on a surface 226 of the sheet 204 that includes the edge of the sheet; continuously advancing the sheet of material through the test apparatus wherein the edge of the sheet is advanced through the test region 208 of the test apparatus while applying a 3-point bending load to the portion of the sheet passing through the test region; obtaining a first optical image of the surface of a region of interest along the edge of the sheet while the edge of the sheet is continuously advancing through the test region 208 of the test apparatus but before the region of interest reaches the test region 208; obtaining a second optical image of the surface 226 of the region of interest of the sheet when the region of interest has advanced within the test region 208 while the 3-point bending load is being applied; and determining stress on the surface of the region of interest along the edge of the sheet resulting from the application of the 3-point bending load by comparing the first optical image and the second optical image.

In some embodiments, stress can be determined in a time resolved domain, i.e., the history of stress evolution is obtained. This can be true in either a static mode, where the measurement is taken on a location along the edge of the test sheet 204 while the test sheet 204 is stationary, or in a dynamic mode where the measurement is taken along a length of the edge of the test sheet 204 while the test sheet 204 is continuously fed through the test apparatus 200 while a predetermined load is applied.

It should be noted that while some embodiments are described with reference to a sheet 204 formed of glass, the claims appended herewith should not be so limited as the test apparatus 200 described herein can be used to accept or accommodate and analyze laminate structures or panels. Suitable laminate structures can include plural glass sheets having one or more intermediate polymeric layers or can also, in alternative embodiments, include a structure having a thin film transistor glass substrate and color filter glass substrate having one or more films there between or adjacent to either or both substrates. Thus, where reference is made to a sheet 204 or glass sheet herein, reference can also be made to glass, glass-ceramic, plastic, as well as, laminate structures and other panels. For the sake of brevity, reference will only be made to a sheet 204 herein.

The test apparatus 200 can test sheets of various sizes. For example, the test sheet 204 can have length/width dimensions ranging from about 5 mm/5 mm, to about 100 mm/100 mm, to about 600 mm/600 mm, to about 1000 mm/1000 mm, to about 2300 mm/2600 mm, to about 4000 mm/4000 mm and all subranges there between. Glass sheets in panels or laminate structures may also have length/width dimensions ranging from about 5 mm/5 mm, to about 100 mm/100 mm, to about 600 mm/600 mm, to about 2300 mm/2600 mm, to about 4000 mm/4000 mm and all subranges there between. Further, adjacent glass sheets in panels or laminate structures may have different length/width dimensions which can result in an overlap of one sheet on the other and on one or more sides of such sheets. Exemplary glass thicknesses for a single glass sheet testing or individual glass sheet contained in a panel or laminate structure can be less than 0.1 mm (e.g., as low as 10 microns) to thicknesses greater than 5 mm, between 0.1 mm to 3 mm, between 0.4 mm to 2 mm, between 0.5 mm to 1 mm, between 0.5 mm to 0.7 mm.

The table 202 may include a plurality of driving mechanisms which are configured to move the glass sheet 204 into a predetermined position to commence a measurement cycle or to continuously advancing the glass sheet 204 through the test region 208 for the dynamic mode testing.

A predetermined portion of an edge of the glass sheet 204 can be tested. A width of this predetermined portion can range from about 1 mm to about 5 mm, from about 1.5 mm to about 3.5 mm, from about 2 mm to about 3 mm, and all subranges there between. Since the primary purpose of testing the glass sheet 204 is to test the strength of the sheet material along its edge, it is generally desired to test the areas close to the edge as possible. To that end, for the glass sheets having the dimensions mentioned above, engaging the final 2 mm of the surface of the glass sheet 204 along its edge with the arcuate members 220a, 220b, and 218 would generally ensure stress concentration is at the glass sheet edge. This set up is also beneficial in minimizing any chances of catching extraneous particles (such as dust) between the glass sheet 204 and the arcuate members 220a, 220b, and 218 which can introduce unwanted surface cracks. In embodiments where the sheet 204 is a panel or laminate structure measured for edge strength and where adjacent glass sheets in these panels or laminate structures are different (e.g., one or more edges of the structure have an overlapping feature), then the predetermined portion is measured with respect to the smaller of the glass sheets in the structure (i.e., the non-overlapping sheet).

In some embodiments, the arcuate members 220a, 220b, and 218 in each or any of the assemblies 206 can be made of compliant materials to minimize the risk of creating a break in the glass sheet 204 during non-destructive testing (e.g., not evaluating maximum stress). The arcuate members or rollers can be selected to have sufficient compliance while being able to provide a long life to minimize maintenance and downtime as well as sufficient friction to allow the roller to roll freely on the glass surface. Exemplary arcuate member materials can include hardened steel rollers, steel rollers, urethane rollers, polyetheretherketone (PEEK) rollers, Shore 80 hardness urethane rollers, polycarbonate (PC) rollers (e.g., Lexan or the like), high-density polyethylene (HPDE) rollers, Shore 90 hardness urethane rollers, urethane coated rollers, or the like. Exemplary urethane rollers can also be employed to reduce rolling noise which can contaminate any signals used by the system, feedback or otherwise. Additionally, urethane or urethane coated rollers can be used to accommodate debris in the roller path and to make y-direction stress profiles have no inboard stress concentrations. In embodiments used to measure edge strength of panels and laminate structures, it was discovered that less compliant rollers (e.g., PC, HPDE, etc.) were required to achieve adequate edge strength testing results.

Exemplary dimensions for each arcuate member or roller can vary depending on the particular embodiment of the present subject matter. For example, roller dimensions can range from a 5 mm to a 15 mm outside diameter (OD), from a 7 mm to a 12 mm OD, from a 9 mm to a 10 mm OD. In some embodiments, an exemplary roller dimension can be about 9 mm OD so that stress can be applied nearly all the way to a corner of a glass sheet which is important as many customer issues occur in this area. Exemplary systems can also traverse a glass edge at speeds ranging from 5 mm/s to 500 mm/s or more, or from 2 mm/s to 400 mm/s or more. Exemplary systems are robust and can be used on glass having thicknesses as small as 0.1 mm to thicknesses as great as 1 mm depending on the durability of the polymer material used for the rollers.

In some embodiments, a high speed closed loop stress control mechanism can be employed to detect cracks as well as ensure applied stress is within a predetermined value of a target, e.g., 2 MPa of target. For example, a load can be applied to a glass sheet 204 using the single arcuate member 218 whereby a load cell signal can be sent to a high speed controller (not shown) which continuously monitors for cracks. This load cell signal can also be used to control the applied load while traversing the edge at a predetermined speed (e.g., 5 mm/sec to 100 mm/sec or more).

The use of the edge strength test apparatus 200 is not limited to interrogation of just edge features. It is envisioned that embodiments can interrogate surface features as well for conducting defect screening in manufacturing lines. For example, some features on the surface of the glass sheet, e.g., particle contamination and/or visible types of surface defects such as pits, chips or scratches, can be employed with embodiments of the present subject matter. In such embodiments, however, rather than providing strength distributions, the embodiments would utilize size, shape and/or depth distributions, i.e., a dimensional metric, of such surface defects. Exemplary and non-limiting surface features include surface proximity regions (e.g., approximately 20 mm inboard from the edge) and interface regions (where the surface meets the edge) and any size, shape or depth feature of surface defects. Such dimensional metrics can be used alone or with strength metrics obtained from edge features.

In some embodiments, the test length may span the entirety of a glass sheet edge or may be conducted on a portion(s) of a glass sheet edge. Thus, the test length may span from as little as about 1 mm to 5 mm to as much as about 2600 mm, 3000 mm, 4000 mm or more depending upon the length of the glass edge.

Edge Strength Testing Based on 3-Point Bending

FIGS. 4-7B, 9A-9C, and 11A-11D show schematics of an edge strength test apparatus 200 using three-point bending method. In a destructive failure test mode, the test sample glass panel 204 is placed under increasing load until failure and the peak load at the failure point is recorded. This peak load is mapped to a stress based on prior empirically developed calibration curve from strain gaging. This technique provides strains/stresses along two directions (x-axis and y-axis), which is a significant improvement over the current practice of using only strains along the bending direction via strain gauging.

[Optical System (Camera) Calibration]

Referring to FIGS. 11A-11D, system calibration is completed prior to performing actual tests on glass panel. By performing this operation, the image correlation software gets to know the angle and distance at which camera is positioned with respect to the test sample. This will help in translating the movements of dot pattern in terms of image pixels to physical dimensions in the 3D space. This calibration step is described schematically in FIGS. 11A-11D. FIG. 11A shows the relative positions of the cameras (222a, 222b), rollers and the test panel. The top rollers are farther away from the panel as the test have not started yet. Now we switch the test panel with predetermined (known to image correlation software) pattern printed on a flat surface. Camera takes a series of photographs of this pattern with the pattern being swiveled around in 3D space yet within camera's focal region as depicted in FIG. 11B-11D. A series of images and appropriate software can be used to develop a calibration file that will be used during the actual test on the panel to obtain strains.

[Capabilities of the Static Test Setup]

The static mode has following design features that helps it to act as a calibration device (or benchmarking device) for studying panel/laminate sheet design along with other parametric studies.

a) Interchangeable rollers (roller material and diameter)
b) Ability to change the feed angle. This helps in addressing the edge testing for non-rectangular display panels.
c) Adjustment of the roller assembly closer to or further away from the test edge. This enables inspection of specific regions of the edge along with testing smaller panels (mobile device).
d) The rollers can be replaced with partial roller profiles, which increases viewable area, especially near the contact points and enables studying stress distribution in that region without additional stress from rollers.

It incorporates alignment techniques, such as alignment pins 236a, 236b, that align various components precisely.

[Improvement of Stress Measurement Accuracy in Non-DIC ESMS Testing]

Figure 15:
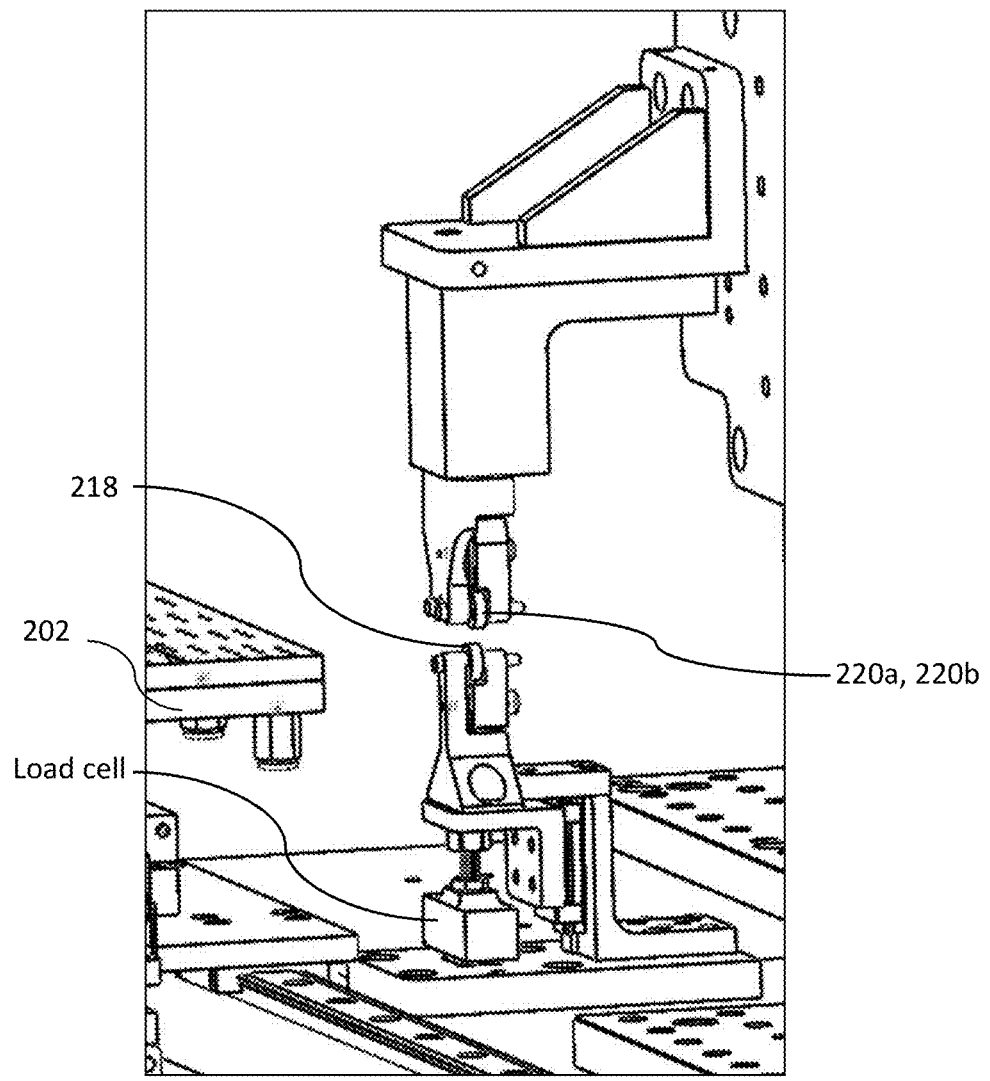
FIG. 15 is a schematic illustration showing the location of the load cell with respect to the arcuate members and the position of the test sheet 204.
Figure 16:
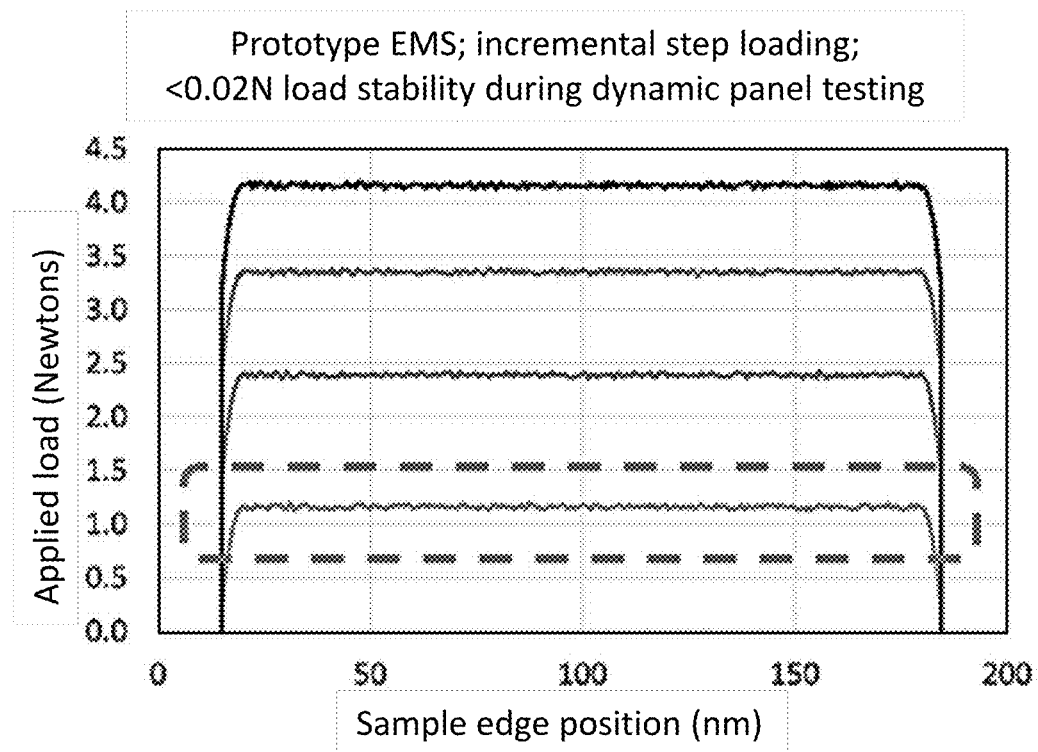
FIG. 16 is an applied load vs. sample edge position plot showing the improved load control achieved with the aggregate of the improvements to the ESMS disclosed herein.

[Load Cell Position] In the existing ESMS the load cell is positioned in adjunct with the topside roller assembly. In some embodiments, an improvement on load control can be achieved by moving the load cell to below the bottom side roller 218. FIG. 15 is a schematic illustration showing the new location of the load cell. No load cell drift was observed with the new configuration.

Figure 17:
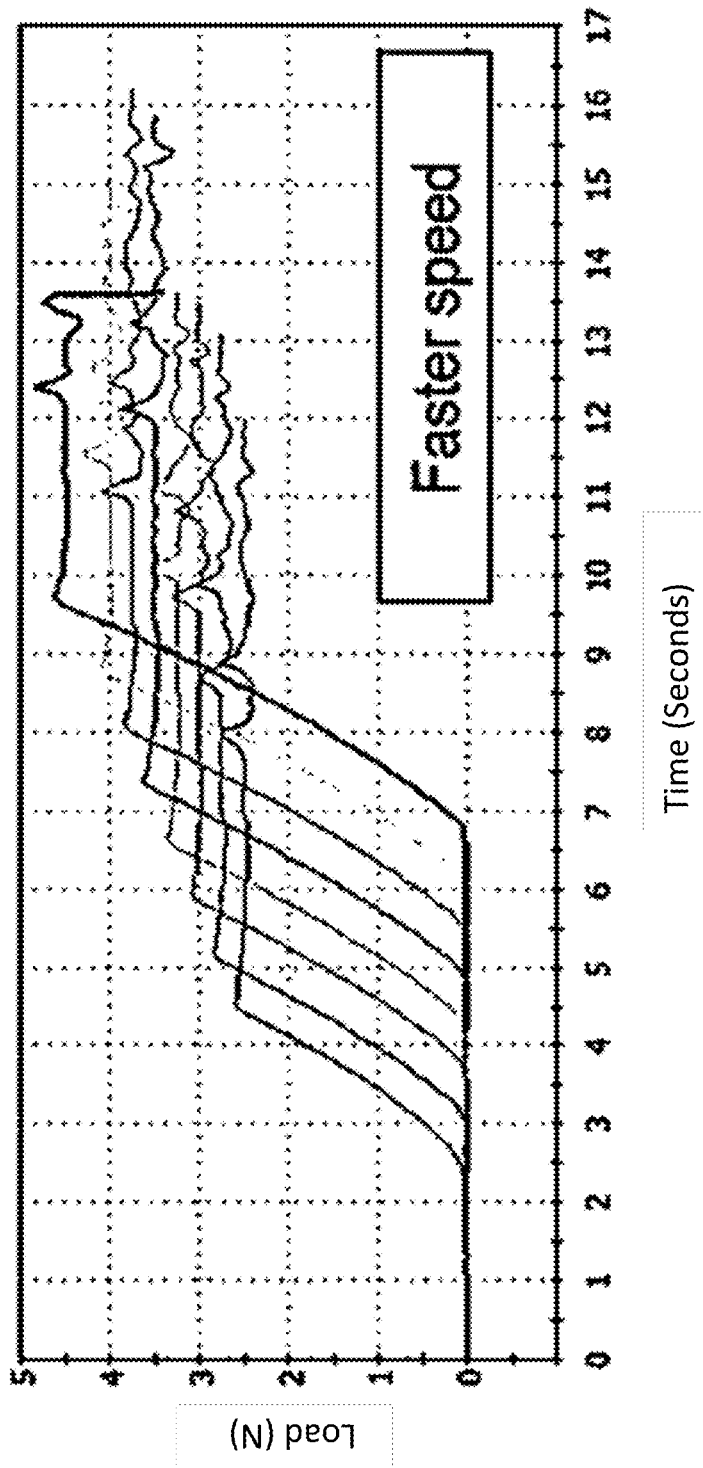
FIG. 17 shows a plot of load vs. time measured on ten sample sheets at a faster speed at which the test sample sheet 204 moves over the rollers with a speed of 10 mm/s.
Figure 18:
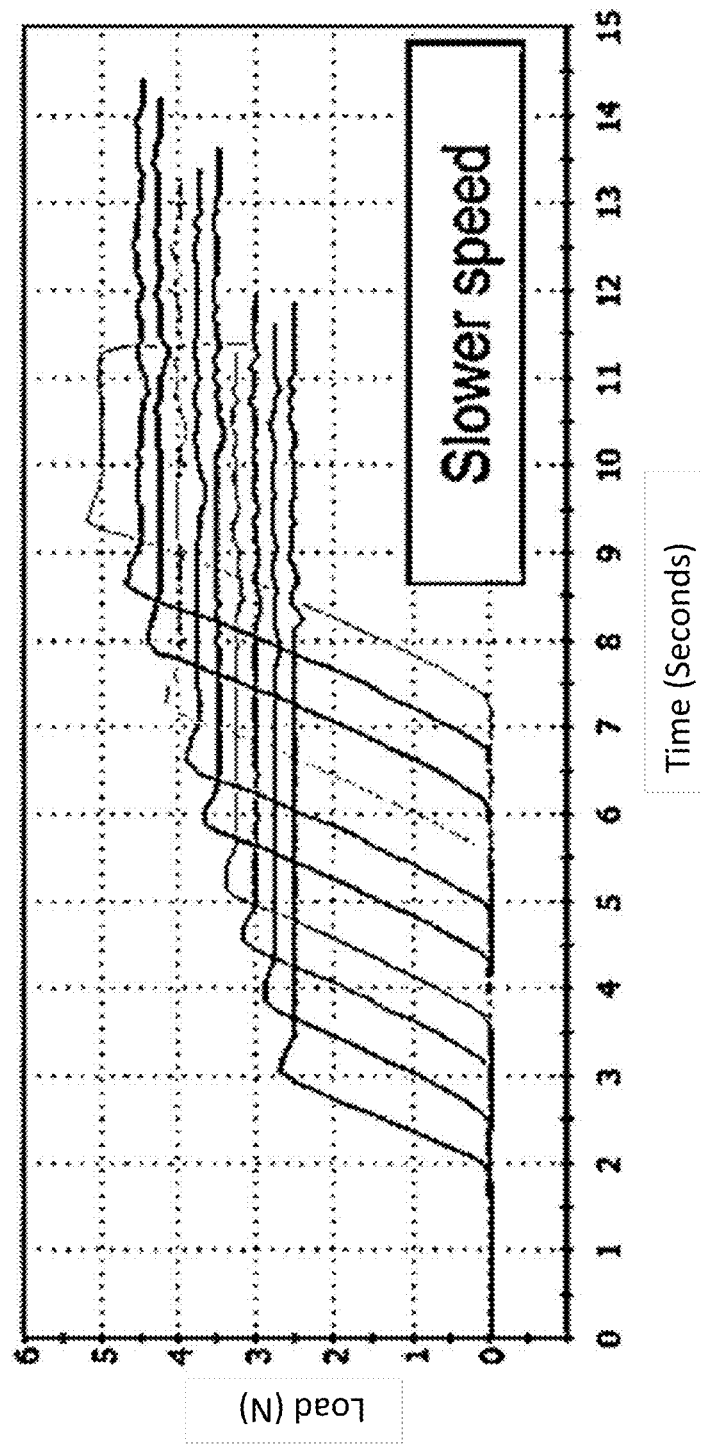
FIG. 18 shows a plot of load vs. time measured on ten sample sheets at a slower speed at which the test sample sheet 204 moved over the rollers with a speed of 1 mm/s.

[Speed Control] The stress on the sheet 204 is a function of the load applied on it. Thus, the stress measurement accuracy depends on the load measurement accuracy. One factor in improving the accuracy in the non-DIC ESMS testing where the test sample sheet 204 is continuously fed into the test region 208 of the tester is the speed at which the test sheet 204 is moved through the test region 208. The conveyance of the test sheet 204 is achieved by using rollers for the arcuate members 218, 220a, 220b. Thus, the material for the roller can affect the friction between the rollers and the test sheet which can affect the ability of the rollers to move the test sheet 204. Compliant rollers shrink and expand as they rotate against the test sheet 204 and can induce variation in the load applied by the bottom roller 218. When the test sheet is moving through the rollers fast, the ESMS test system 200 has little time to adjust for the load variation. Using a commercially available load frame Instron, the impact of the speed at which the test sheet 204 moved over the rollers vs. load control can be investigated. The results are shown in the plots in FIGS. 17 and 18. The data was generated with ten (10) specimens. The plot in FIG. 17 shows the measured load over time with a speed of 10 mm/s. The plot in FIG. 18 shows the measured load over time with a speed of 1 mm/s. The load control was significantly improved when the speed was reduced from 10 mm/s to 1 mm/s. The load control also depends on the speed and accuracy in which the ESMS test system's software can adjust for the load variation. Thus, an optimal speed should be selected taking these factors into consideration. With the current improved ESMS set up, load control with speeds between 1 mm/s up to 40 mm/s was achieved. Using 5 mm/s speed, for a 0.2 mm monolithic glass, ±0.1N or lower load variation was also achieved for a 2N target which equated to 100±5 MPa stress variation. While a faster speed will result in shorter test time, some maximum limit is required so as not to compromise the ability to control the load.

[Polymer coating on the rollers] In the embodiments where the arcuate members 218, 220a, 220b are rollers, the rollers preferably have a polymeric coatings on the rolling surface that comes in contact with the test sheet 204 to aid in moving the test sheet 204. Because the polymers are viscoelastic, the material can shrink and expand during rolling. Therefore, it had been expected that thinner polymer coating on the rollers would be better for controlling the load applied on the test sheet 204. However, it was unexpectedly found that thicker polymer coating provided better load control with less variability in the applied load. The total diameter of the roller (roller bearing+polymer coating) was 9 mm. The thickness of the polymer coating was 1.32 mm.

Figure 24:
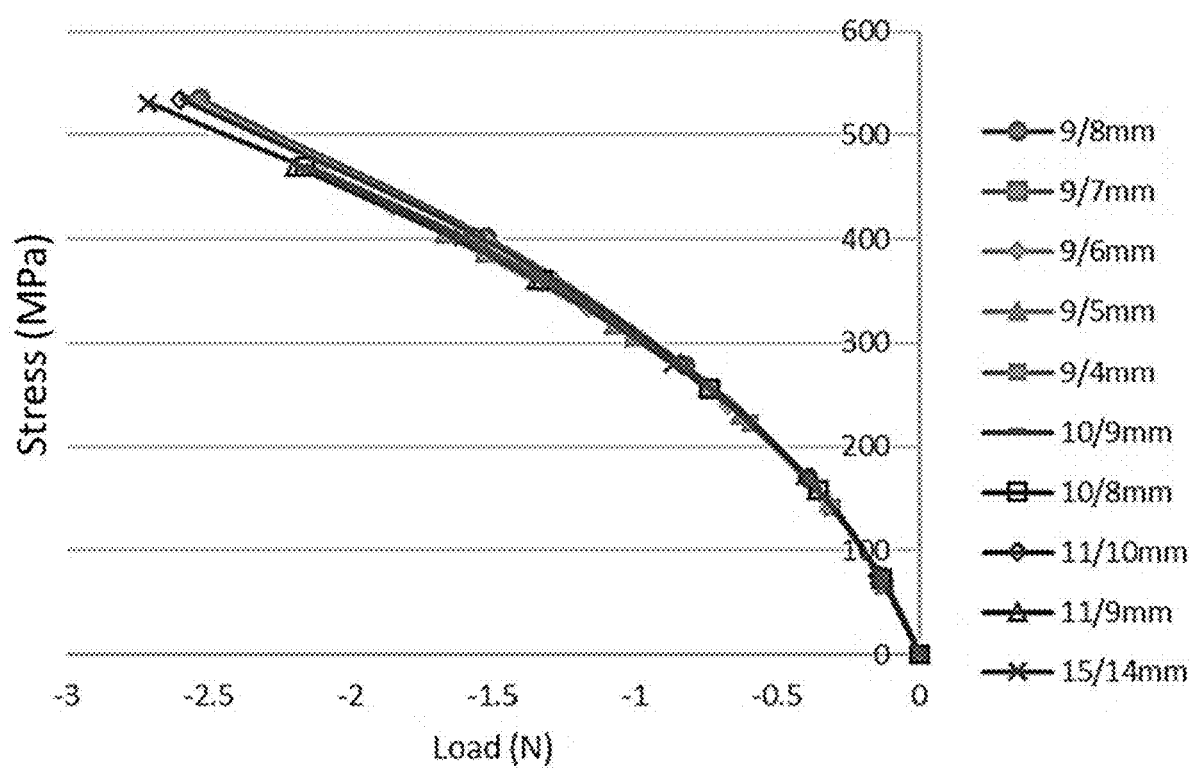
FIG. 24 is a graph illustrating the impact of the roller diameter/polymer thickness on the load-to-stress correlation as determined by finite element analysis.

It was further investigated the impact of roller diameter and polymer coating thickness on the load-to-stress correlation to understand the potential variability in dynamic measurement. Modeling results showed that for a given roller inner diameter L2 and outer diameter L1, the change in the correlation was negligible up to 400 MPa as the roller inner diameter varied from 4 mm to 14 mm and the polymer thickness varied from 0.5 to 2.5 mm. FIG. 24 is a plot of the load-to-stress correlations as a function of roller outer diameter L1/roller inner diameter L2 as determined by FEA. The correlations are invariant up to 400 MPa for wide ranges of L1 and L2. From the study, it was determined that the potential variability in the load-to-stress correlation was minimal for dynamic measurement

[Software Improvements]

Figure 19A:
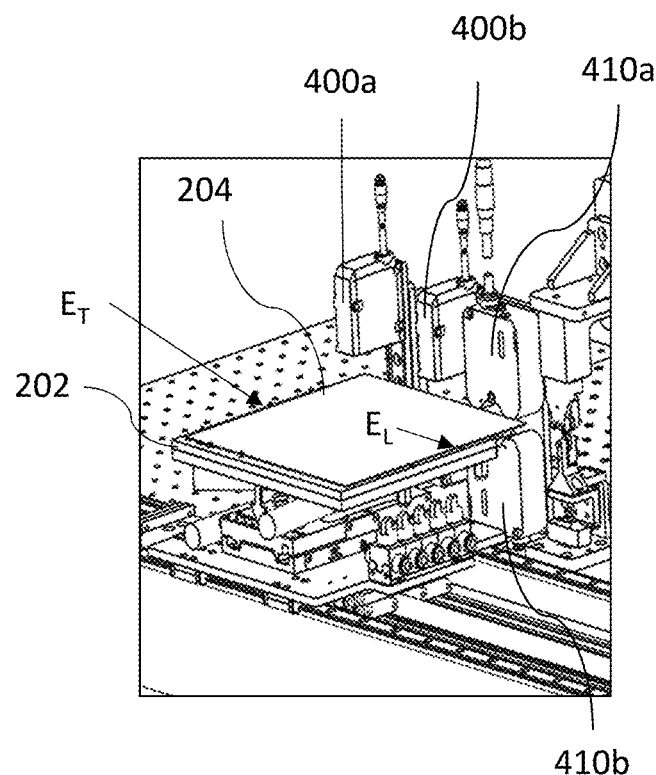
FIG. 19A is an illustration of the ESMS test system according to an embodiment showing a test sheet mounted on a sample stage.
Figure 19B:
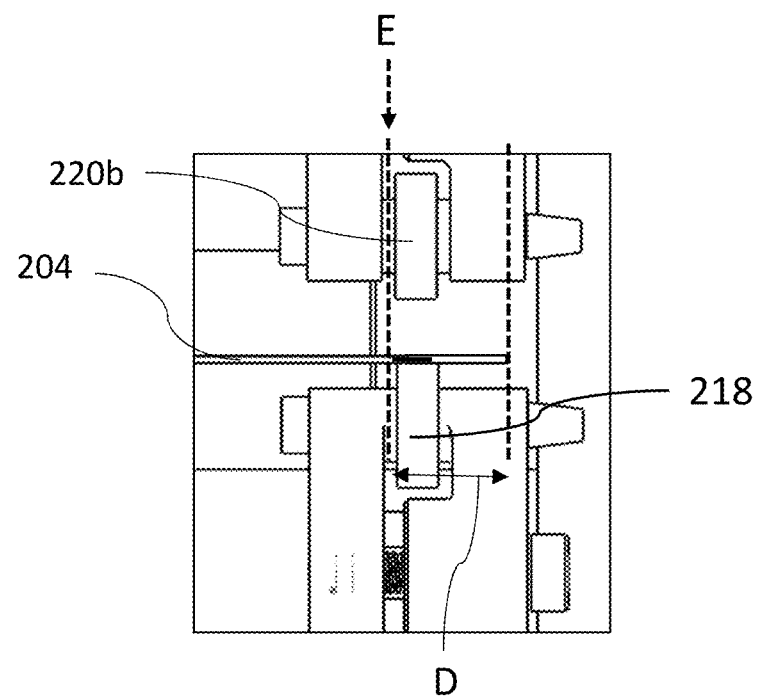
FIG. 19B is a detailed close up illustration of the desired roller engagement location along the edge of a test sheet 204 which is at a distance D from the edge E of the bottom roller 218.

Improvements were made to the control software for the ESMS system 200 to fully automate the system operation in order to make the testing operation more reliable. The system targets small, ~200×130×0.2 mm, test sheets/panels. Test samples as thin as 0.2 mm require a much more accurate load control to accurately measure the stress because even small changes in the load induces relatively large changes in stress. Therefore, improvements needed to be made to the control software by improving the control loop to maintain better load control. The control software allowed the ESMS to perform the following automated procedures. One of the initial steps in the edge strength testing procedure is alignment of the test sheet 204. The desired roller engagement is at the distance D (typically at about 2 mm) from the edge E of the test sheet 204. This roller engagement position is shown in FIG. 19B.

Figure 19C:
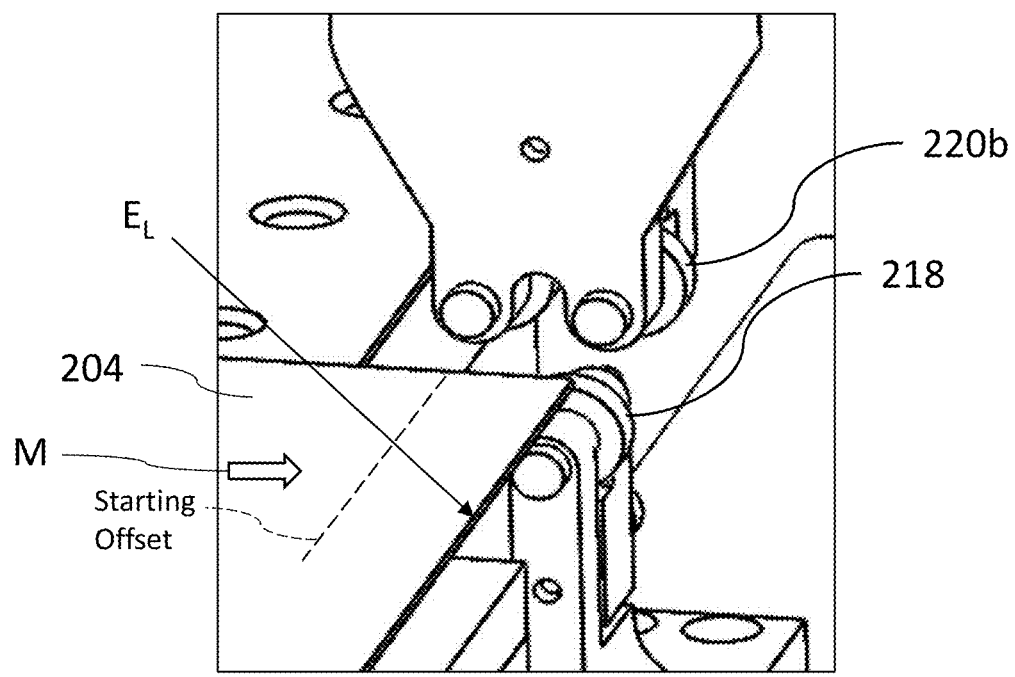
FIG. 19C is an illustration showing the positioning of the test sheet 204 at the start of the testing procedure with the ESMS so that the leading edge $E_L$ of the test sheet rests above the apex of the bottom roller 218.

Before the edge strength test can begin, some pre-scan routines are carried out. Such routines comprise generating a thickness profile of the edge of the test sheet 204 to be tested. Referring to FIG. 19A, the length of the test sheet 204 is moved slowly through a pair of thickness sensors 410a, 410b that measures the thickness of the test sheet 204 and generates a thickness profile of the edge of the test sheet 204 to be tested. The thickness data allows for an accurate post measurement analysis of failure stress if the test sheet 204 cracks. This routine also finds the leading edge $E_L$ and trailing edge $E_T$ of the test sheet 204 and the sample sheet length so that the actual dimensions can be used during the edge strength test rather than recipe dimensions. The test sheet 204 is placed so the leading edge $E_L$ is positioned above the apex of the bottom roller 218 at the start of the edge strength testing procedure. FIG. 19C shows this configuration.

Figure 20:
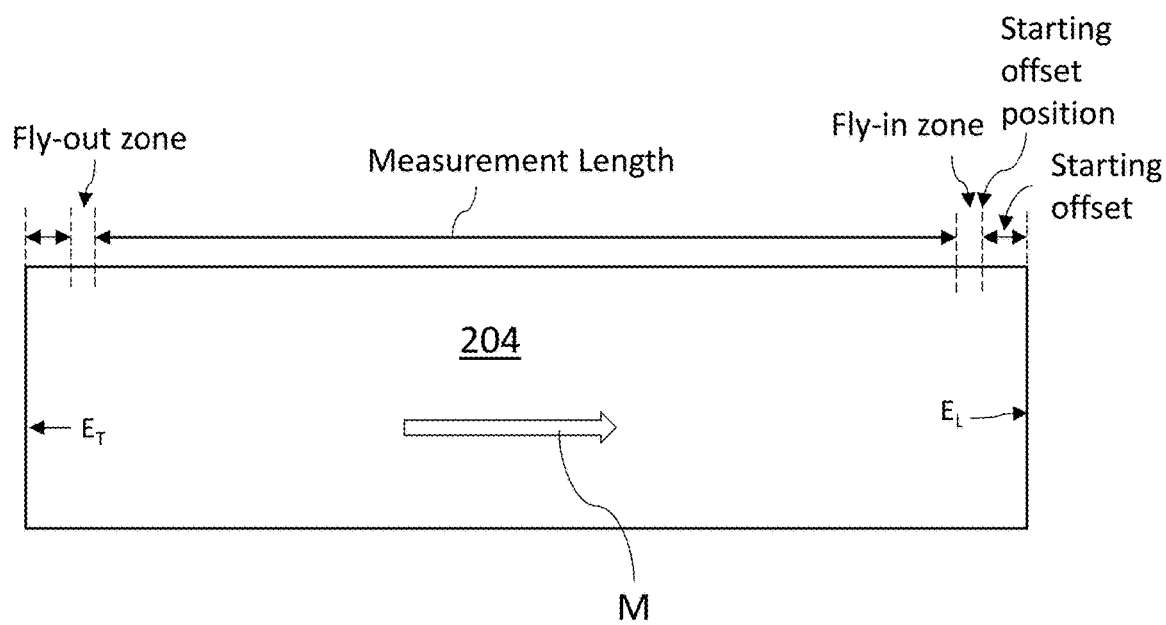
FIG. 20 is an illustration of an example of a test sheet 204 identifying a fly-in zone, measurement length, and a fly-out zone.

Next, the ESMS drives the test sheet 204 in the direction indicated by arrow M until the apex of the bottom roller 218 is aligned with the starting offset position. The starting offset position refers to a horizontal edge alignment as shown in FIG. 19C. FIG. 20 is an illustration of an example of test sheet 204 identifying a fly-in zone, measurement length, and a fly-out zone. To begin the edge strength test procedure, the ESMS drives top roller assembly 220a, 220b slowly downward towards the top surface of the test sheet 204 until small force is detected which signifies that the top rollers 220a, 220b have made a contact with the test sheet 204.

Figure 21:
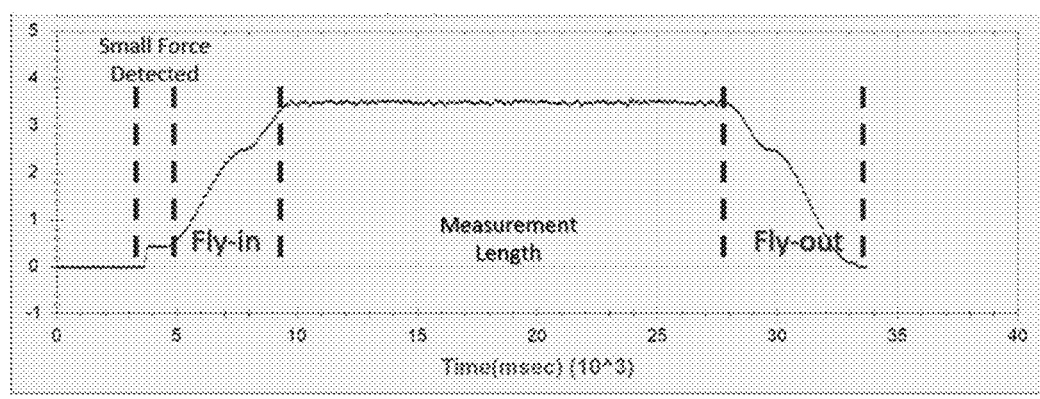
FIG. 21 is a plot showing an example of the load profile starting from the initial period during the lowering of the upper rollers 220a, 220b, the Fly-in zone, the Measurement Length, and the Fly-out zone.

Next, the loading force and the glass test sheet speed are ramped up synchronously through a Fly-in zone over a specified fly-in distance within a specified time frame. The loading force is maintained along a Measurement Length until Fly-out zone is reached. The length of the fly-out zone is defined by a fly-out distance and the loading force the glass test sheet speed are ramped down do complete the testing procedure. FIG. 21 is a plot showing an example of the load profile starting from the initial period during the lowering of the upper rollers 220a, 220b, the Fly-in zone, the Measurement Length, and the Fly-out zone.

Figure 22:
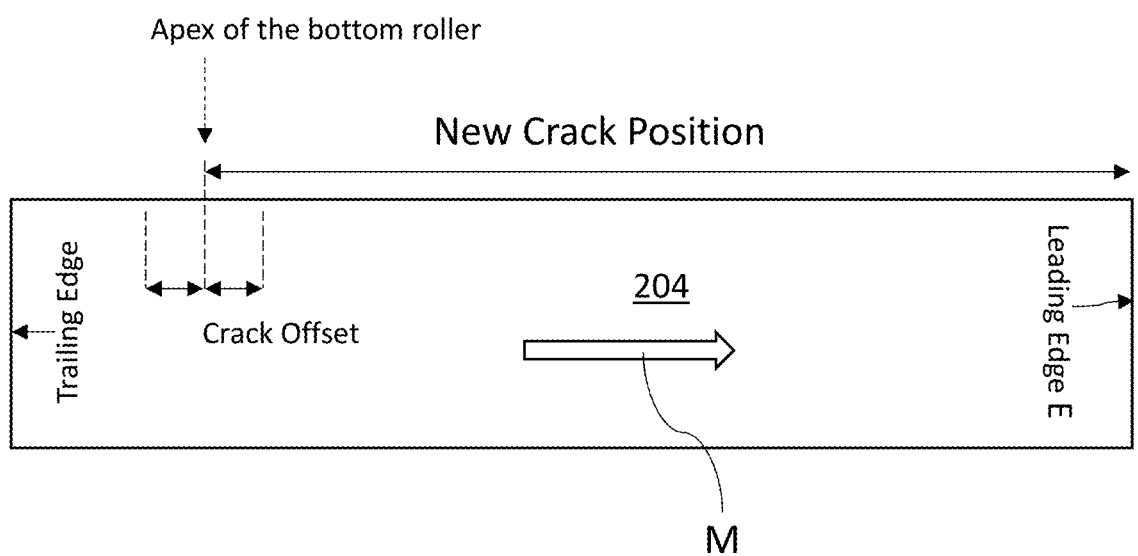
FIG. 22 is a schematic illustration of an example of a test sheet 204 identifying a new crack position being detected.

[Crack Detection] Under the updated control software, the ESMS carries out the following crack detection procedure. User specifies threshold around target load. If threshold is breached, the ESMS immediately disengages the rollers 218, 220a, 220b and stops the test sheet 204. The position of the lower roller 218 (i.e. the apex of the roller 218) where the test sheet 204 is under the applied stress is defined as a new crack position. The edge strength testing is continued if enough space is left along the test sheet 204 edge considering the user defined crack offset. FIG. 22 is a schematic illustration of the test sheet 204 showing the position of the detected crack position. Crack offset refers to the distance the rollers are to be moved away from the detected crack position before the rollers can reengage with the test sheet edge to resume dynamic testing. If the crack offset is too short, the crack would propagate and disturb the measurement. If the crack offset is too large, testable edge real estate can be wasted. According to the modeled magnitude and shape of the stress field, a minimum 25 mm distance for the crack offset was used.

After reengaging the test sheet 204, the ESMS loops through all of the user defined loading forces as long as there is sufficient length of the edge region of the test sheet remains to be tested. ESMS applies a constant force as it traverses along the edge. When a break occurs, the strength of the test sheet 204 can be anywhere between 0 and the stress corresponding to the applied force. Therefore, to accurately determine the strength of the sheet, one must apply multiple step loads in an incremental fashion to better understand the lower bound of the strength. The user can define these step forces based on the level of measurement accuracy he desires. The system must loop through all of the user defined step loads until a break occurs.

[Load Control] For controlling the 3-point bending stress load applied to the test sheet 204 by the rollers 218, 220a, 220b, a Phantom Motor technique (also known as Cascading Servo Loop) was incorporated into the ESMS control software. The Phantom Motor technique was applied to the load cell analog input. The technique allowed the ESMS to read the load cell input signal and make changes to the moving sample stage 202 to control the load being applied to the test sheet 204 in real time.

Figure 23A:
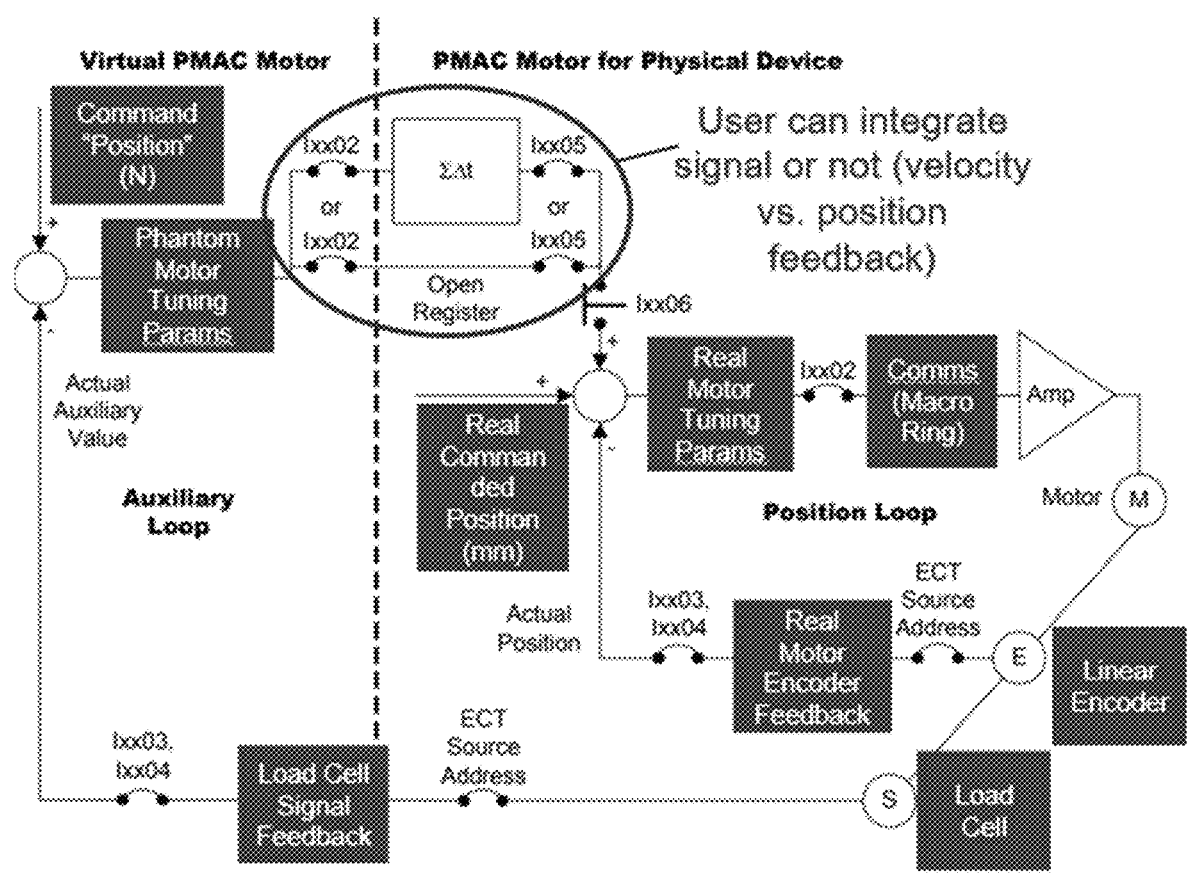
FIG. 23A is a schematic illustrating the Phantom Motor technique applied to improve the load control in the ESMS according to an embodiment of the present disclosure.

FIG. 23A is a schematic illustrating the Phantom Motor technique. The Delta Tau's Power PMAC motion controller can be configured in such a way where the output of an individual servo loop can be used as an input to another. This allows the system to join the capabilities of both loops on a single actuator and allows the engineer to take full advantage of controller tuning parameters for a device that was not specifically intended to control motion. In this case, the output of a load cell was integrated into the motion system such that its analog output was pointed to the output of a servo loop inside the controller. This is known as the "inner loop". The servo loop that actually controls physical motion of the actuator is then fed the inner loops output to command physical motion. By scaling the relationship between the two loops with the motor tuning parameters provided by the Delta Tau system, an optimal balance was achieved that allowed the motion controller to respond to real time deviations from the target load and apply the necessary corrections, making for a stable load application across the sample.

Figure 23B:
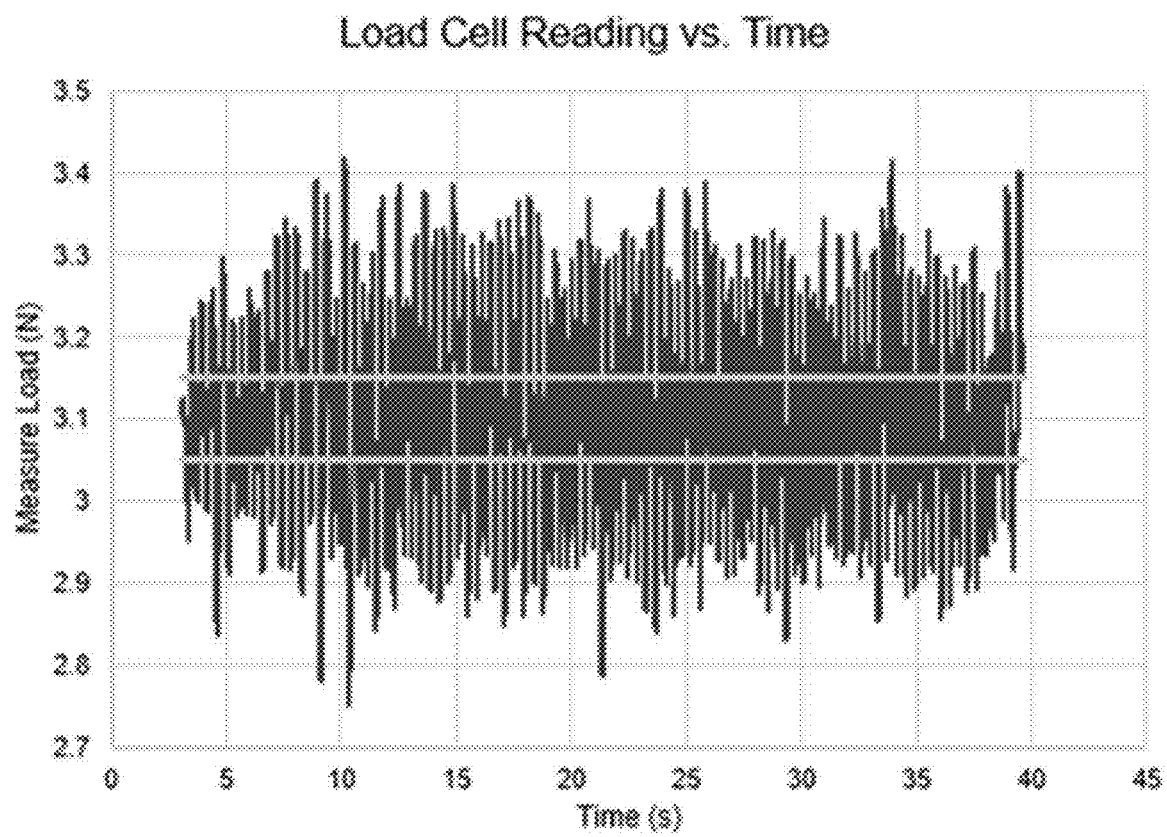
FIG. 23B is a plot of the measured load readings taken without the Phantom Motor technique modification.
Figure 23C:
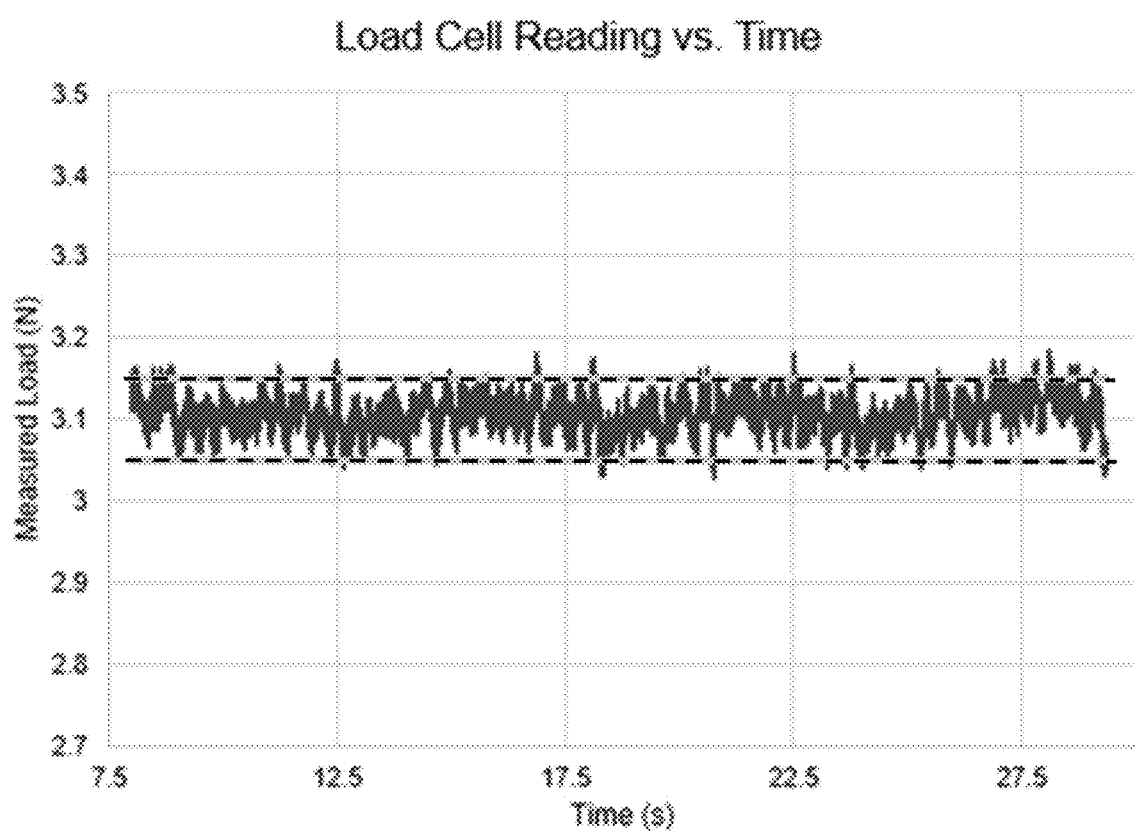
FIG. 23C is a plot for the measured load readings taken with the Phantom Motor technique.

FIGS. 23B and 23C show plots of the measured load reading from the load cell vs. time comparing the load cell readings from a test run. The plot in FIG. 23B is for the measured load readings taken without the Phantom Motor technique modification and the plot in FIG. 23C is for the measured load readings taken with the Phantom Motor technique. The plot in FIG. 23C show substantially less variations in the load cell readings with the Phantom Motor technique implemented.

[Method to Estimate the Strength of a Batch of Panels.]

According to some embodiments, a method of measuring the average strength of identically manufactured panels that have the same design but manufacturing tolerance will be disclosed. There can be two ways to measure the strength of multiple panels to obtain the average strength of the batch:

Directly measure the strength of all individual panels by using the optical strain measurement technique disclosed herein;

Use a nominal load-to-stress correlation determined by measuring a few samples using the optical strain measurement technique to estimate the strength of all remaining panels consisting the batch;

The first method has the advantage of being more accurate than the second, but can be time consuming since all samples must be measured using the optical strain measurement technique which can have multiple process steps and longer time. The second method involves less processing time since it can use the load directly to estimate the strength, but will have an error bar in the estimate since the same nominal correlation is adopted for panels having a certain manufacturing tolerance. Still, the second method is preferred in practice since less test time has the advantage over the additional accuracy obtained from utilizing the first method. Here we detail more about the second method.

The nominal load-to-stress correlation can be obtained by conducting multiple optical strain measurements (i.e., DIC) on multiple panels by using either a static or dynamic DIC approach. A higher number of measurements will provide a more accurate estimate of the nominal correlation. As the number of measurements increases, the error bar will also increase due to the manufacturing tolerance of the panels.

Figure 25:
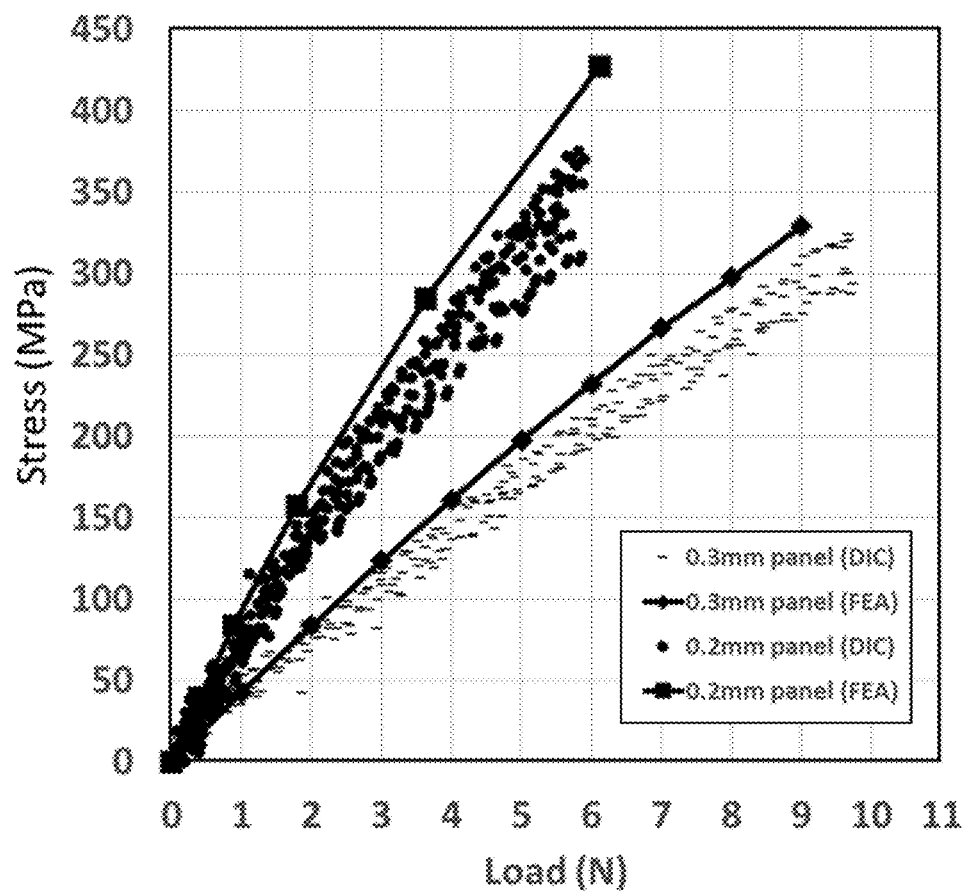
FIG. 25 is a plot of Stress (MPa) vs. Load (N) comparing two groups of panels of two different thicknesses 0.2 mm and 0.3 mm measured by DIC and modeled by FEA.

For example, FIG. 25 shows a load vs. stress plot for two different batches of panels having average thicknesses of 0.2 and 0.3 mm measured by DIC and modeled with FEA. While DIC measurement results have a scatter due to the panel manufacturing tolerance, FEA model shows a single result since the nominal panel design parameters were used for the calculation.

To minimize the errors from using a nominal load-to-stress correlation for all panels, correction factors can be applied to the nominal load-to-stress correlation on each panel based on its measured variability.

[Panel Correction Factors]

Thickness—For example, if a nominal load-to-stress correlation derived from a panel batch having an average thickness of 0.3 mm is applied to a panel having a thickness of 0.29 mm, the stress could be underestimated. Therefore, a correction factor can be applied based on the measured thickness of 0.29 mm. In this case, the correction factor is a function of the measured panel thickness and the average thickness of the panel batch. The mathematical form of the correction factor can be derived from a sensitivity study conducted by DIC and/or FEA modeling.

Figure 26A:
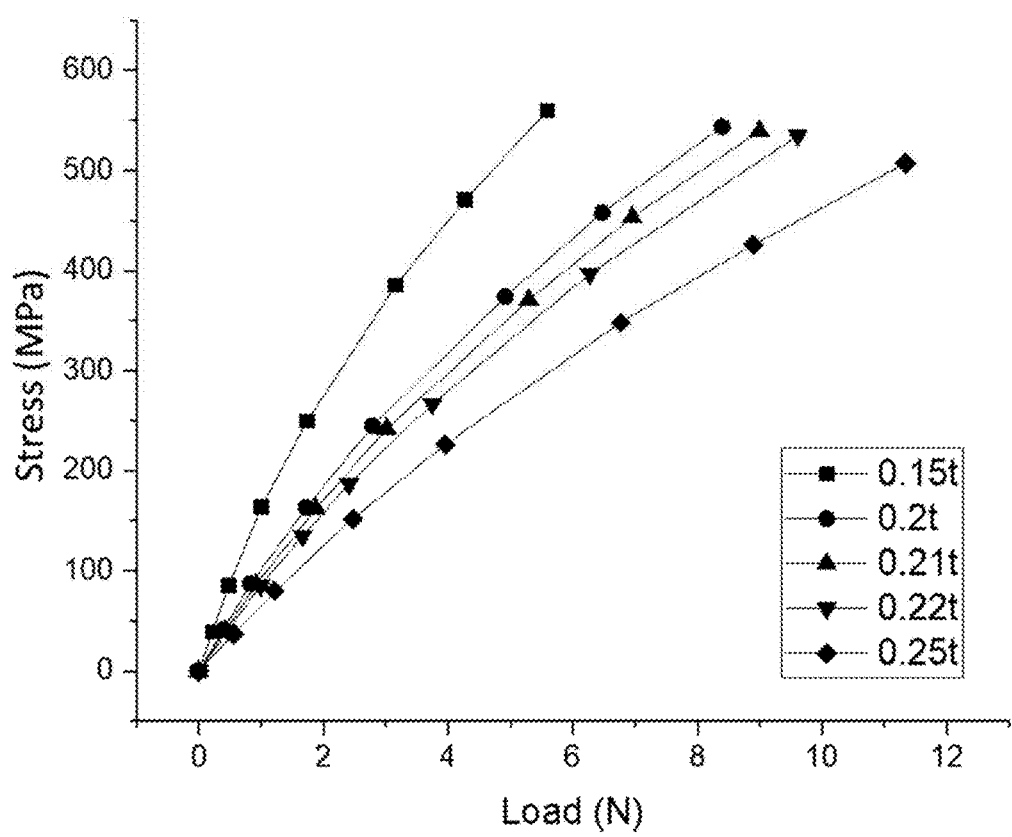
FIG. 26A is a plot of Stress (MPa) vs. Load (N) showing the modeled load-to-stress correlation for panels having different total thicknesses.
Figure 26B:
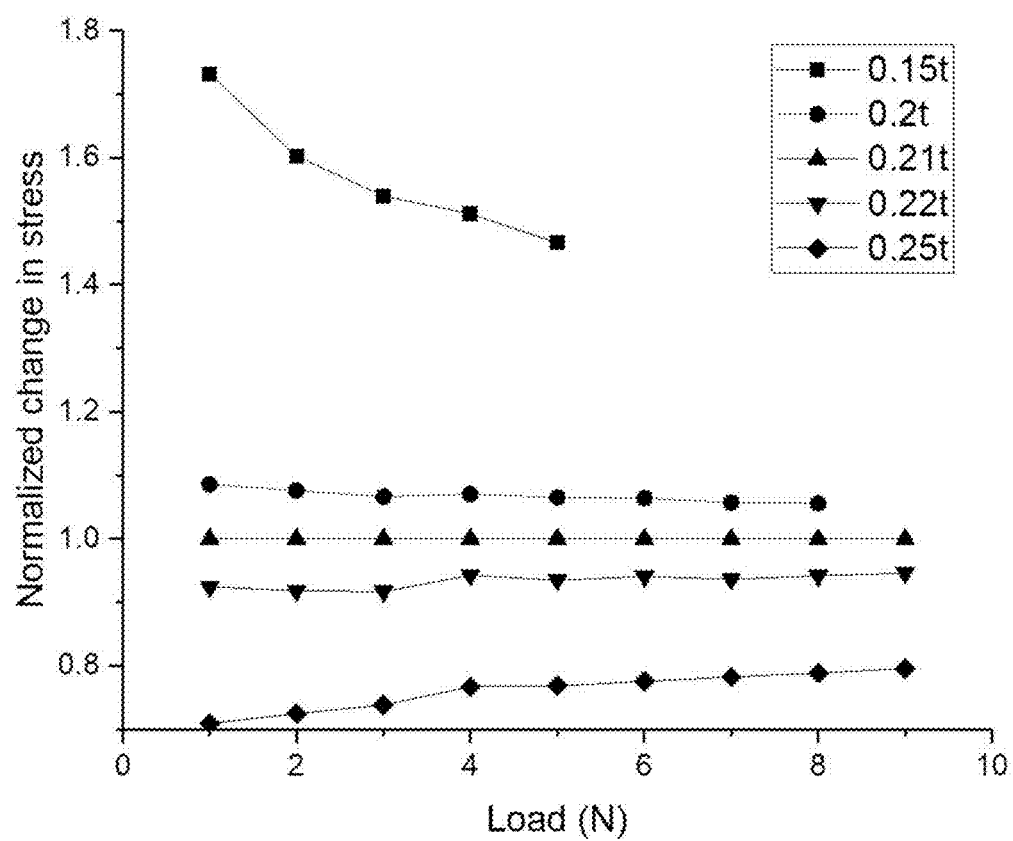
FIG. 26B is a plot of Normalized change in stress vs. Load (N) showing the normalized change in stress with respect to thickness variations in panels.

It may be difficult to characterize the influence of panel manufacturing tolerance using experimental methods such as DIC if the tolerance is small. In such cases, FEA modeling can be used to understand the sensitivity and derive correction factors. FIG. 26A shows the modeled load-to-stress correlation for panels having different thicknesses of 0.1, 0.2, 0.21, 0.22, and 0.25 mm, while FIG. 26B shows the normalized change in stress vs. load (N) for the different thicknesses. By using these graphs and measuring the thickness variation of each panel, one can apply the appropriate correction factor to the nominal load-to-stress correlation.

Similarly, correction factors could be applied for other panel design parameter that has a certain manufacturing tolerance.

[Measurement Process Correction Factors]

Figure 27A:
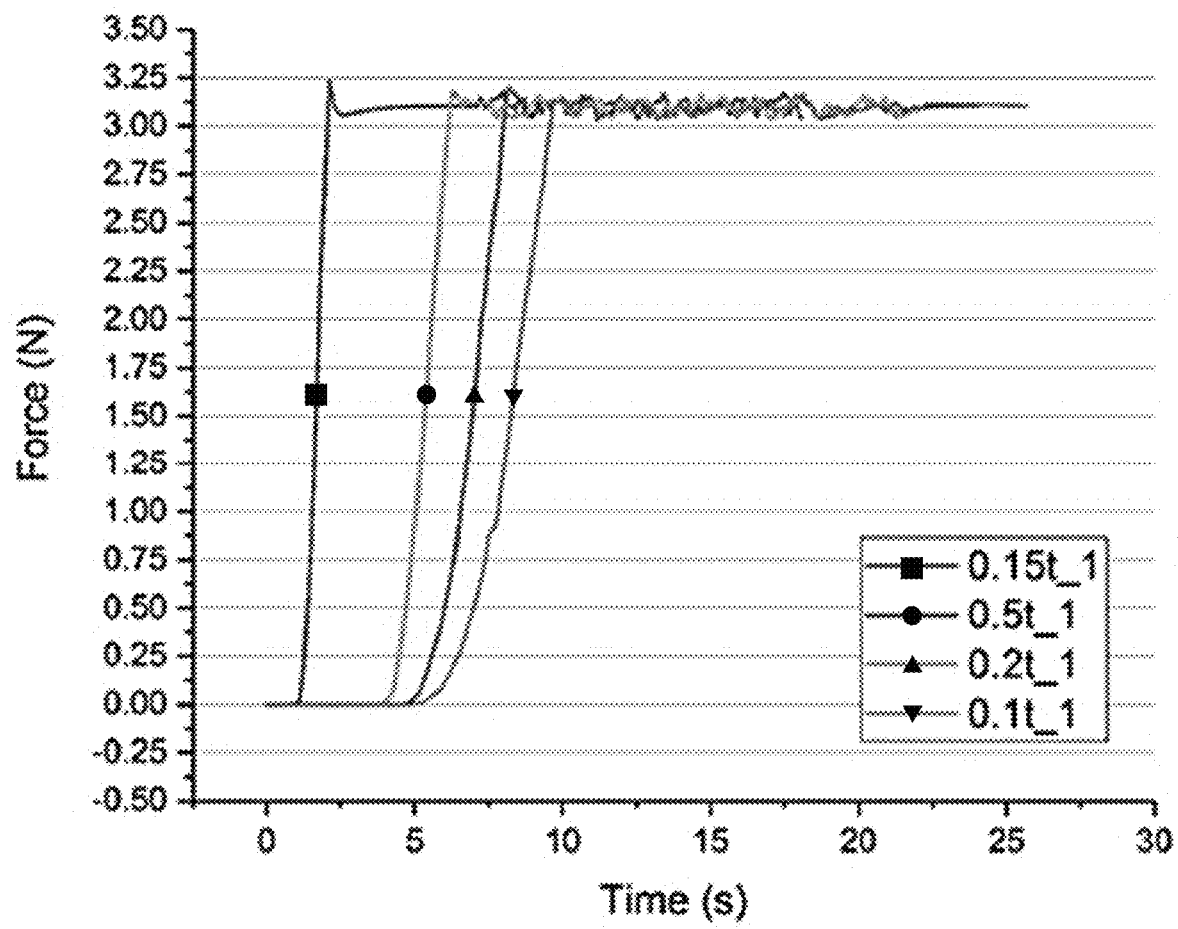
FIG. 27A is a plot of force over time measured with dynamic ESMS for 0.1, 0.15, 0.2, and 0.5 mm thick glass sheets.
Figure 27B:
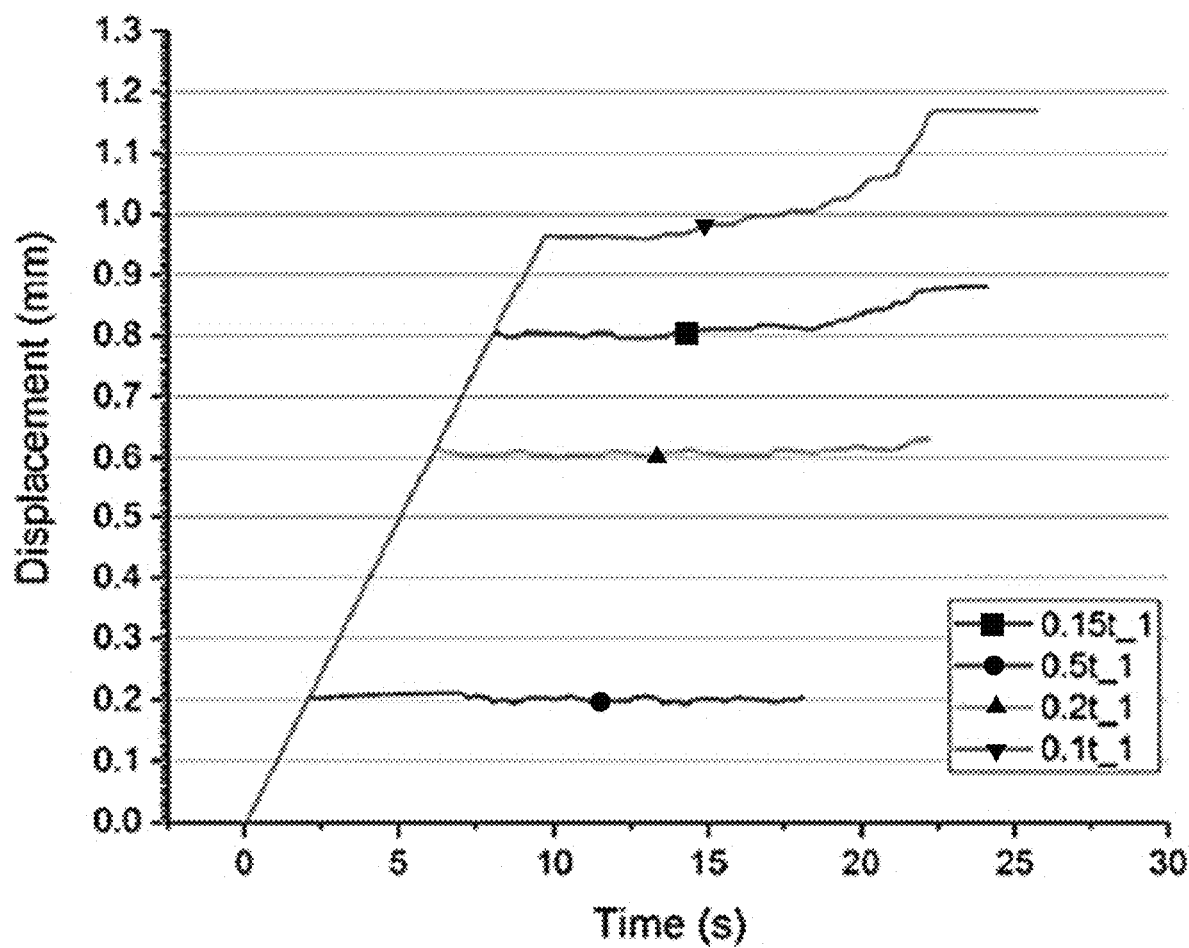
FIG. 27B is a plot of displacement over time measured with dynamic ESMS for 0.1, 0.15, 0.2, and 0.5 mm thick glass sheets.
Figure 28:
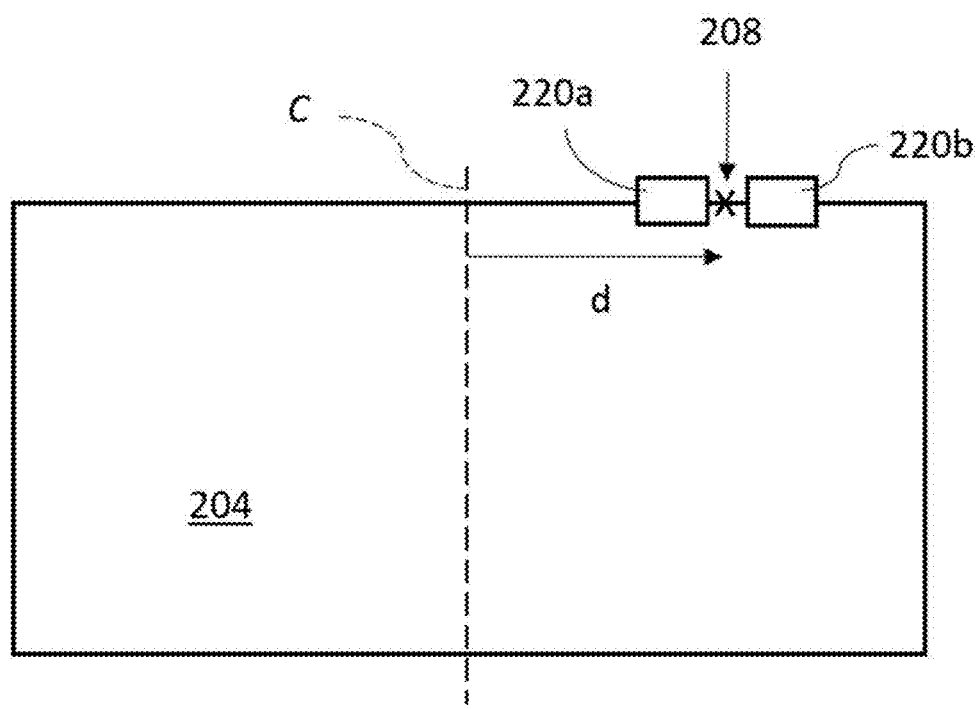
FIG. 28 is a schematic illustration of a test panel/sheet showing the distance d from the center of the edge of the test panel/sheet to the test location.
Figure 29:
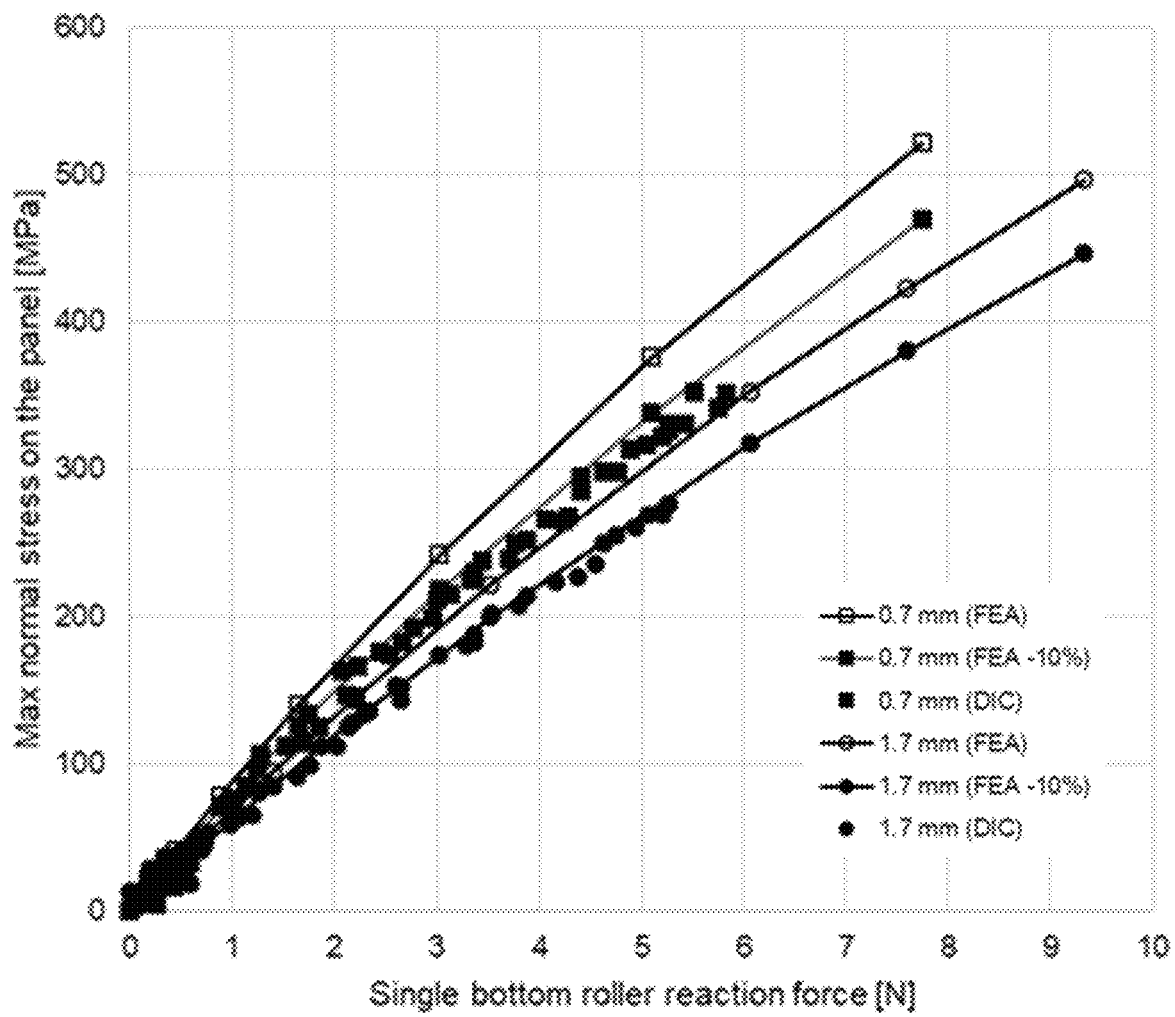
FIG. 29 is a plot showing the impact of roller engagement on the load-to-stress correlation as determined by FEA and DIC measurements
Figures 30A, 30B:
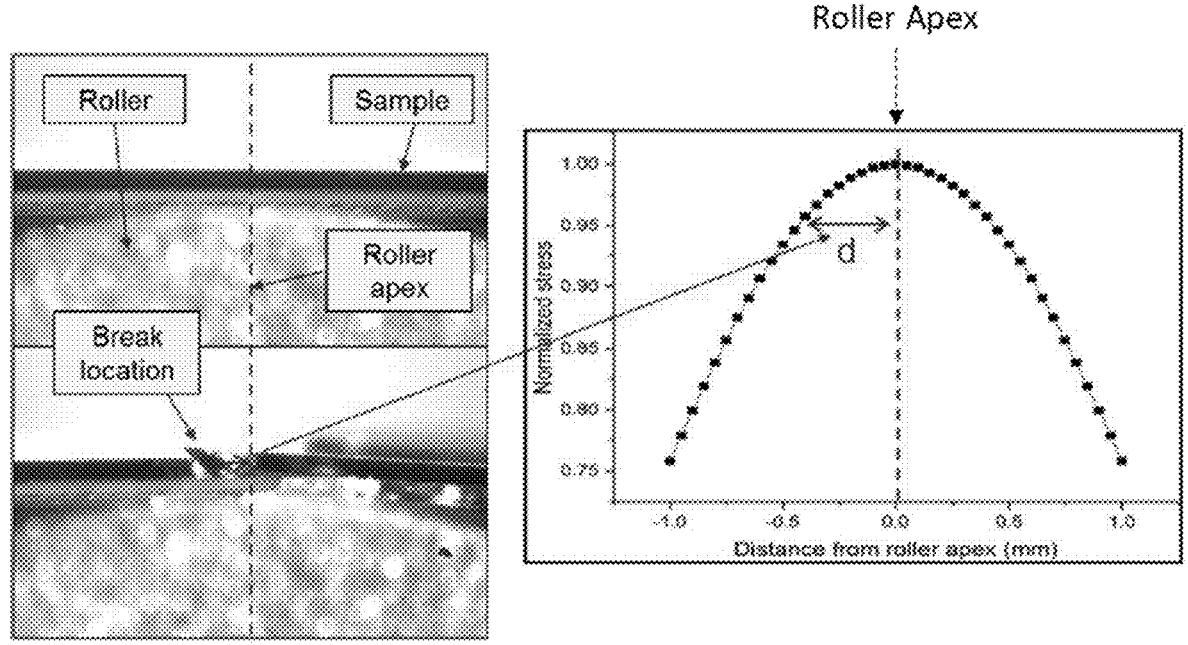
FIG. 30A is a photograph showing an example of an off-apex breakage in a test panel/sheet during an edge strength test.
FIG. 30B is a plot of normalized stress vs. distance from the roller apex for an off-apex break in a test panel/sheet.
Figure 31:
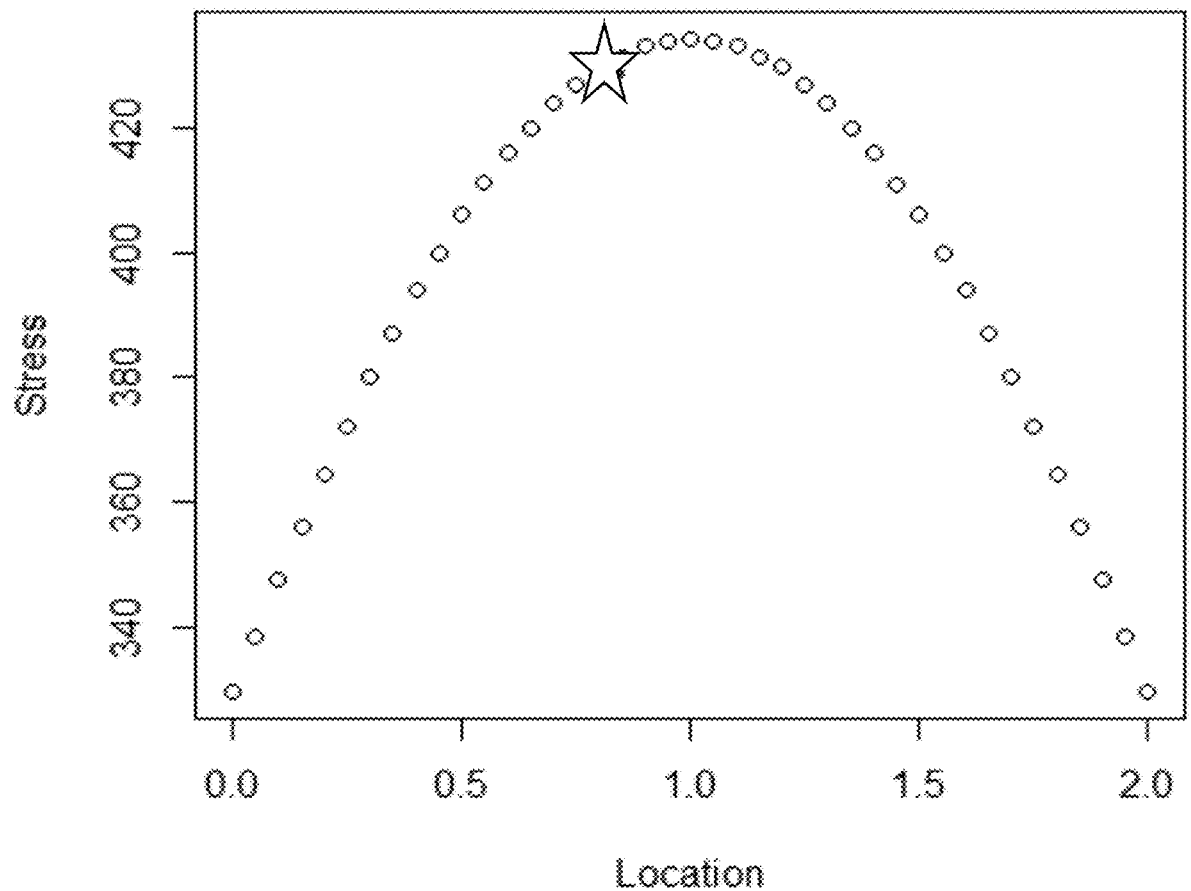
FIG. 31 is a plot of ESMS stress profile.
Figure 32:
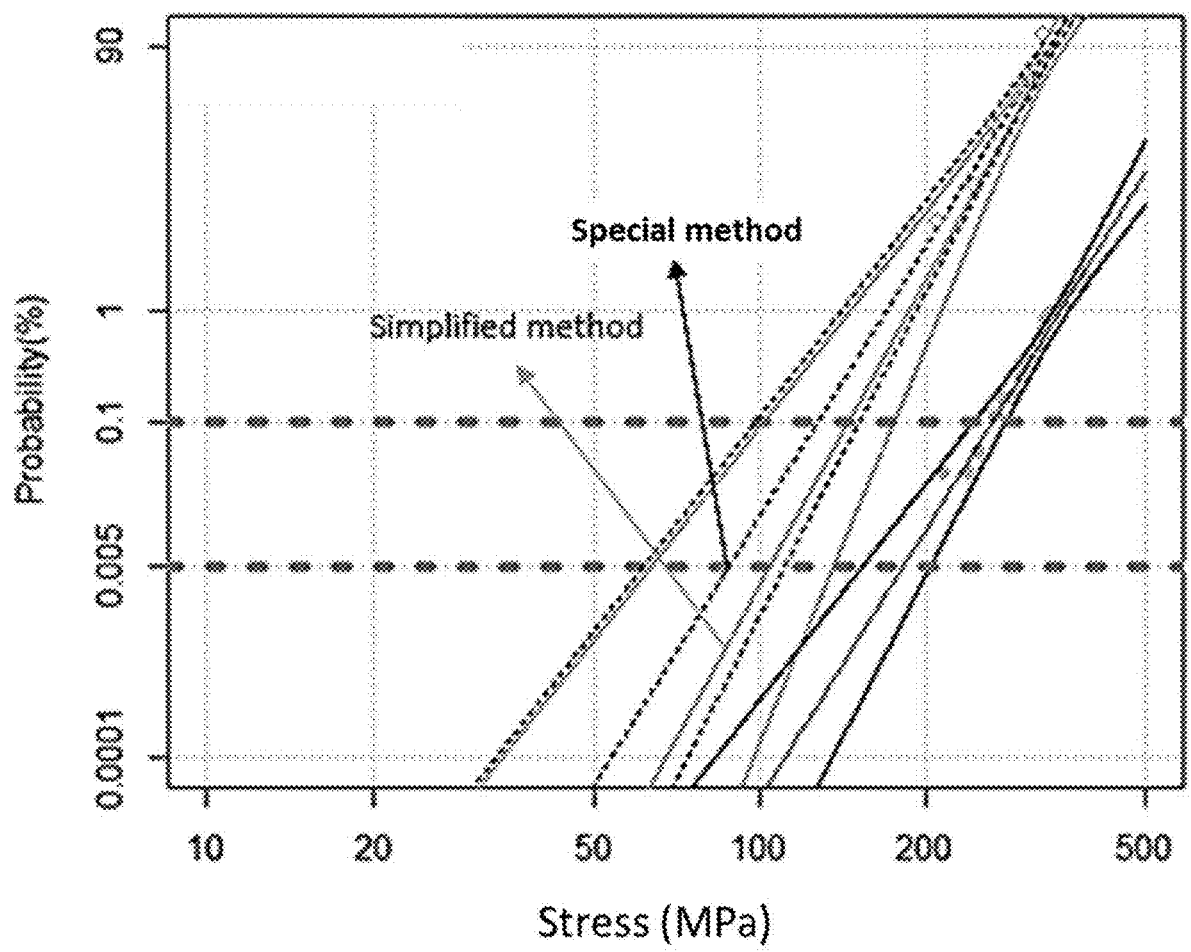
FIG. 32 is a probability vs. stress plot showing the strength distribution of a batch of panels that were analyzed either by the "Simplified method" or "Right" methods.
Figure 33:
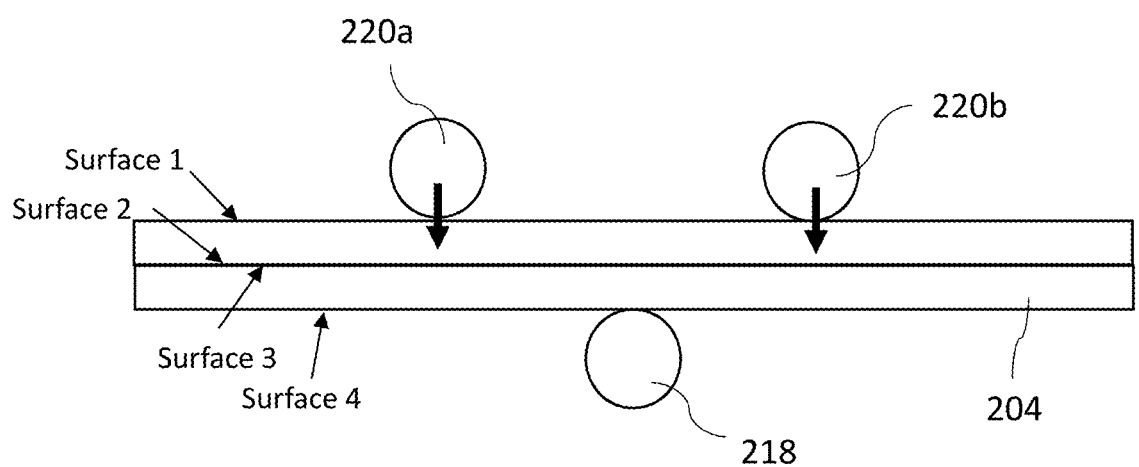
FIG. 33 is a schematic illustration showing the different panel surface nominations
Figure 34:
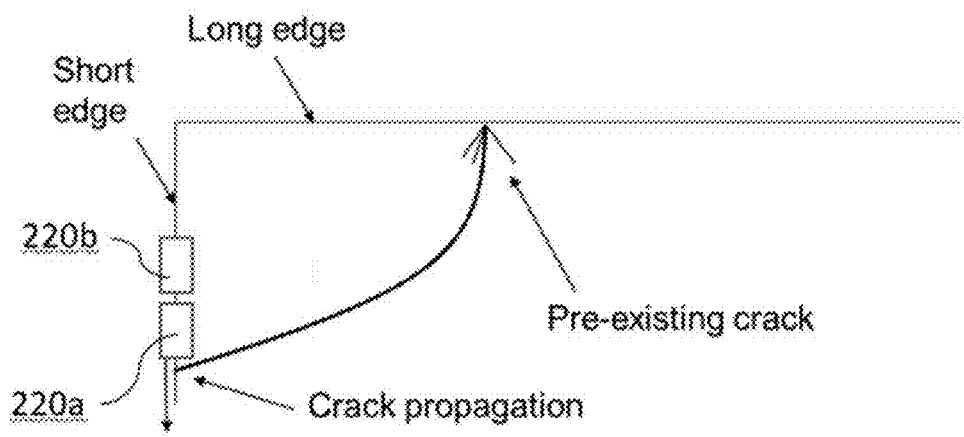
FIG. 34 shows a schematic illustration of the propagation of a pre-existing crack on the long edge which interfered with the short edge measurement.
Figure 35:
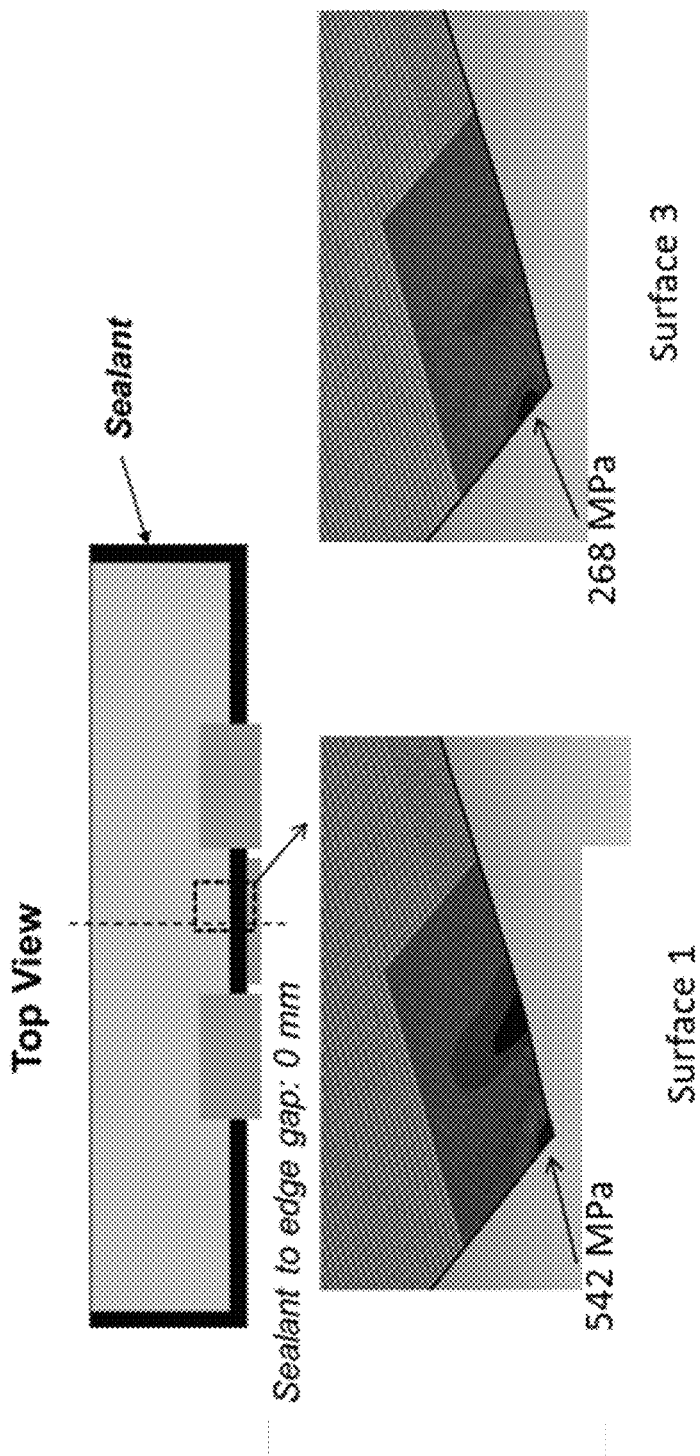
FIG. 35 shows the stress profiles on Surface 1 and Surface 3 when the gap between the sealant to glass edge was 0 mm.
Figure 36:
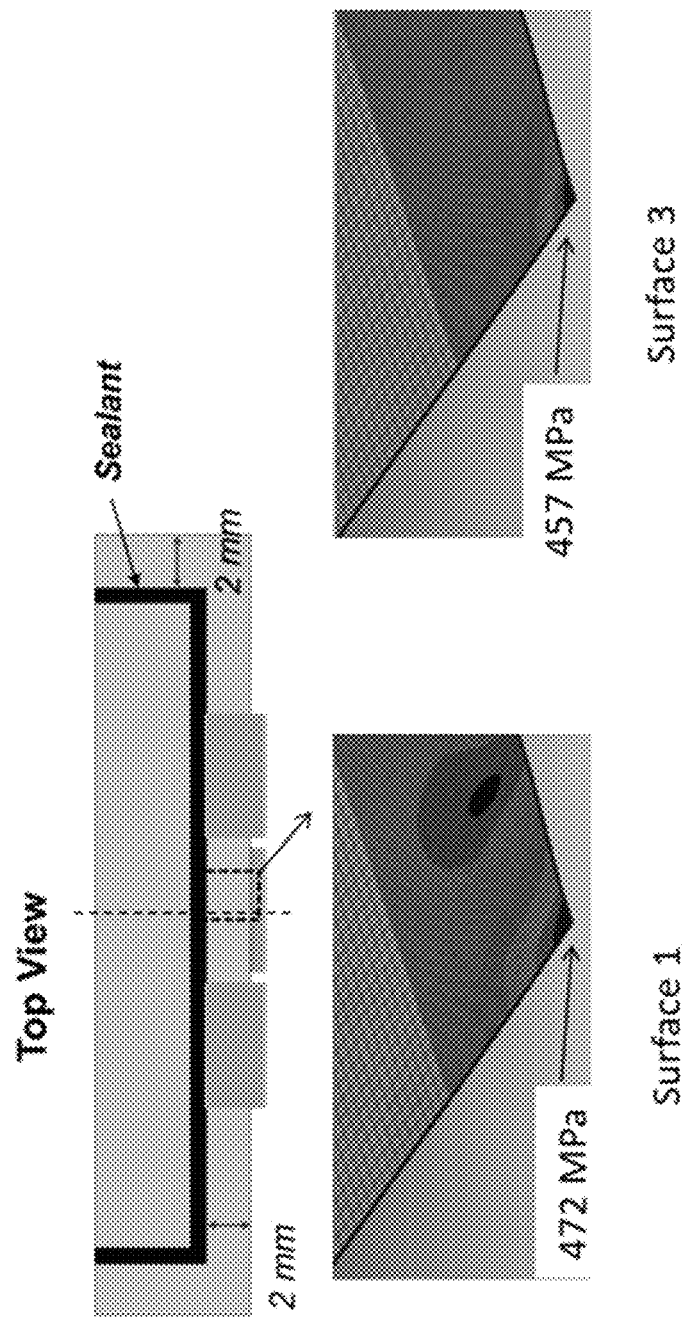
FIG. 36 shows the stress profiles on Surface 1 and Surface 3 when the distance between the sealant to glass edge is 2 mm.
Figure 37:
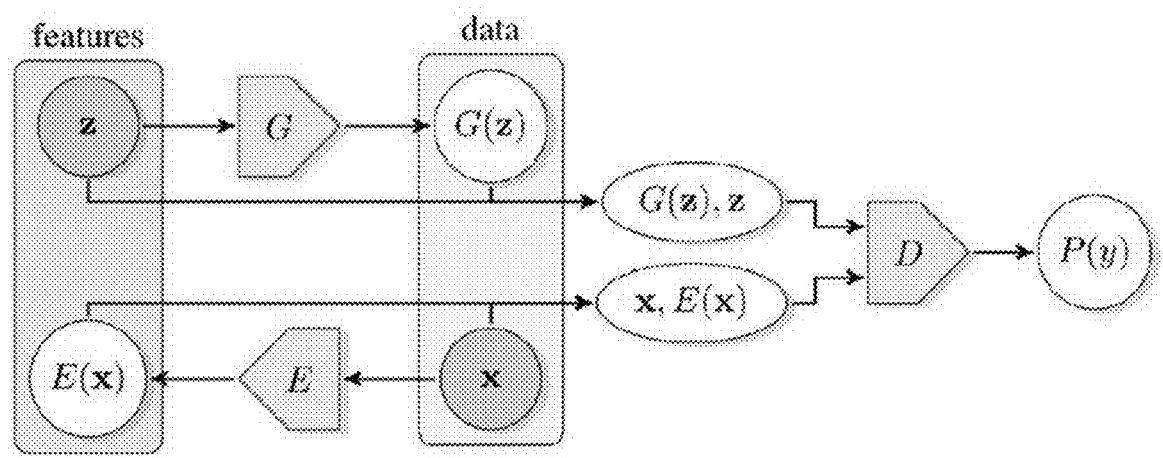
FIG. 37 is a schematic illustration of a machine learning neural network for identifying cracks in the test panels/sheets.

Measurement location—The measurement process may also involve measurement variability that should be accounted for as correction factors. For example, FIGS. 27A and 27B show the force and displacement curves vs. time for 0.1, 0.15, 0.2 and 0.5 mm thick glass sheets as they are tested at a constant load on dynamic ESMS. While the force was maintained constant for all thicknesses, the displacement curves showed significantly different behavior as the rollers approached closer to the corners, as shown by the rising behavior as time progresses. This indicated that the stiffness at the corners became lower as the thickness of glass became thinner, which implied that the load-to-stress correlation had to be corrected for measurement location along the edge. Referring to FIG. 28, the measurement location d along the edge of the panel is measured from the center C of the edge of the panel 204 to the center of the test region 208 marked by "X" in FIG. 28.

[Edge Strength Testing on Discrete Glass Panels or Sheets Having Free-Form Shapes]

Figure 42A:
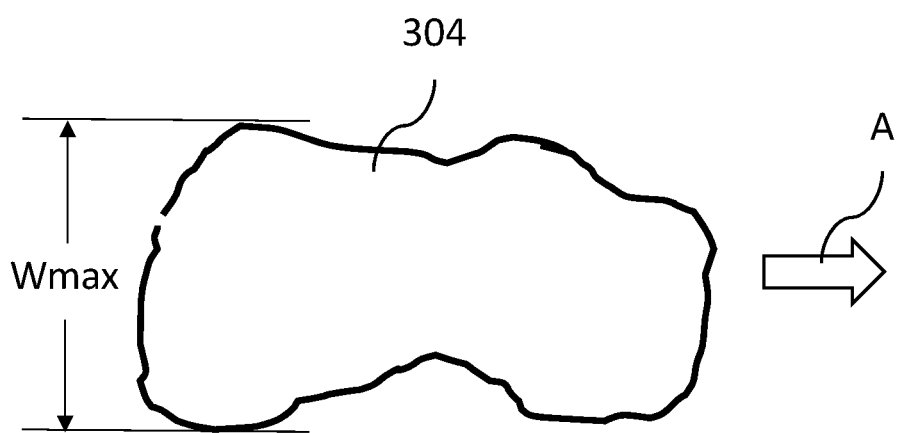
FIG. 42A is a schematic illustration of a discrete glass panel or a glass sheet that has an irregular shaped outline that can be tested on the improved new ESMS system of the present disclosure.

The present disclosure also provides an improved ESMS system that is configured to perform edge strength testing on discrete panels or sheets of glass having irregular or free-form outline (e.g. as viewed in a plan view) shapes. The irregular shapes may be non-rectangular flat shapes. Such ESMS can also be applied to test discrete panels or sheets of other materials having toughness properties similar to glass. FIG. 42A shows a plan view of an example of such discrete sheet 304. The discrete sheet 304 has a maximum width Wmax defined along a direction that is orthogonal to the direction, represented by the arrow A, in which the sheet 304 will move through the ESMS system for edge strength testing.

[Design #1 Embodiment: Long Rollers.]

According to some embodiments, the improved ESMS system configured for testing the edge strength of a discrete sheet 304 of material that is flat but having an irregular shaped or free-form outline is disclosed. The discrete sheet 304 of material can be a glass sheet or a glass panel. Generally, the glass panels are a composite structure. The term "glass sheet" is being used herein to refer to both a glass sheet as well as glass panel structures.

Figure 42B:
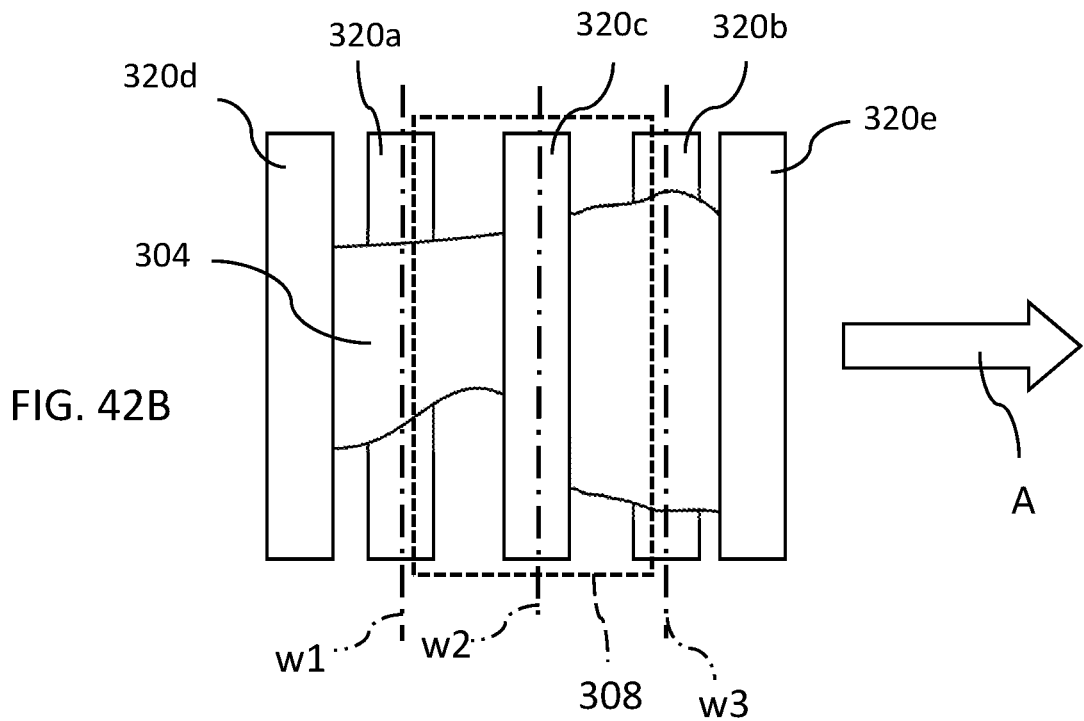
FIG. 42B is a schematic plan view illustration of the cylindrical roller assembly for performing edge strength measurement on a discrete glass panel or a glass sheet having an irregular shaped outline according to an embodiment of the present disclosure.
Figure 42C:
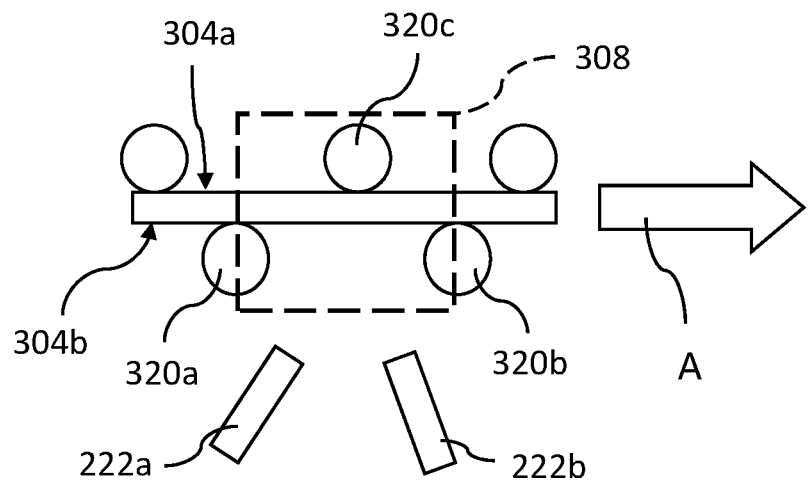
FIG. 42C is a schematic side view illustration of the cylindrical roller assembly of FIG. 42B.

FIGS. 42B and 42C are schematic illustrations of some examples of the hardware configuration in the improved ESMS system. FIG. 42B is a schematic plan view illustration of a plurality of assemblies configured to selectively apply a 3-point bending load on the sheet 304 of material in a test region 308 of the apparatus, whereby the plurality of assemblies can establish a loaded condition on the sheet 304 of material in the test region 308 by applying the 3-point bending load and establish a no-load condition on the sheet 304 of material in the test region 308 by not applying the 3-point bending load.

The plurality of assemblies comprises two opposing assemblies for applying 3-point bending test load along the edge of an irregular shaped glass sheet 304. The first of the two opposing assemblies comprises two spaced-apart cylindrical roller members 320a, 320b for engaging a second side 304b of the sheet opposite the first side 304a. The second of the two opposing assemblies comprises a single cylindrical roller member 320c for engaging a first side 304a of the sheet 304. The cylindrical roller members 320a, 320b, and 320c provide the 3-point bending test configuration same as the configuration illustrated in FIG. 1E for the glass sheet 204.

Using the cylindrical roller members 320a, 320b, 320c, the 3-point bending load is applied across the width of the glass sheet 304 including the edge. The length of each of the three cylindrical roller members 320a, 320b, 320c are designed to be longer than the maximum width Wmax of each of the glass sheet 304 in the population of glass sheets to be tested so that the full width of the discrete glass sheet 304 can be engaged by the three cylindrical roller members 320a, 320b, 320c.

FIG. 42C is a schematic side view illustration of the cylindrical roller assembly of FIG. 42B. The three cylindrical roller members 320a, 320b, 320c are arranged so that their rolling axes w1, w2, w3, respectively, are parallel to each other and equidistant from each other. The two spaced-apart cylindrical roller members 320a, 320b define the test region 308 between them. the improved ESMS, the single cylindrical roller member 320c is vertically aligned between the two spaced-apart cylindrical roller members 320a, 320b.

The improved ESMS can also comprise the DIC feature described above as a detection mechanism configured for optically measuring strain in the glass sheet 304 in the test region 308 when the glass sheet 304 is in the no-load condition and when the glass sheet is in the loaded condition. The strain in the loaded condition is produced by the 3-point bending load. The improved ESMS also includes a processor that is configured for determining stress in the sheet of material based on the measured strain.

Similar to the detection mechanism DIC implemented into the ESMS system 200 shown in FIGS. 9B and 9C, the detection mechanism DIC in the improved ESMS system comprises a first pair of cameras 222a, 222b positioned to acquire one or more images of surface of the second side 304b of the glass sheet 304 in the test region 308 between the two spaced-apart cylindrical roller members 320a, 320b. The detection mechanism DIC optically measures the strain in the glass sheet 304 from the image of the surface of the second side 304b acquired using the first pair of cameras 222a, 222b. The cylindrical roller members 320a and 320b are spaced sufficiently apart to provide the two cameras 222a, 222b clear view of the glass sheet 304 in the test region 308.

In some embodiments, the surface of the second side 304b is applied with a surface pattern 230 as visual markers to facilitate optically measuring the strain in the glass sheet 304 in both the no-load state and the loaded state. The pattern 230 is the same as the pattern 230 provided on the surface of the glass sheet 204 discussed above in reference to FIGS. 9B and 9C. In some embodiments, the detection mechanism DIC further comprises a second pair of cameras 224a, 224b positioned to acquire an image of the surface of the second side 304b of the glass sheet 304 at a region other than the test region 308. Similar arrangement is shown in FIG. 9C for the test sheet 204.

In some embodiments, two additional cylindrical roller members 320d, 320e positioned on the same side of the glass sheet 304 as the single roller member 320c are provided. The additional cylindrical roller members 320d, 320e engage the first side 304a of the sheet of material to provide additional support for the glass sheet 304 during application of the 3-point bending stress.

The edge strength measurement testing on the glass sheet 304 can be carried out for the full length of the discrete glass sheet 304 by moving the glass sheet 304 through the test region 308 in the longitudinal direction noted by arrow A shown in FIGS. 42B and 42C. In some embodiments, the motion of the glass sheet 304 can be enabled by synchronously turning one or more of the cylindrical roller members 320a, 320b, 320c, 320d, and 320e via an appropriate driving mechanism. The particular and specific hardware solutions for enabling such driving mechanism are well within the knowledge of those with ordinary skill in the art.

[Design #2 Embodiment: Load Profile Tooling—a Linear Cam]

Figure 43A:
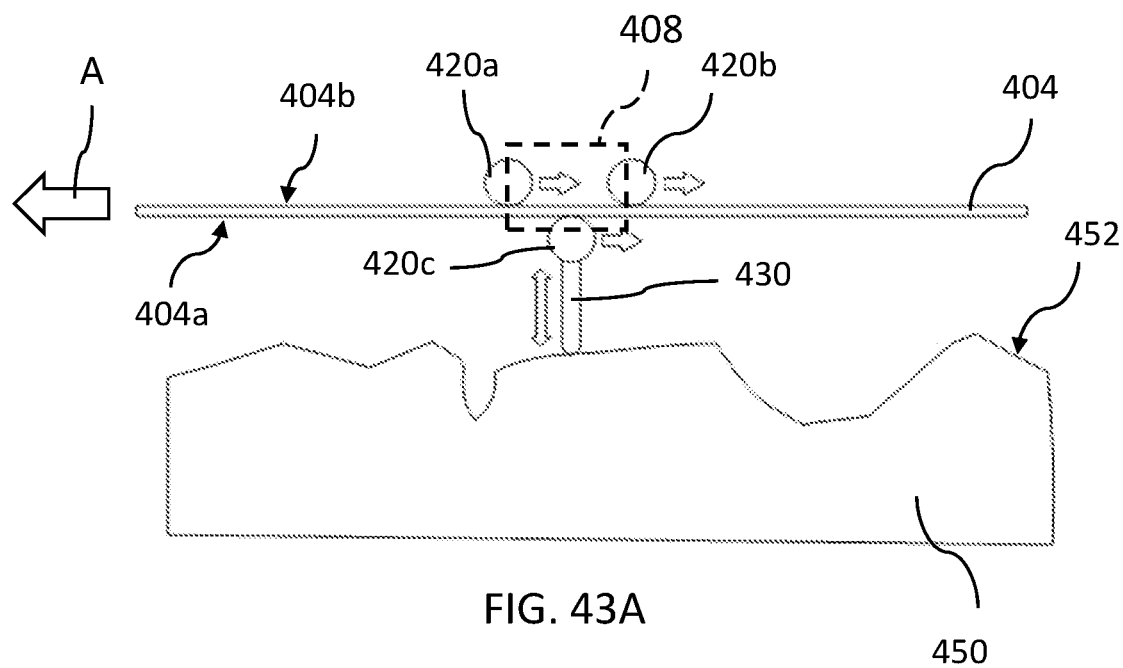
FIGS. 43A and 43B are schematic side view illustrations of a roller assembly utilizing a linear cam arrangement for enabling the roller assembly to apply predetermined 3-point bending test load profile along an edge of a glass sheet.

Referring to FIG. 43A, an improved ESMS system according to another embodiment that is configured to test the edge strength of a glass sheet 404 is disclosed. The illustration in FIG. 43A is a schematic side view of the relevant configuration of the improved ESMS system. The discrete glass sheet 404 can have an irregular non-rectangular free-form shaped outline (e.g. as viewed in a plan view) or it can also have a regular rectangular shaped outline. The improved ESMS system can be configured to be able to test either types of outline shapes.

In some embodiments of the ESMS system, application of a desired 3-point bending load profile along the edge of a test sheet is maintained using load-cell feedback. In this embodiment of the improved ESMS system, the reliance on load-cell feedback is eliminated by the provision of a linear cam 450 that is configured to provide the desired 3-point bending load profile.

FIG. 43A shows a roller assembly that utilizes such a linear cam 450 arrangement for selectively applying a 3-point bending load along the edge of the glass sheet 404. In this illustrated example, the linear cam 450 is configured to provide a 3-point bending load that is dynamically variable along the edge of the glass sheet 404.

The ESMS system of this embodiment comprises a plurality of assemblies configured for selectively applying the 3-point bending load along an edge of the glass sheet 404 in a test region 408 of the apparatus, whereby the plurality of assemblies can establish a loaded condition on the glass sheet 404 of material in the test region 408 by applying the 3-point bending load and establish a no-load condition on the sheet of material in the test region by not applying the 3-point bending load.

The plurality of assemblies comprises two opposing assemblies for applying the 3-point bending load. A first of the two opposing assemblies comprises a single arcuate member 420c for engaging a first side 404a of the glass sheet 404 and a second of the two opposing assemblies comprising two spaced-apart arcuate members 420a, 420b for engaging a second side 404b of the sheet 404 opposite the first side 404a. The two spaced-apart arcuate members 420a, 420b define the test region 408 between the two spaced-apart arcuate members. In some embodiments, the arcuate members 420a, 420b, 420c can be rotatably mounted rollers, as shown in FIG. 9A, belt rollers, bearing rollers, or fixed bushings.

To dynamically test the edge strength of the glass sheet 404, the improved ESMS system is configured to move the glass sheet 404 and the two opposing assemblies, comprising the arcuate members 420a, 420b, 420c, relative to each other. In some embodiments, this relative motion can be achieved by moving the glass sheet 404 longitudinally through the test region 408 while the two opposing assemblies remain in one place in the ESMS system. Alternatively, in some embodiments, the relative motion can be achieved by moving the two opposing assemblies along the edge of the glass sheet 404 while the glass sheet 404 remain in one place in the ESMS system. The particular and specific hardware solutions for enabling either of these two embodiments are well within the knowledge of those with ordinary skill in the art.

In some embodiments, the linear cam 450 comprises a guiding surface 452 that is configured with a predetermined contour representing a linear map of the desired 3-point bending load profile along the edge of the glass sheet 404.

In the illustrated example shown, the guiding surface 452 is provided with an undulating contour. The two opposing assemblies comprising the arcuate members 420a, 420b, 420c are attached to a follower 430 that rides on the guiding surface 452 of the linear cam 450. The relative motion between the two opposing assemblies and the linear cam 450 causes the follower 430 to move up and down according to the undulating contour of the guiding surface 452, which in turn causes the arcuate members 420a, 420b, 420c to move up and down dynamically varying the 3-point bending load along the edge of the glass sheet 404.

In some embodiments, the guiding surface 452 of the linear cam 450 can be configured to have a flat contour to provide a constant 3-point bending load profile along the edge of the glass sheet 404.

In some embodiments where the glass sheet 404 is moved in relation to stationary arcuate members 420a, 420b, 420c, the linear cam 450 is configured to move linearly in synchronization with the glass sheet 404. Alternatively, in some embodiments where the glass sheet 404 remains stationary and the arcuate members 420a, 420b, 420c are moved in relation to the glass sheet 404, the linear cam 450 is configured to remain in place with the glass sheet 404.

The linear cam 450 in these embodiments represents a predefined profile for the 3-point bending load and the follower 430 is attached to the single arcuate member 420c only. As the follower 430 rides on the contour of the guiding surface 452 of the linear cam 450 and moves up and down accordingly, the follower 430 in turn moves the single arcuate member 420c to move up and down relative to the two spaced-apart arcuate members 420a, 420b that are on the opposite side of the glass sheet 404 and vary the amount of 3-point bending load applied on the glass sheet 404. The contour of the guiding surface 452 can be defined to apply any desired 3-point bending loading profile along the edge of the glass sheet 404.

In some embodiments, the linear cam 450 can be physically linked with the glass sheet 404 so the linear cam 450 moves with the glass sheet 404. Alternatively, the movement of the linear cam 450 and the movement of the glass sheet 404 are driven by separate mechanisms but they can be time synchronized to move in unison. The particular and specific hardware solutions for enabling either of these two embodiments are well within the knowledge of those with ordinary skill in the art.

The embodiment of the improved ESMS system comprising the linear cam 450 can be used to test a glass sheet 404 that is a ribbon that is continuously being fed through the test region 408 as well as a glass sheet 404 that is a discrete piece of sheet having a variety of free-form shape and can be used to test the edge strength around the periphery of the test sheet.

In the embodiments of the improved ESMS system comprising the linear cam 450, the single arcuate member 420c is vertically aligned between the two spaced-apart arcuate members 420a, 420b. In some embodiments, the arcuate members 420a, 420b, 420c can be roller type spherical bearing structures similar to a ballpoint pen tip that enable in-plane translation of the glass sheet 404.

The improved ESMS can also comprise the DIC feature described above as a detection mechanism configured for optically measuring strain in the glass sheet 404 in the test region 408 when the glass sheet 404 is in the no-load condition and when the glass sheet is in the loaded condition. The strain in the loaded condition is produced by the 3-point bending load applied by the arcuate members 420a, 420b, 420c. The improved ESMS also includes a processor that is configured for determining stress in the sheet of test material based on the measured strain.

Figure 43B:
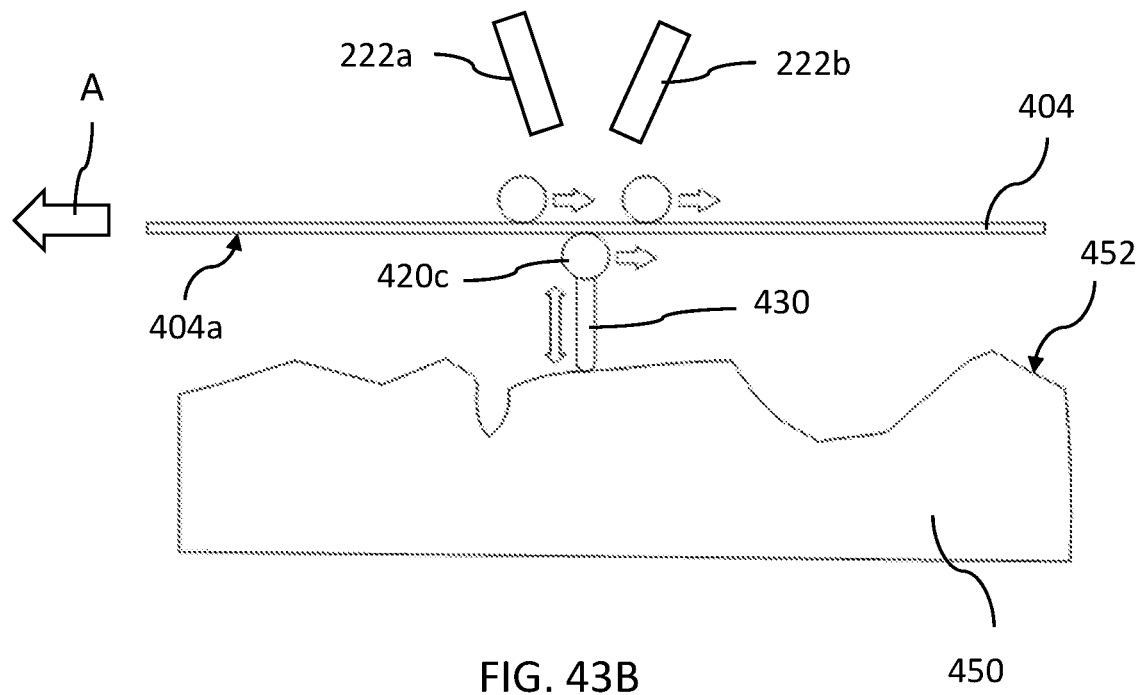

Similar to the detection mechanism DIC implemented into the ESMS system 200 shown in FIGS. 9B and 9C, the detection mechanism DIC in the improved ESMS system shown in FIGS. 43A and 43B comprises a first pair of cameras 222a, 222b positioned to acquire one or more images of surface of the second side 404b of the glass sheet 404 in the test region 408 between the two spaced-apart arcuate members 420a, 420b. The detection mechanism DIC optically measures the strain in the glass sheet 404 from the image of the surface of the second side 404b acquired using the first pair of cameras 222a, 222b. The arcuate members 420a and 420b are spaced sufficiently apart to provide the two cameras 222a, 222b clear view of the glass sheet 404 in the test region 408.

In some embodiments, the surface of the second side 404b is applied with a surface pattern 230 as visual markers to facilitate optically measuring the strain in the glass sheet 404 in both the no-load state and the loaded state. The pattern 230 is the same as the pattern 230 provided on the surface of the glass sheet 204 discussed above in reference to FIGS. 9B and 9C. In some embodiments, the detection mechanism DIC further comprises a second pair of cameras 224a, 224b positioned to acquire an image of the surface of the second side 404b of the glass sheet 404 at a region other than the test region 408. Similar arrangement is shown in FIG. 9C for the test sheet 204.

[Design #3 Embodiment: Dynamically Changing the Roller Spacing]

Figure 44:
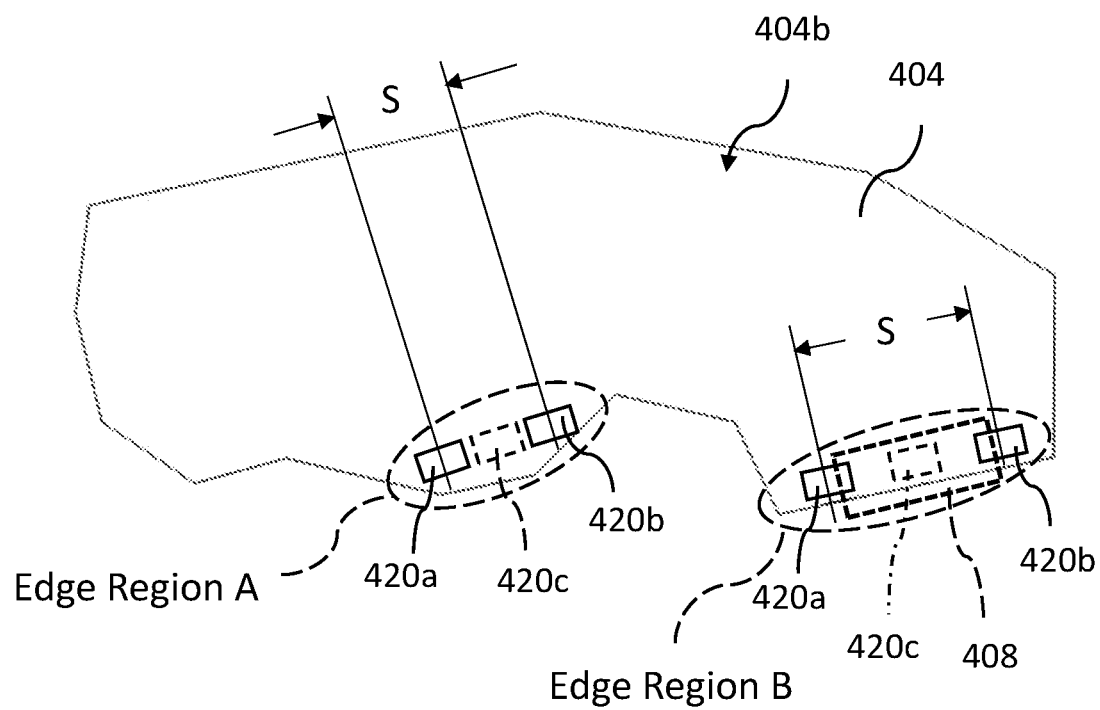
FIG. 44 is a schematic illustration of a discrete glass sheet having an irregular free-form shaped outline and a set of roller assemblies for applying a 3-point bending load along edges of the glass sheet that is configured to dynamically adjust the spacing between the roller assemblies to adjust the 3-point bending load.

Referring to the schematic illustration in FIG. 44, an improved ESMS system according to another embodiment that is configured for testing the edge strength of a discrete glass sheet 404 that has an irregular free-form shaped outline is disclosed. An example of such glass sheet 404 is a display panel for an automobile dashboard that has an irregular non-rectangular shaped outline. As in the other embodiments of the ESMS system, an embodiment of the improved ESMS system comprises a plurality of assemblies configured for selectively applying a 3-point bending load along an edge of the glass sheet 404 in a test region 408 of the improved ESMS system. As discussed above, the plurality of assemblies can establish a loaded condition on the sheet of material in the test region 408 by applying the 3-point bending load and establish a no-load condition on the sheet of material in the test region by not applying the 3-point bending load.

The plurality of assemblies comprises two opposing assemblies for applying the 3-point bending load, where a first of the two opposing assemblies comprising a single arcuate member 420c for engaging a first side 404a of the sheet 404 and a second of the two opposing assemblies comprising two spaced-apart arcuate members 420a, 420b for engaging a second side 404b of the sheet opposite the first side. The two spaced-apart arcuate members 420a, 420b are separated by a predefined spacing S, where the two spaced-apart arcuate members 420a, 420b define the test region 408 between the two spaced-apart arcuate members 420a, 420b. The single arcuate member 420c is vertically aligned between the two spaced-apart arcuate members 420a, 420b, meaning that the single arcuate member 420c is equidistant from each of the two spaced-apart arcuate members 420a, 420b.

In FIG. 44, the second side 404b is the surface of the glass sheet 404 facing the viewer and the first side 404a is the opposite surface of the glass sheet 404 that is not visible in this view. Thus, the single arcuate member 420c that engages the first side 404a is shown in dashed lines to illustrate that it is on the opposite side of the glass sheet 404 and not visible. Additionally, the illustration in FIG. 44 shows two sets of arcuate members 420a, 420b, 420c for the purpose of illustrating two different configurations of the arcuate members exhibiting two different predefined spacing S. The ESMS system has one set of arcuate members 420a, 420b, 420c and one associated test region 408.

The two spaced-apart arcuate members 420a, 420b are configured to dynamically adjust the predefined spacing S between the two spaced-apart arcuate members 420a, 420b to adjust the stress induced in the sheet 404 in the test region while maintaining the vertical alignment of the single arcuate member 420c with respect to the two spaced-apart arcuate member 420a, 420b. Maintaining the vertical alignment of the single arcuate member 420c means that as the predefined spacing S changes when the two spaced-apart arcuate members 420a, 420b are moved in closer together or moved farther apart from each other, the single arcuate member 420c is always equidistant from each of the two spaced-apart arcuate members 420a, 420b. The particular and specific hardware solutions for enabling dynamic adjustment of the predefined spacing S are well within the knowledge of those with ordinary skill in the art.

The embodiment of the improved ESMS system configured with the ability to adjust the predefined spacing S between the two spaced-apart arcuate members 420a, 420b can be used to test a glass sheet 404 that is a ribbon that is continuously being fed through the test region 408 as well as a glass sheet 404 that is a discrete piece of sheet having a variety of free-form shape and can be used to test the edge strength around the periphery of the test sheet. In some embodiments, the arcuate members 420a, 420b, 420c can be roller type spherical bearing structures shown in FIG. 13 similar to a ballpoint pen tip that enable in-plane translation of the glass sheet 404.

In some embodiments of the improved ESMS system configured with the ability to adjust the predefined spacing S between the two spaced-apart arcuate members 420a, 420b can also comprise the DIC feature as a detection mechanism configured for optically measuring strain in the glass sheet 404 in the test region 408 when the sheet 404 is in the no-load condition and when the sheet of material is in the loaded condition.

[Design #4 Embodiment: Geometry Following Tooling—Free-Form Perimeter Matching]

Figure 45A:
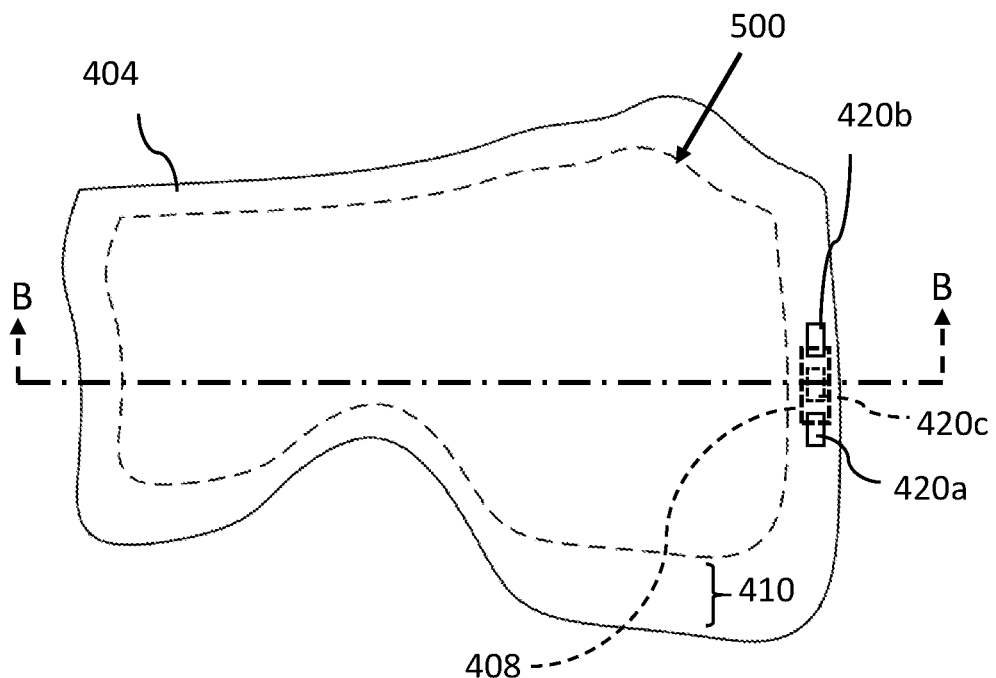
FIGS. 45A and 45B are schematic illustrations of a glass sheet holder assembly for holding a discrete glass sheet having an irregular free-form shaped outline and guiding the glass sheet through a testing region defined by a set of roller assemblies for applying a 3-point bending load along the edge of the glass sheet.
Figure 45B:
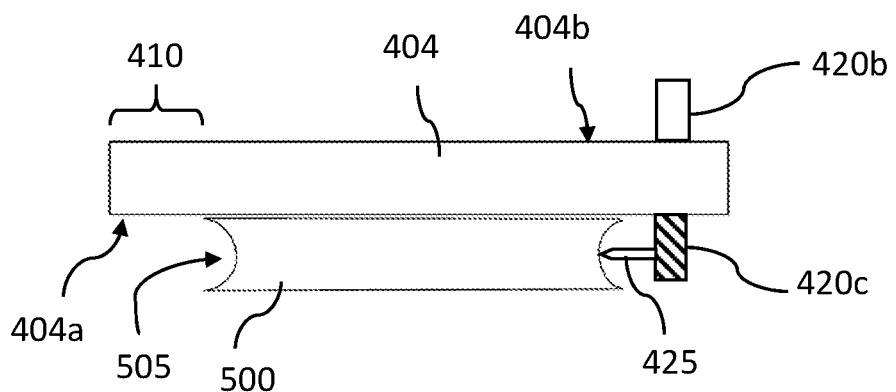

Referring to the schematic illustrations in FIGS. 45A and 45B, an improved ESMS system according to another embodiment that is configured for testing the edge strength of a discrete glass sheet 404 that has an irregular free-form shaped outline is disclosed. The irregular shaped outline defines a continuous edge along the irregular shaped outline. An example of such glass sheet 404 is a display panel for an automobile dashboard that has an irregular non-rectangular shaped outline. As in the other embodiments of the ESMS system, an embodiment of this improved ESMS system comprises a plurality of assemblies configured for selectively applying a 3-point bending load along an edge of the glass sheet 404 in a test region 408 of the improved ESMS system. As discussed above, the plurality of assemblies can establish a loaded condition on the sheet of material in the test region 408 by applying the 3-point bending load and establish a no-load condition on the sheet of material in the test region by not applying the 3-point bending load.

The plurality of assemblies comprises two opposing assemblies for applying the 3-point bending load, where a first of the two opposing assemblies comprising a single arcuate member 420c for engaging a first side 404a of the sheet 404 and a second of the two opposing assemblies comprising two spaced-apart arcuate members 420a, 420b for engaging a second side 404b of the sheet opposite the first side. The two spaced-apart arcuate members 420a, 420b are separated by a predefined spacing, where the two spaced-apart arcuate members 420a, 420b define the test region 408 between the two spaced-apart arcuate members 420a, 420b.

The single arcuate member 420c is vertically aligned between the two spaced-apart arcuate members 420a, 420b, meaning that the single arcuate member 420c is equidistant from each of the two spaced-apart arcuate members 420a, 420b.

In this embodiment, a holder 500 configured for holding the glass sheet 404 while the 3-point bending load is being applied on the sheet of material is also provided. The holder 500 is configured to hold the glass sheet 404 and also manipulate the glass sheet's position and orientation. The holder 500 comprises a top side and a bottom side, where the top side is configured to receive and hold the glass sheet 404.

As shown in FIG. 45A, the holder 500 is shaped such that the outline of its periphery mimics the irregular shaped outline of the glass sheet 404 in a proportionally smaller scale so that when the glass sheet 404 is centered on the top side, the glass sheet 404 overhangs the holder 500 all around the irregular shaped periphery. The portion of the glass sheet 404 that overhangs forms a defined testing channel region 410 along the edge of the glass sheet 404.

The holder 500 is configured to hold the glass sheet 404 and manipulate the glass sheet 404 so that the defined testing channel region 410 can be moved through the test region 408 of the improved ESMS system. Preferably, much of the glass sheet's edge along its periphery, if not all, can be tested for its edge strength. The motion of the defined testing channel region 410 through the test region 408 can be continuous or step-and-repeat as desired so that the 3-point bending load can be applied at different locations along the edge of the glass sheet 404. The particular and specific hardware solutions for enabling the controlled movement of the holder 500 holding the glass sheet 404 are well within the knowledge of those with ordinary skill in the art.

Referring to FIG. 45B, which is a cross-sectional view of the assembly shown in FIG. 45A taken through the section line B-B, the holder 500 can be provided with a guiding groove 505 along its peripheral edge for guiding the movement of the glass sheet 404. The plurality of assemblies that comprises the single arcuate member 420c can be configured with a stylus 425 that engages the guiding groove 505. The guiding groove 505 of the holder 500 is kept in contact with the stylus 425 while the glass sheet 404 is being moved so that the two opposing assemblies comprising the arcuate members 420a, 420b, 420c for applying the 3-point bending load can track the contour of the periphery outline of the holder 500 and maintain the arcuate members 420a, 420b, 420c within the defined testing channel region 410.

The holder 500 can have a flat top surface for securely engaging and holding the glass sheet 404. In some embodiments, the holder 500 is configured as a vacuum plate to securely hold the glass sheet 404 by vacuum. The holder 500 can also hold the glass sheet 404 by an adhesive, or suitable mechanical restraints such as clips.

In some embodiments of the improved ESMS system configured with the holder 500 can also comprise the DIC feature as a detection mechanism configured for optically measuring strain in the glass sheet 404 in the test region 408 when the sheet 404 is in the no-load condition and when the sheet of material is in the loaded condition.

[Design #5 Embodiment: Combination of Designs #2, #3, and #4]

In some embodiments, the improved ESMS system comprises a combination of two or more of the Design features #2, #3, and #4 together along with the DIC feature.

[Design #6 Embodiment: 3-Point CNC or Robot]

In some other embodiments, the holder 500 can hold the glass sheet 404 in a stationary position and the plurality of assemblies 420a, 420b, 420c for applying the 3-point bending load are configured to be moved around the perimeter of the discrete glass sheet 404 following the irregular shaped periphery outline of the glass sheet 404. The testing channel region 410 of the continuous edge of the glass sheet 404 is maintained between the two opposing assemblies during the movement.

Figure 46:
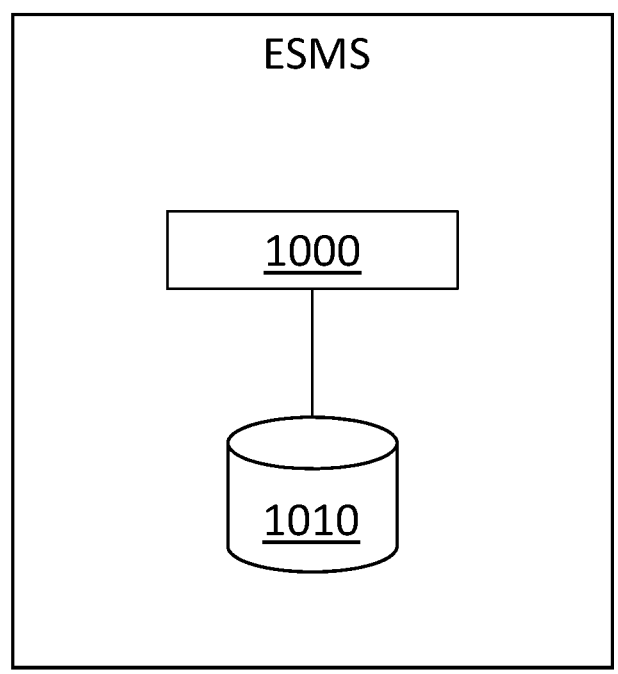
FIG. 46 is a schematic illustration of the controller system of an improved ESMS system according to some embodiments of the present disclosure.

Referring to FIG. 46, in some embodiments, the improved ESMS system comprises a computer processor 1000 and the movement of the plurality of assemblies is controlled by the computer processor. In some embodiments, the improved ESMS system comprises a non-transitory computer readable medium 1010 storing information on the irregular shaped periphery of the glass sheet 404, where the computer processor 1000 controls the movement of the plurality of assemblies based on the information on the irregular shaped periphery of the glass sheet 404. In some embodiments, the information on the irregular shaped periphery of the glass sheet can be obtained by direct measurement of the dimensions of the irregular shaped periphery of the glass sheet 404. In some embodiments, the information on the irregular shaped periphery of the glass sheet 404 can be obtained by taking an image of irregular shaped glass sheet 404 with a digital camera and mapping the outline of the glass sheet 404 and creating a pathway data for the computer processor 1000 to use in driving the movement of the plurality of assemblies 420a, 420b, 420c. An example of the mechanism for driving the movement of the plurality of assemblies is a computer controlled robot arm. The robot arm can be configured to hold the plurality of assemblies and move the plurality of assemblies around the periphery of the glass sheet 404 to test the edge strength of the glass sheet 404. In some embodiments, the movement of the plurality of assemblies can be continuous or stepped. The edge strength measurement can be taken dynamically or in a step-and-repeat process.

Embodiments and the functional operations described herein can be implemented in digital electronic circuitry, or in computer software, firmware, or hardware, including the structures disclosed in this specification and their structural equivalents, or in combinations of one or more of them. Embodiments described herein can be implemented as one or more computer program products, i.e., one or more modules of computer program instructions encoded on a tangible program carrier for execution by, or to control the operation of, data processing apparatus. The tangible program carrier can be a computer readable medium. The computer readable medium can be a machine-readable storage device, a machine readable storage substrate, a memory device, or a combination of one or more of them.

The term "processor" or "controller" can encompass all apparatus, devices, and machines for processing data, including by way of embodiment a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit) to name a few.

Processors suitable for the execution of a computer program include, by way of embodiment, both general and special purpose microprocessors, and any one or more processors of any kind of digital computer. Generally, a processor will receive instructions and data from a read only memory or a random access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few.

Computer readable media suitable for storing computer program instructions and data include all forms data memory including nonvolatile memory, media and memory devices, including by way of embodiment semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user and as shown in the Figures contained herein, embodiments described herein can be implemented on a computer having a display device, e.g., a CRT (cathode ray tube) or LCD (liquid crystal display) monitor, and the like for displaying information to the user and a keyboard and a pointing device, e.g., a mouse or a trackball, or a touch screen by which the user can provide input to the computer. Other kinds of devices can be used to provide for interaction with a user as well; for embodiment, input from the user can be received in any form, including acoustic, speech, or tactile input.

Embodiments described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described herein, or any combination of one or more such back end, middleware, or front end components. The components of the system can be interconnected by any form or medium of digital data communication, e.g., a communication network. Embodiments of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

We claim:

1. An apparatus for testing edge strength of a sheet of material having a maximum width, the apparatus comprising:
   a plurality of assemblies comprising two opposing assemblies, wherein a first of the two opposing assemblies comprises a single cylindrical roller member for engaging a first side of the sheet, and a second of the two opposing assemblies comprises two spaced-apart cylindrical roller members for engaging a second side of the sheet opposite the first side and selectively applying a 3-point bending load on the sheet of material in a test region of the apparatus, whereby the plurality of assemblies can establish a loaded condition on the sheet of material in the test region by applying the 3-point bending load and establish a no-load condition on the sheet of material in the test region by not applying the 3-point bending load;
   wherein each of the cylindrical roller members are longer than the maximum width of the sheet of material so that the full width of the sheet of material can be engaged by the three rollers;
   wherein the cylindrical roller members are arranged so that their rolling axes are parallel to each other and equidistant from each other;
   wherein the two spaced-apart roller members define the test region between the two spaced-apart roller members;
   a detection mechanism configured to optically measure strain in the sheet of material in the test region when the sheet of material is in the no-load condition and when the sheet of material is in the loaded condition, wherein the strain in the loaded condition is produced by the 3-point bending load, wherein a pattern provided on the surface of the sheet of material in the test region facilitates optically measuring the strain in the sheet of material; and
   a processor that is configured to determine stress in the sheet of material based on the measured strain.

2. The apparatus of claim 1, wherein the single roller member is vertically aligned between the two spaced-apart roller members.

3. The apparatus of claim 1, wherein the detection mechanism comprises a first pair of cameras positioned to acquire one or more images of surface of the second side of the sheet in the test region between the two spaced-apart roller members,
wherein the detection mechanism optically measures the strain in the sheet of material from the image of the surface of the second side of the sheet acquired using the first pair of cameras.

4. The apparatus of claim 1, wherein the detection mechanism further comprises a second pair of cameras positioned to acquire an image of the surface of the second side of the sheet at a region other than the test region.

5. The apparatus of claim 1, further comprising two additional roller members positioned on the same side of the sheet as the single roller member and engaging the first side of the sheet of material.

6. An apparatus for testing edge strength of a sheet of material comprising:
a plurality of assemblies configured to selectively applying a 3-point bending load along an edge of the sheet of material in a test region of the apparatus, whereby the plurality of assemblies can establish a loaded condition on the sheet of material in the test region by applying the 3-point bending load and establish a no-load condition on the sheet of material in the test region by not applying the 3-point bending load, wherein a pattern provided on the surface of the sheet in the test region facilitates optically measuring the strain in the sheet of material;
wherein the plurality of assemblies comprises two opposing assemblies for applying the 3-point bending load, wherein a first of the two opposing assemblies comprises a single arcuate member for engaging a first side of the sheet and a second of the two opposing assemblies comprises two spaced-apart arcuate members for engaging a second side of the sheet opposite the first side, wherein the two spaced-apart arcuate members define the test region between the two spaced-apart arcuate members;
a linear cam representing a linear map of the 3-point bending load along the edge of the sheet of material, wherein the linear cam is configured to move linearly in synchronization with the sheet of material; and
a follower that rides on the linear cam, wherein the follower is connected to the single arcuate member to vary the 3-point bending load on the sheet of material as the sheet of material moves through the test region.

7. The apparatus of claim 6, wherein the single arcuate member is vertically aligned between the two spaced-apart arcuate members.

8. The apparatus of claim 6, wherein the arcuate members are spherical bearings that enable in-plane translation of the sheet of material.

9. The apparatus of claim 6, further comprising:
a detection mechanism configured for optically measuring strain in the sheet of material in the test region when the sheet of material is in the no-load condition and when the sheet of material is in the loaded condition, wherein the strain in the loaded condition is produced by the 3-point bending load; and
a processor that is configured for determining stress in the sheet of material based on the measured strain.

10. The apparatus of claim 7, wherein the detection mechanism comprises a first pair of cameras positioned to acquire one or more images of the surface of the second side of the sheet in the test region between the two spaced-apart arcuate members,
wherein the detection mechanism optically measures the strain in the sheet of material from the image of the surface of the second side of the sheet acquired using the first pair of cameras.

11. The apparatus of claim 10, wherein the detection mechanism further comprises a second pair of cameras positioned to acquire an image of the surface of the second side of the sheet at a region other than the test region.

12. An apparatus for testing edge strength of a sheet of material comprising:
a plurality of assemblies configured for selectively applying a 3-point bending load along an edge of the sheet of material in a test region of the apparatus, whereby the plurality of assemblies can establish a loaded condition on the sheet of material in the test region by applying the 3-point bending load and establish a no-load condition on the sheet of material in the test region by not applying the 3-point bending load;
wherein the plurality of assemblies comprises two opposing assemblies for applying the 3-point bending load, wherein a first of the two opposing assemblies comprises a single arcuate member for engaging a first side of the sheet and a second of the two opposing assemblies comprises two spaced-apart arcuate members for engaging a second side of the sheet opposite the first side, wherein the two spaced-apart arcuate members are separated by a predefined spacing, wherein the two spaced-apart arcuate members define the test region between the two spaced-apart arcuate members;
wherein the single arcuate member is vertically aligned between the two spaced-apart arcuate members;
wherein the two spaced-apart arcuate members are configured to dynamically adjust the predefined spacing between the two spaced-apart arcuate members to adjust the stress induced in the sheet in the test region while maintaining the vertical alignment of the single arcuate member with respect to the two spaced-apart arcuate member.

13. The apparatus of claim 12, wherein the arcuate members are spherical bearings that enable in-plane translation of the sheet of material.

14. The apparatus of claim 12, further comprising:
a detection mechanism configured to optically measure strain in the sheet of material in the test region when the sheet of material is in the no-load condition and when the sheet of material is in the loaded condition, wherein the strain in the loaded condition is produced by the 3-point bending load; and
a processor that is configured for determining stress in the sheet of material based on the measured strain.

15. The apparatus of claim 14, wherein the detection mechanism comprises a first pair of cameras positioned to acquire one or more images of the surface of the second side of the sheet in the test region between the two spaced-apart arcuate members,
wherein the detection mechanism optically measures the strain in the sheet of material from the image of the surface of the second side of the sheet acquired using the first pair of cameras.

16. The apparatus of claim 14, wherein a pattern provided on the surface of the sheet in the test region facilitates optically measuring the strain in the sheet of material.

17. The apparatus of claim 15, wherein the detection mechanism further comprises a second pair of cameras positioned to acquire an image of the surface of the second side of the sheet at a region other than the test region.

* * * * *